(12) United States Patent
Kyojima et al.

(10) Patent No.: US 6,950,808 B1
(45) Date of Patent: Sep. 27, 2005

(54) BOOKING CERTIFICATE ISSUING APPARATUS AND METHOD

(75) Inventors: Masaki Kyojima, Nakai-machi (JP); Kil-ho Shin, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 579 days.

(21) Appl. No.: 09/705,707

(22) Filed: Nov. 6, 2000

(30) Foreign Application Priority Data

Feb. 1, 2000 (JP) ............................. 2000-024519

(51) Int. Cl.[7] ............................................ G06F 17/60
(52) U.S. Cl. ............................. 705/65; 705/5; 705/26; 705/78; 705/79; 705/64; 713/150; 713/155; 713/156
(58) Field of Search .............................. 705/5, 50–80, 705/26; 713/150, 155, 156

(56) References Cited

U.S. PATENT DOCUMENTS

| | | | | |
|---|---|---|---|---|
| 5,915,022 | A | * | 6/1999 | Robinson et al. ............. 705/75 |
| 6,189,146 | B1 | * | 2/2001 | Misra et al. .................. 717/11 |
| 6,205,435 | B1 | * | 3/2001 | Biffar .......................... 705/41 |
| 6,223,166 | B1 | * | 4/2001 | Kay ............................. 705/26 |
| 6,308,277 | B1 | * | 10/2001 | Vaeth et al. ................ 713/201 |
| 2001/0011255 | A1 | * | 8/2001 | Asay et al. ................... 705/76 |
| 2001/0018660 | A1 | * | 8/2001 | Sehr .............................. 705/5 |

FOREIGN PATENT DOCUMENTS

| | | | | |
|---|---|---|---|---|
| JP | 11-225143 | * | 8/1999 | ............. H04L 9/32 |
| JP | 11-250-155 | * | 9/1999 | ........... G06F 19/00 |

OTHER PUBLICATIONS

Barnes, Terry, "New Ticketmaster.com Electronic Ticketing Service Will Give Online OCnsumers The Edge by Allowing Them Purchase, Print Out Ticketmaseter Tickets at Home", Jan. 25, 2000, PR Newswire.*

Pual Tolme, "More travelers are saying goodbye to paper airline tickets; Electronic tickets fill the bill for some", Jul. 19, 1999, Milwaukee Journal Sentinel.*

Collins, Eric, "With the Greatest of E", Nov. 19, 1999, The Oregonian.*

* cited by examiner

Primary Examiner—James P. Trammell
Assistant Examiner—Jalatee Worjloh
(74) Attorney, Agent, or Firm—Oliff & Berridge, PLC

(57) ABSTRACT

Booking venders are to be enabled to issue booking certificates without having to consume their own resources. Advance booking is made and sent to a retailer from a consumer terminal via the Internet. The retailer requests a booking certificate issuing center to issue a booking certificate associated with the product or the booking party, and receives the booking certificate issued from the booking certificate issuing center. The consumer terminal receives the booking certificate from the retailer via the Internet, and uses it to have itself verified to be the legitimate booking party by a verifying apparatus associated with a provider. The booking party can receive the supply of the booked product or service if its booking certificate is successfully verified.

35 Claims, 32 Drawing Sheets

FIG.6

| PROVIDER IDENTIFIER |
|---|
| PRV10001 |
| PRV10002 |
| PRV10003 |
| ... |

FIG.7

| PUBLIC KEY IDENTIFIER | MODULUS | PUBLIC KEY | PRIVATE KEY | PROVIDER IDENTIFIER | START OF EFFECTIVE PERIOD | END OF EFFECTIVE PERIOD | ISSUANCE DATE |
|---|---|---|---|---|---|---|---|
| PK00001 | 10110... | 11001... | 10101... | PRV10001 | 2000.1.1 | 2001.1.1 | 2000.12.1 |
| PK00002 | 10010... | 11110... | 11011... | PRV10003 | 1999.3.5 | 2000.2.3 | 2000.1.2 |
| PK00003 | 11111... | 10000... | 10101... | PRV10001 | 1999.11.1 | 2000.5.1 | 2000.3.1 |
| ... | ... | ... | ... | ... | ... | ... | ... |

FIG.9

| CONSUMER IDENTIFIER | CONSUMER PRIVATE INFORMATION |
|---|---|
| CNS10001 | 10110... |
| CNS10002 | 11000... |
| CNS10003 | 01110... |
| ... | ... |

FIG.8

| RETAILER IDENTIFIER |
|---|
| RTL10001 |
| RTL10002 |
| RTL10003 |
| ... |

FIG.10

| PUBLIC KEY IDENTIFIER | PROVIDER IDENTIFIER | CONSUMER IDENTIFIER | INTERMEDIARY IDENTIFIER | BOOKING CONDITIONS | ISSUANCE DATE |
|---|---|---|---|---|---|
| PK00001 | PRV10001 | CNS10001 | RTL10002 | 2F34A... | 2000.2.1 |
| PK00002 | PRV10003 | CNS10001 | RTL10002 | 44FBC... | 1999.4.16 |
| PK00002 | PRV10003 | CNS10003 | RTL10001 | 5AAB1... | 1999.11.12 |
| ... | ... | ... | ... | ... | ... |

FIG.14

| PUBLIC KEY IDENTIFIER | MODULUS | PUBLIC KEY | START OF EFFECTIVE PERIOD | END OF EFFECTIVE PERIOD | USE |
|---|---|---|---|---|---|
| PK00001 | 10110... | 11001... | 2000.1.1 | 2001.1.1 | TT3 ADMISSION TICKET |
| PK00003 | 11111... | 10000... | 1999.11.1 | 2000.5.1 | MILLENNIUM WATCH BLACK |
| PK00007 | 11000... | 10110... | 1999.8.1 | 2000.2.1 | CLASS S TICKET FOR JAN. 15, 2000 GWJr CONCERT |
| ... | ... | ... | ... | ... | ... |

FIG.19

| BOOKING CERTIFICATE INTERMEDIATION LICENSE IDENTIFIER | PUBLIC KEY IDENTIFIER | PROVIDER IDENTIFIER | BOOKING CERTIFICATE INTERMEDIATION LICENSE | PROVIDER CERTIFICATE |
|---|---|---|---|---|
| AGM01002 | PK00001 | PRV10001 | FF3AC4... | FE66B... |
| AGM03010 | PK00002 | PRV10003 | FF3CC2... | FEE4A... |
| AGM03034 | PK00008 | PRV10003 | FFF87A... | FE7DE... |
| ... | ... | ... | ... | ... |

FIG.20

| BOOKING CERTIFICATE IDENTIFIER | PUBLIC KEY IDENTIFIER | PROVIDER IDENTIFIER | CONSUMER IDENTIFIER | REQUESTER IDENTIFIER | BOOKING CONDITIONS | DATE AND TIME OF REQUEST | DATE AND TIME OF TRANSMISSION |
|---|---|---|---|---|---|---|---|
| TKT10004 | PK00001 | PRV10001 | CNS10006 | CNS10006 | 2F34A... | 2000.2.1 10:25 | 2000.2.1 10:27 |
| TKT10010 | PK00008 | PRV10003 | CNS10003 | RTL10024 | 44FBC... | 2000.2.16 18:03 | 2000.2.16 18:04 |
| | PK00001 | PRV10001 | CNS10012 | CNS10012 | 5AAB1... | 2000.3.1 03:54 | |
| ... | ... | ... | ... | ... | ... | ... | ... |

FIG.34

| BOOKING CERTIFICATE INTERMEDIATION LICENSE IDENTIFIER | PUBLIC KEY IDENTIFIER | RETAILER IDENTIFIER | BOOKING CONDITIONS LIMITATION INFORMATION | START OF EFFECTIVE PERIOD | END OF EFFECTIVE PERIOD | ISSUANCE DATE |
|---|---|---|---|---|---|---|
| AGM01002 | PK00001 | RTL10001 | FF3AC4... | 1999.12.1 | 2000.11.31 | 1999.12.1 |
| AGM03010 | PK00002 | RTL10003 | FF3CC2... | 2000.1.1 | 2000.7.1 | 2000.1.1 |
| AGM03034 | PK00008 | RTL10003 | FFF87A... | 2000.3.4 | 2001.3.4 | 2000.3.3 |
| ... | ... | ... | ... | ... | ... | ... |

BOOKING CERTIFICATE ISSUING APPARATUS AND METHOD

BACKGROUND OF THE INVENTION

1. Field of the Invention

The present invention relates to a technique for booking in advance a tangible product or a service through a computer system, and more particularly to issuance of a booking certificate for certifying that a consumer has booked in advance a tangible product or a service and to legitimacy verification of the booking certificate.

2. Description of the Related Art

The method most extensively used today to allow the acquisition of a tangible product or the usage of a service, both often limited to a specific place or a specific time, independently of the place and/or time of the acquisition or the usage is the issuance of a booking certificate.

In selling a product item for which a rush of buyers is anticipated, it is a very extensively followed marketing practice to accept bookings in advance of its introduction to the market and, when it is introduced, to give priority to the consumers who booked for it in advance. To distinguish the consumers who did book from those who did not, something to certify the booking is issued. This booking certificate may be a piece of paper on which various items of information are printed or an identification number. The price of the product may be paid upon its delivery or at the time of advance booking.

In the supply of service, some of the most typical examples are advance tickets for cinemas and concerts, sold by ticket agencies ahead of scheduled presentation. In these cases, tickets, which are pieces of paper on which relevant information is printed, are the booking certificates.

Today, when computers have found their way into households and many consumers can have routine access to the Internet, various items have become available for booking through web sites opened on the Internet. Each site issues digital data, which serve as booking certificates, to the users who booked in advance an item of tangible product or service with the respective site. When the item is to be delivered to each booking consumer, he or she is required to present the data issued by the site, and if the data are found to be a legitimate booking certificate, the item will be delivered. This is the typical way of this kind of transaction.

Sales of goods and services through the Internet have given consumers the benefit of being able to book in advance the goods and services while staying at home. They also mean to the sellers of the goods and services the benefit of being able to expand their markets without having to pay the cost of maintaining physical stores, and this marketing channel is becoming indispensable especially for small venders who cannot afford to maintain large physical chains of stores.

At present, sales of goods and services through acceptance of bookings in advance via the Internet are carried out by individual venders independent of one another. Each vender manages its own site, where it generates and issues to consumers its own booking certificates. The vender, besides having to develop the system needed for issuing its booking certificates, has to bear the cost of managing the site that issues the certificates. Managing a system that handles booking certificates in the form of digital data, which are subject to the risk of being forged or copied, entails an enormous extra cost and thereby constitutes a high barrier to venders desiring to launch sales activities by accepting advance bookings via the Internet. This also imposes extra prices on the consumers who buy from these venders.

SUMMARY OF THE INVENTION

According to the present invention, these problems are solved by preparing a server to issue booking certificates (hereinafter to be referred to as the booking certificate issuing center or simply the center) on the Internet. The center is independent of any specific tangible product or service offered for sale by accepting advance booking. Moreover, the center is independent of any specific vender accepting advance booking. The booking certificate issuing center would take charge of everything relating to the preparation and maintenance of booking certificates. Venders offering goods or services by accepting advance booking (booking venders) could outsource to the booking certificate issuing center much of their workloads relating to booking certificates. Since many booking venders could use the common booking certificate issuing center, the development and operating costs of the booking certificate issuing center per booking vender could be kept lower than what they would have to pay if each of them had its own advance booking system.

According to the invention, each booking vender sends a booking certificate against each of the bookings that it receives from consumers. The booking certificates are issued by the booking certificate issuing center. Although each booking vender prepares on the Internet a server to accept bookings from consumers, the function to generate booking certificates is absent in this server. This function is performed by the booking certificate issuing center.

When a product or a service is to be delivered to the consumer who booked it, he or she will be required to present the booking certificate. The legitimacy of the certificate is then checked by using digital data, which are called verification information. The verification information is generated to satisfy a relational requirement with booking certificates, and the legitimacy of a given booking certificate is judged according to whether or not the booking certificate satisfies this requirement. If a specific product or a service is bound to a specific verification information, it can be judged whether or not a prospective buyer booked in a proper way according to whether or not the booking certificate he or she presents satisfies the requirement for a specific relationship with the pertinent verification information.

Verification information is generated by the center. Anybody who can use the pertinent verification information can check the legitimacy of a booking certificate.

This feature has an effect to further reduce the cost imposed on a vender undertaking a business to sell goods and/or services on an advance booking basis. The invention allows providers of goods and/or services and their booking venders to be viable independent of each other. A provider of goods and/or services, by commissioning retailing of the goods and/or services it deals in to many booking venders, can concentrate on the supply of those goods and/or services. A booking vender, even though it has no goods or services it can provide on its own, can attract advance bookings for many different goods and/or services available from many providers.

Some aspects of the present invention relate to the booking certificate center.

According to one aspect of the invention, there is provided a method for issuing electronic booking certificates each certifying that the supply of a tangible product or a service to a specific consumer is committed, including: a step to prepare verification information needed for checking the legitimacy of booking certificates; a step to input information for specifying the verification information; a step to prepare a booking certificate that can be verified by the verification information that can be specified by the inputted information; and a step to supply the booking certificate so prepared.

According to another aspect of the invention, there is provided a computer system for issuing electronic booking certificates each certifying that the supply of a tangible product or a service to a specific consumer is committed, including: a verification information preparing unit for preparing verification information needed for checking the legitimacy of booking certificates; a verification information output unit for supplying verification information prepared by the verification information preparing unit; a booking certificate preparing unit, into which information for specifying verification information is inputted, for preparing a booking certificate that can be verified by the verification information that is specified by the inputted information; and a booking certificate supplying unit for supplying the booking certificate prepared by the booking certificate preparing unit.

The booking certificate center according to either of these aspects of the invention issues not only booking certificates but also verification information for verifying booking certificates. This verification information is used for checking the legitimacy of a booking certificate presented by a consumer when delivering a product or a service. Since the set of booking certificates verifiable by specific verification information are limited, a different booking certificate can be issued for each specific item or product or service by allocation a different verification information to each specific item or product or service. However, the booking certificate center need not be concerned about which verification information matches a given item of product or service. The provider of each item of product or service can freely decide upon the linkage between a specific item of product or service and verification information. This enables the booking certificate issuing center to be an infrastructure concentrating on the issuance of booking certificates without being committed to any specific item or product or service.

Other aspects of the invention relate to a server for selling tangible products and services to consumers having booked for them in advance.

According to one of these aspects of the invention, there is provided a method for intermediating a request for an electronic booking certificate for certifying that the supply of a tangible product or a service to a specific consumer is committed, including: a step to receive a first booking certificate request, which is a request for the issuance of a booking certificate certifying that the supply of a tangible product or a service to a specific consumer is committed; a step to prepare a second booking certificate request, which is a step to request the issuance of a booking certificate requested by the first booking certificate request so received; and a step to supply the second booking certificate request so prepared.

According to the other of these aspects of the invention, there is provided a computer system for intermediating a request for an electronic booking certificate for certifying that the supply of a tangible product or a service to a specific consumer is committed, including: a booking certificate request receiving unit for receiving a first booking certificate request, which is a request for the issuance of a booking certificate certifying that the supply of a tangible product or a service to a specific consumer is committed; a booking certificate request preparing unit for preparing a second request for a booking certificate, which is a request for the issuance of a booking certificate requested by the first request for booking certificate so received; and a booking certificate request output means for supplying the second request for booking certificate prepared by the booking certificate request preparing unit.

A server, to which either of these aspects of the invention is applied, for selling tangible products and services to consumers having booked for them in advance accepts a request for the issuance of a booking certificate from a consumer or another booking vender connected to the Internet. However, it is not this server that prepares the booking certificate covered by the accepted request. Booking certificates are issued only by the booking certificate issuing center, and the server for selling products and services on an advance booking basis only intermediates the issuance of booking certificates. What the server does is confined to the intermediation of requests, and it is the responsibility of the center to provide some protection against such violations as the alteration, forging and copying of booking certificates. So, the costs of architecture and operation of any server engaged in the marketing of goods and/or services in accordance with these aspects of the invention can be kept much lower than otherwise.

Other aspects of the invention relate to a provider of products and services.

Where there exist providers of goods and/or services and their booking venders independent of each other, it would be basically more favorable for each provider to have the goods and/or services it offers for sale sold by a greater number of booking venders. However, having its products and/or services handled by unreliable booking venders would be liable to invite subsequent troubles and accordingly impermissible. Therefore, the provider needs a means by which it can limit booking venders who are authorized to handle the goods and/or services available from the provider.

According to one of these aspects of the invention, there is provided a method for approving intermediation of a request for an electronic booking certificate for certifying that the supply of a tangible product or a service to a specific consumer is committed, including: a step to input information for specifying an intermediary to intermediate a request for a booking certificate regarding a product or a service; a step to input information for specifying the product or service regarding which intermediation is licensed for the intermediary; a step to prepare a booking certificate intermediation license certificate to certify that intermediation of the request for a booking certificate regarding the product or service specified by an input is licensed for an intermediary specified by another input; and a step to supply the booking certificate intermediation license certificate so prepared.

According to the other of these aspects of the invention, there is provided a computer system for approving intermediation of a request for an electronic booking certificate for certifying that the supply of a tangible product or a service to a specific consumer is committed, including: a booking certificate intermediation license preparing unit, into which information for specifying an intermediary to intermediate a request for a booking certificate regarding a product or a service and information for specifying the product or service regarding which intermediation is licensed for the intermediary are inputted, for preparing a booking certificate intermediation license to certify that intermediation of the request for a booking certificate regarding the product or service specified by an input is licensed for an intermediary specified by another input; and a booking certificate intermediation license output unit for supplying a booking certificate intermediation license prepared by the booking certificate intermediation license preparing unit.

According to these aspects of the invention, a provider of goods and/or services issues a booking certificate intermediation license to each booking vender authorized to sell on an advance booking basis the goods and/or services offered by the provider. This booking certificate intermediation license is presented by the booking vender to the center when it requests the center to issue a booking certificate. The center can check, according to the booking certificate intermediation license so presented, whether or not the booking vender presenting it is authorized to sell on an advance booking basis the product of service regarding which the issuance of a booking certificate is requested.

Other aspects of the invention relates to verification of booking certificates.

According to one of these aspects of the invention, there is provided a method for checking the legitimacy of an electronic booking certificate for certifying that the supply of a tangible product or a service to a specific consumer is commiitted, including: a step to store verification information for checking the legitimacy of booking certificates; a step to input a booking certificate; and a step to check the legitimacy of the inputted booking certificate by using the stored verification information.

According to the other of these aspects of the invention, there is provided an apparatus for checking the legitimacy of an electronic booking certificate for certifying that the supply of a tangible product or a service to a specific consumer is committed, including: a verification information storage unit for storing verification information for checking the legitimacy of booking certificates; and a booking certificate checking unit, to which a booking certificate is inputted, for checking the legitimacy of the booking certificate by using the verification information stored in the verification information storage unit.

Incidentally, although the invention is intended to enable an infrastructure to issue booking certificates independently of booking venders, it is obviously acceptable for a certificate issuing center affiliated with booking venders or providers of goods and/or services to issue booking certificates by availing itself of the invention. Also, providers directly selling goods and/or services can use the booking certificate issuing according to the invention.

Certificates may be issued via some other means of communication than the Internet, such as telephone lines. Further, certificates may as well be exchanged between apparatuses via a portable recording medium.

An advance booking in this context is an expression of a desire to receive the supply of a product or a service in the future. Therefore, the booking need not be made before the product or the service becomes commercially available. This invention can be used for the delivery of a product or a service take place some time after it is booked, For instance, if the buyer offers to buy a certain product at a certain point of time and receives it a few days later at his or her own home or a nearby convenience store, this still can be an advance booking in this context.

BRIEF DESCRIPTION OF THE DRAWINGS

The above and other features and advantages of the present invention will become more apparent from the following detailed description when taken in conjunction with the accompanying drawings wherein:

FIG. 6 illustrates the structure of a provider DB provided in the booking certificate issuing center to which the invention is applied;

FIG. 7 illustrates the structure of a public key pair DB provided in the booking certificate issuing center to which the invention is applied;

FIG. 8 illustrates the structure of a retailer DB provided in the booking certificate issuing center to which the invention is applied;

FIG. 9 illustrates the structure of a consumer DB provided in the booking certificate issuing center to which the invention is applied;

FIG. 10 illustrates the structure of a booking certificate issuance history DB provided in the booking certificate issuing center to which the invention is applied;

FIG. 14 illustrates the structure of a verification public key DB in the provider to which the invention is applied;

FIG. 19 illustrates the structure of a booking certificate intermediation license DB provided in the retailer to which the invention is applied retailer;

FIG. 20 illustrates the structure of a booking certificate intermediation license DB provided in the retailer to which the invention is applied;

FIG. 34 illustrates the structure of a booking certificate intermediation license issuance history DB in a provider to which the invention is applied.

DETAILED DESCRIPTION OF THE PREFERRED EMBODIMENT

A preferred embodiment of the present invention will be described below.

Figure 1:
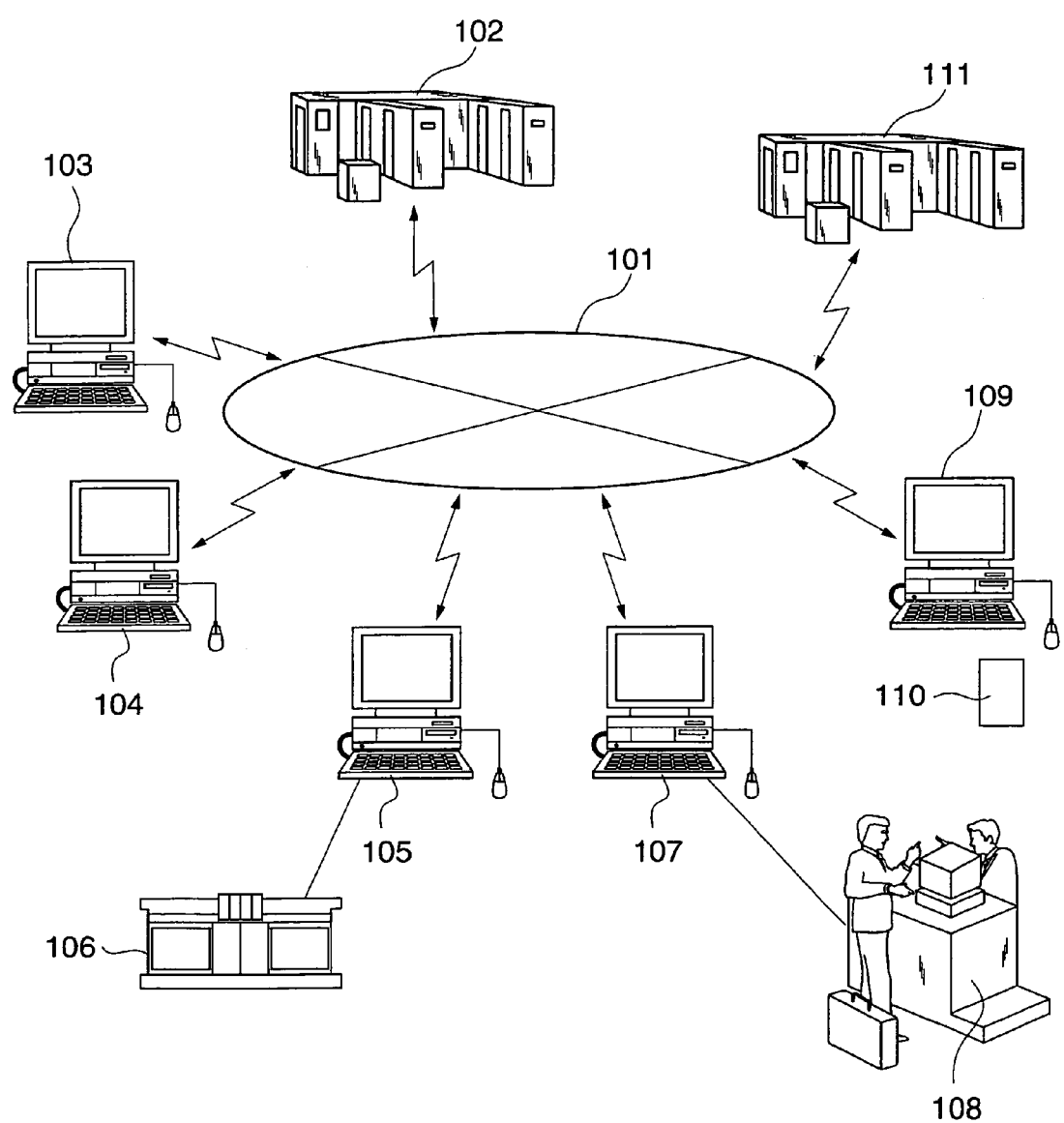
FIG. 1 illustrates the configuration of a preferred embodiment of the invention.

FIG. 1 illustrates the configuration of a preferred embodiment of the present invention. This embodiment has plural computer systems connected to the Internet, and their coordinated operation enables goods and/or services to be sold on an advance booking basis.

Where this embodiment is at work, a consumer books a product or a service in advance via the Internet, and receives a booking certificate, made up of digital data certifying that his or her booking has been completed. The consumer, after storing the received booking certificate into a portable memory unit, such as an IC card, carries it to where the booked product or service is to be delivered. The place where the consumer receives the delivery of the product or the service, a verifying device, to which the portable memory unit can be connected, for checking the booking certificate is installed. If the legitimacy of the booking certificate is verified by this device, the product or the service will be delivered to the consumer.

[Group of Computer Systems Constituting the Embodiment]

The computer systems constituting this embodiment of the invention can be classified into the following four types, each of which is connected to the Internet 101 for mutual communication.

Consumer terminal: This is a computer system for use by the consumer to book a product or a service in advance, and corresponds to 109 in FIG. 1. It may be a computer used by the consumer at home or a terminal installed in a convenience store. It is connected to the Internet 101, and can access other computer systems via the Internet 101.

The consumer terminal 109 allows connection of a portable memory unit, such as an IC card. The consumer's portable memory unit 110 is connected to it to enable the booking certificate acquired by the consumer to be recorded into the portable memory unit 110. A laptop computer or a portable telephone set may as well be used so the functions of both a consumer terminal and a portable memory unit can be performed by a single device.

Although a single consumer terminal is shown in FIG. 1, numberless similar consumer terminals connected to the Internet are used as consumer terminals.

The portable memory unit held by the consumer using the consumer terminal stores a consumer identifier for identifying the consumer and consumer private information whose value is kept secret from even the consumer who is the owner of the portable unit.

Pairs each of a consumer identifier and consumer private information are held by the center for use in the generation of booking certificates.

Retailer: This is a computer system for selling goods and/or services to consumers on an advance booking basis, and corresponds to 103 or 104 in FIG. 1, and actually any number of retailers may be present on the network. It is connected to the Internet 101, and is accessible by consumers via the Internet 101. Although a retailer in this context is a system operated by a merchant selling goods and/or services on an advance booking basis, in the following description no distinction will be made between a retailing computer system and the retail merchant operating it. Both will be referred to as retailers.

Booking certificate issuing center: This is a computer system that generates and issues booking certificates, and corresponds to 102 in FIG. 1. It is connected to the Internet 101, accepts requests for booking certificates via the Internet, and generates and issues booking certificates on demand.

Provider: This is a computer system for use by the supplier of goods and/or services to exchange information with the retailer or the center, and is connected to the Internet 101. It corresponds to 105 or 107 in FIG. 1. Actually, any number of providers may be present on the network. In the following description, no distinction will be made between a supplier of goods and/or services and a computer system operated by the supplier, and both will be referred to as providers.

Certifying Authority (CA): Messages sent to and from consumer terminals, retailers, the center and providers are digitally signed to detect any alteration and to refuse negation. The legitimacy of the public key for verifying the digital signature is ensured by an X.509-based public key certificate. The certifying authority 111, which is a computer system having a function to prepare and issue such public key certificates, is connected to the Internet 101. The certifying authority issues public key certificates and holds them, and has a function to send one to a person having demanded it. The certifying authority will be hereinafter abbreviated to CA.

[Booking Certificates and Verification Public Keys]

Where this embodiment of the invention is employed, a set of digital data known as a booking certificate is issued to certify that the consumer holding the certificate booked a product or a service in advance. The legitimacy of the booking certificate is checked with a corresponding verification public key. As the term "verification public key" suggests, a public key encrypting technique is applied to booking certificates and verification public keys in this embodiment.

More specifically, a verification public key is a public key in public key encryption, and a booking certificate is made up of data including booking value prepared on the basis of a private key matching the public key. Only when the private key used in preparing the booking value contained in the booking certificate is found matching the verification public key, the booking certificate can be confirmed to be legitimate. In no other case the booking certificate can be acknowledged to be legitimate.

Selling a product or a service on an advance booking basis using this embodiment requires a verification public key bound to the specific product or service to be booked in advance for sale. By binding a specific verification public key to a specific product or service, a booking certificate valid only for the specific product or service can be realized.

Applying a public key encrypting technique to the booking certificate and the verification public key is to enable the verification public key to be made public. If the verification public key is a public key, making it public does not injure the security of the booking certificate. This not only facilitates transmission/reception and management of the verification public key but also provides the additional benefit of enabling third parties to check the legitimacy of the booking certificate and thereby preventing otherwise possible subsequent trouble.

A verification public key is prepared by the center 102 at the request of a provider and, contained in data known as verification public key information, sent to the client. Upon receiving a request for the issuance of a verification public key, the center 102 prepares a new pair of public keys. After holding the generated keys together with a verification public key identifier, which is information for uniquely identifying the public key pair, delivers to the client verification public key information including the public keys and the verification public key identifier. The provider having received the verification public key information will be called the user of the verification public key information or of the verification public key contained in the verification public key information.

The center 102 has no part in the binding of the specific verification public key to a specific product or service. The party who determines the binding is the provider to whom the verification public key was issued, and the provider should hold information on the binding it has determined between the specific product or service and the verification public key.

The provider having been granted a verification public key sets the booking certificate for the product or the service matching that verification public key into the verifying device 106 or 108.

A consumer acquires a booking certificate for a specific product or service on the Internet via a retailer. The acquired booking certificate is stored into the consumer's portable memory unit. The consumer brings the portable memory unit to the place where the product or the service is to be delivered. He or she connects the portable memory unit to the verifying device 106 or 108 installed there to have the legitimacy of the booking certificate verified.

Where a tangible product item is to be sold on an advance booking basis, a booking certificate verifying device is installed at the delivery outlet of the item, and the goods are delivered to only those consumers whose booking certificates have been verified to be legitimate by the verifying device. The delivery outlet may be any place where the verifying device can be physically installed, such as a convenience store or a kiosk in a railway station.

Products available to consumers in these modes of carrying out the invention include paper tickets, such as admission tickets for concerts or cinemas, passenger tickets for trains or aircraft, or accommodation tickets for hotels. In these modes of implementation, the booking certificate verifying device may be installed at the box office of the concert hall or the theater, the counter of the station or the airport, or the travel agency, where the ticket is delivered after the booking certificate has been verified to be legitimate.

Or else, the verifying device and the product delivering function can be automatically interlocked and houses in a common box, which automatically discharges the product after the verification of the booking certificate as an automatic vending machine does.

Where the booked product is to be delivered to the buyer's place, the delivering person may carry a portable device for checking booking certificates. The person checks the legitimacy of the booking certificate held by the consumer before delivering the product to its supposed buyer, and delivers only when the booking certificate is successfully verified.

Where the subject of booking is a service of admission to a concert hall or a film theater, it is conceivable to mount a booking certificate verifying function on the entrance gate of the hall or the theater to check the legitimacy of the booking certificate borne by each consumer he or she enters the gate, and to admit only the bearers of successfully verified certificates.

Where the subject of booking is a service to make available a specific seat in a concert hall or a film theater, a booking certificate verifying function may be appended to the seat. Only the consumer whose booking certificate has been successfully verified by the verifying device of the seat will be allowed to occupy that particular seat. The same arrangement would be applicable to use of a specific seat of a train or an aircraft.

Another suitable mode of implementation for reservation of a specific seat in a concert hall or a film theater or on a train or an aircraft is to have attendants carry a portable verifying device each and move from seat to seat check whether or not the occupant of each seat has the legitimate booking certificate.

Where the service to be provided is making a hotel room available for use, a verifying device may be installed at the front desk of the hotel to check the legitimacy of booking certificates. Or if a verifying device is installed at the door of each room and interlocked with the lock of each room to allow the door to be unlocked only when the booking certificate carried by the supposed occupant of the room is successfully verified, there will be an additional effect of the reduce the workload on the front desk personnel. A similar arrangement can be applied for the use of lockers, warehouses or the like.

The product which is the subject of booking needs not be a physical object, but may be digital data or the like. For instance, the invention can be applied to booking of downloading of digital data of pieces of music, visual images or software on the Internet. In this case, the verifying device is realized as a site on the Internet, and the consumer presents his or her booking certificate to the verifying site on the Internet via a personal computer (PC) at home or a terminal installed in a convenience store or elsewhere. The site allows only the consumer whose booking certificate has been successfully verified to receive downloading of the booked data.

As the portable memory unit for storing the booking certificate, a memory unit card or an IC card having only a storage function can be used. A smart card having a calculating function can be used as well. It may be either a contact type or a non-contact type card. For installation at the entrance gates of a concert hall where a heavy congestion is anticipated, the use of non-contact type card is preferable.

A terminal that can be connected to the Internet and at the same time is portable, such as a portable telephone, also offers a preferable mode of mounting. The use of a portable device having a function for wireless communication is particularly suitable because it would be more convenient for consumers.

The data structure of the verification public key information is as follows.

Verification public key information::={
  Issuer field,
  Recipient field,
  Issue date field,
  Start date/time of effective period field,
  End date/time of effective period field,
  Verification public key identifier field,
  Public key information field,
  Digital signature field
}

Issuer field: The identifier of the center, which is the issuer of this verification public key information, is entered.

Recipient field: The identifier of the provider, who is the recipient of this verification public key information, is entered.

Issue date field: The issue date of this verification public key information is entered.

Start date/time of effective period field: The starting date/time of the effective period of this verification public key information is entered.

End date/time of effective period field: The ending date/time of the effective period of this verification public key information is entered.

Verification public key identifier field: The verification public key identifier assigned by the center to this verification public key is entered.

Public key information: The public key information used in checking a booking certificate is entered. It includes designation of the public key encryption algorithm and the value of the public key.

Digital signature field: The digital signature by the center, which is the issuer, covering all this verification public key information is entered.

The data structure of the booking certificate is as follows.

Booking certificate::={
  Issuer field,
  Recipient field,
  Issue date field,
  Booking certificate identifier field,
  Public key identifier field,
  Booking conditions field,
  Booking value field,
  Digital signature field
}

Issuer field: The identifier of the center, which is the issuer of this booking certificate, is entered.

Recipient field: The identifier of the consumer, who is the recipient of this booking certificate, is entered.

Issue date field: The issue date of this booking certificate is entered.

Booking certificate identifier field: The identifier assigned by the center to this booking certificate is entered.

Public key identifier field: The verification public key identifier assigned to the verification public key matching this booking certificate is entered.

Booking conditions field: The booking conditions, which are the conditions to limit the extent of the effectiveness of the booking, are entered.

Booking value field: Data prepared on the basis of a private key matching the verification public key to which the identifier entered in the public key identifier field of this booking certificate is assigned is entered.

Digital signature field: The digital signature by the center, which is the issuer, covering all this booking certificate is entered.

As the booking conditions, conditions for limiting the extent of the effectiveness of booking with this booking certificate are entered.

The data structure of the booking conditions is as follows.

Booking conditions::={
  Start date/time of effective period field,
  End date/time of effective period field,
  . . .
}

Start date/time of effective period field: The starting date/time of the effective period of this booking certificate is entered.

End date/time of effective period field: The ending date/time of the effective period of this booking certificate is entered.

At the time of checking the booking certificate, it is checked whether or not the conditions stated in the "Booking conditions" are satisfied. Unless these conditions are not satisfied, verification of the booking certificate will be unsuccessful.

The booking conditions may include various other conditions according to the purpose of the booking certificate than the starting date/time and the ending date/time of the effective period.

For instance, if the booking certificate is to reserve a specific seat in a concert or some other event or on a train or an aircraft, the reservation of that particular seat with the booking certificate can be certified by including that seat number as one of the booking conditions. If merely admission to a specific event or boarding a specific train or aircraft is to be booked, the title of the event or the train or flight number can be designated as one of the booking conditions. If the date/time of the event or boarding has to be specified, that date/time can be designated as one of the booking conditions.

Where the object of booking is a product bearing a specific name or number, that specific name or number can be designated as one of the booking conditions.

Where the consumer is to be charged a fee at the delivery counter when the booked product or service is to be delivered to him or her, it is conceivable to make an arrangement that the sum of the fee be designated as one of the booking conditions. The booking certificate be successfully verified only if that sum of the fee is paid at the delivery counter for the product or service. Similarly, it is also possible to designate a price discount as one of the booking conditions. Where points, such as mileage points, are to be given to the consumer at the time of delivering the booked product or service, the number of points to be given can be designated as one of the booking conditions.

A configuration is also conceivable in which information to specify the verifying device for the booking certificate or the verifier is designated as one of the booking conditions, and only the designated device or verifier can successfully verify the booking certificate.

[Booking Value]

The booking value is a data item contained in a booking certificate. The data, prepared on the basis of the private key matching the verification public key prepared by the center, ensure that the booking certificate match only the specific verification public key. In preparing a booking value, consumer private information, which is secret information held by each consumer, and the booking conditions entered in the booking certificate are also used. This is for ensuring that only a specific consumer can use the booking certificate and that it can be used only when specific booking conditions are satisfied.

The public key encryption algorithm used in this embodiment is RSA. A booking value t is prepared in accordance with the following equation (1) where n is the modulus, e is the public key, d is the private key, u is the consumer private information, and 1 is a booking condition.

$$t = d - f(n, e, u, 1) \qquad (1)$$

The function f( ) here is a public one-way function. As this function, a cryptographic one-way hash function, such as SHA-1 or MD5, is used.

As (1) reveals, the booking value t works equivalently to the private key d only when it is used together with the modulus n, the verification public key e, the consumer private information u and the booking condition 1. Replacement of any single term would prevent it from working equivalently to the private key d.

[Verification of a Booking Certificate]

Verification of a booking certificate is a process to check whether or not the booking value t can work equivalently to the private key d. A number of variations are conceivable for the method of verification.

Figure 28:
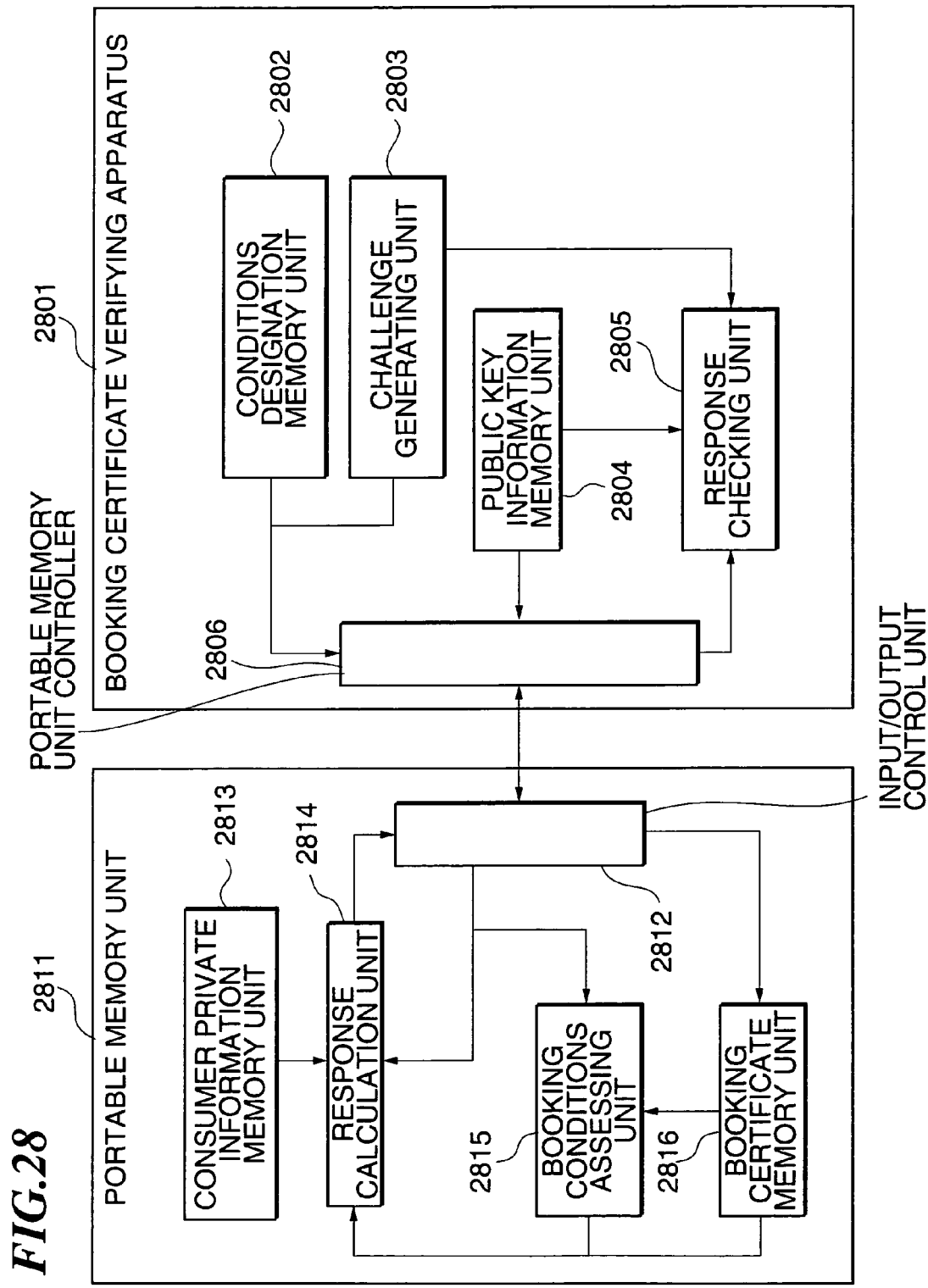
FIG. 28 illustrates a first example of configuration of a portable memory unit and a booking certificate verifying apparatus held by a consumer.

FIG. 28 illustrates an example of configuration of a portable memory unit and a booking certificate verifying apparatus where the portable memory unit held by a consumer has a computing function. This portable memory unit is realized with a smart card, a portable telephone, or a laptop PC in this case.

In FIG. 28, reference numeral 2801 denotes a booking certificate verifying apparatus, and 2811, a portable memory unit to be connected to the booking certificate verifying apparatus 2801. In this arrangement, the booking certificate verifying apparatus 2801 delivers a random value known as a challenge to the portable memory unit 2811. The portable memory unit 2811 calculates a value known as a response using the booking certificate stored in the portable memory unit and the challenge sent from the booking certificate verifying apparatus. The booking certificate verifying apparatus verifies the legitimacy of the booking certificate stored in the portable memory unit by verifying the correctness of the response.

The booking certificate verifying apparatus 2801 is provided with a conditions designation memory unit 2802, a challenge generating unit 2803, a public key information memory unit 2804, a response checking unit 2805, and a portable memory unit controller 2806.

The role of each constituent part of the booking certificate verifying apparatus 2801 will be described below.

Conditions designation memory unit 2802: Where the booking certificate verifying apparatus 2801 is so configured that a booking certificate is successfully verified only when booking conditions entered in the booking certificate satisfy specific conditions, designations concerning the booking conditions are held there.

Challenge generating unit 2803: It generates challenges to be delivered to the portable memory unit 2811.

Public key information memory unit 2804: It holds the identifier, the modulus and the public key of the verification public key assigned to this booking certificate verifying apparatus.

Response checking unit 2805: It checks the correctness of the response prepared by the portable memory unit 2811.

Portable memory unit controller 2806: It controls exchanges of information with the portable memory unit 2811.

Further, the portable memory unit 2811 is provided with an input/output control unit 2812, a consumer private information memory unit 2813, a response calculating unit 2814, a booking conditions assessing unit 2815, and a booking certificate memory unit 2816.

The role of each constituent part of the portable memory unit 2811 will be described below.

Input/output control unit 2812: It controls the data inputting to and outputting from the booking certificate verifying device 2801.

Consumer private information memory unit 2813: It holds consumer private information.

Response calculating unit 2814: It calculates responses to be delivered to the booking certificate verifying apparatus 2801.

Booking conditions assessing unit 2815: It assesses whether or not the booking conditions entered in the booking certificate are satisfied.

Booking certificate memory unit 2816: It holds plural booking certificates.

Figure 29:
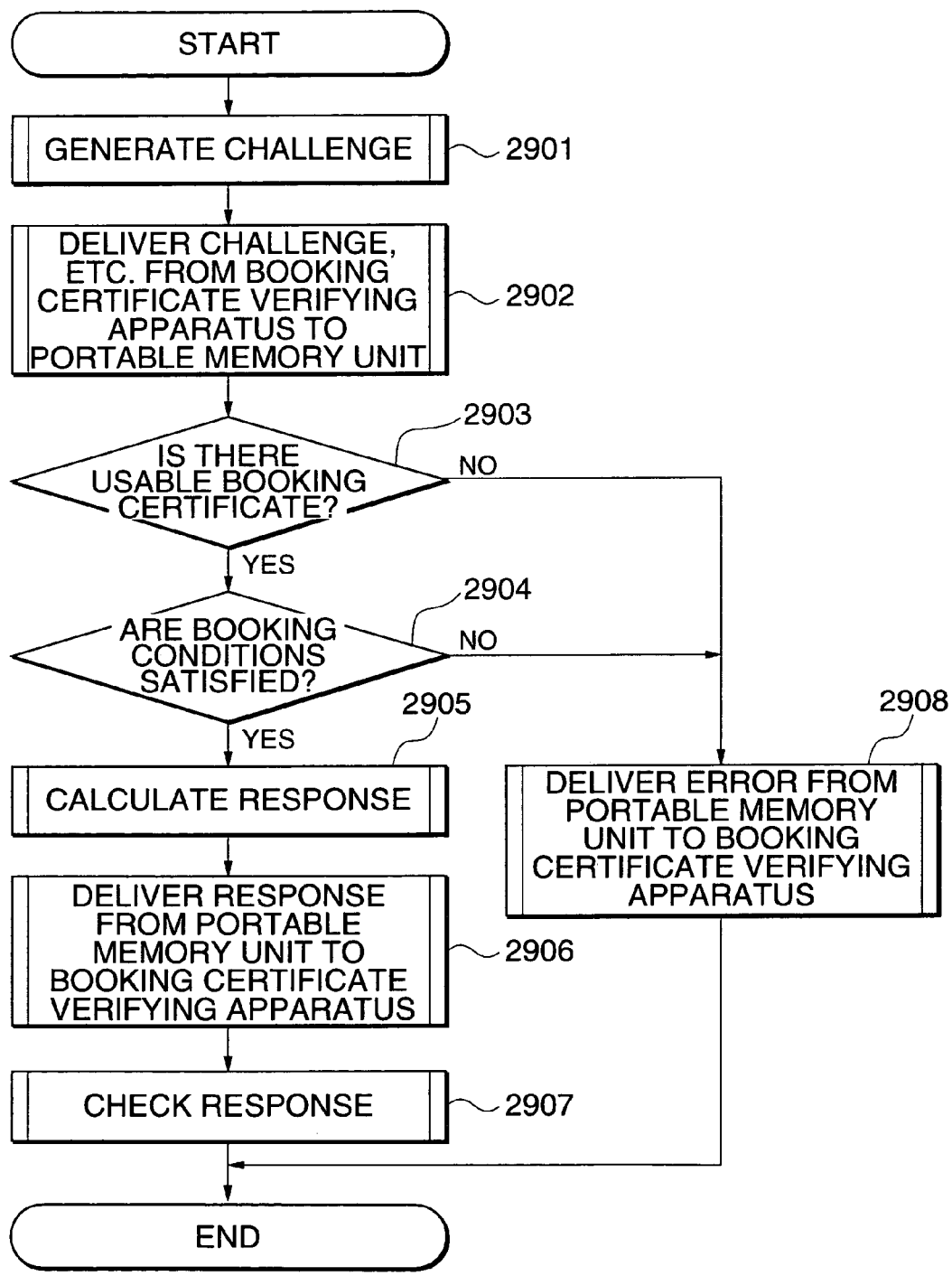
FIG. 29 is a flowchart showing the operation of the portable memory unit and the booking certificate verifying apparatus in checking a booking certificate in the first example of configuration of the portable memory unit held by a consumer and the booking certificate verifying apparatus.

FIG. 29 is a flowchart showing the operation of the booking certificate verifying apparatus 2801 and the portable memory unit 2811 in checking a booking certificate. The operation of the booking certificate verifying apparatus 2801 and the portable memory unit 2811 in checking a booking certificate will be described below with reference to FIG. 29.

Operation to verify a booking certificate is started by the booking certificate verifying apparatus 2801.

First, the challenge generating unit 2803 prepares a challenge C (2901). A challenge is a random value that varies every time verification is done, and the challenge generating unit 2803 has a random generating function built into it.

After a challenge is generated, the identifier ID, the modulus n and the public key e of the verification public key held by the public key information memory unit 2804, the condition designation s held by the conditions designation memory unit 2802, and the generated challenge C are delivered to the portable memory unit 2811 via the portable memory unit controller 2806 (2902).

The portable memory unit 2811 having received C, ID, n, e and s first selects, out of the booking certificates held by the booking certificate memory unit 2816, what matches the verification public key identifier ID (2903). This selection is accomplished by checking whether or not any one of the booking certificates held by the booking certificate memory unit 2816 has a public key identifier field equal to the ID. If no such booking certificate is found here, an error notice is delivered to the booking certificate verifying apparatus 2801 via the input/output control unit 2812 to end the operation (2908).

If a booking certificate meeting the requirement is found, the booking conditions assessing unit 2815 checks whether or not the booking condition 1 contained in the booking certificate is satisfied (2904). To check the start and end requirements of the effective period of the booking certificate entered in the booking condition 1, the booking conditions assessing unit 2815 has a built-in clock. In addition, where the condition designation s is entered from the booking certificate verifying apparatus 2801, it is also judged whether or not the condition designation s satisfies the booking condition 1. If, for instance, the booking certificate verifying apparatus 2801 is installed on a seat in a concert hall and it is desired that only the booking certificate having the number of that seat as a booking condition be legitimate, the seat number can be stored in the conditions designation memory unit 2802 as the condition designation, the number be delivered to the portable memory unit 2811 as s, and the booking conditions assessing unit 2815 check whether or not the booking condition 1 contains the seat number entered in the condition designation s.

If it is judged at 2904 that the booking condition 1 is not satisfied, an error notice is delivered to the booking certificate verifying apparatus 2801 via the input/output control unit 2812 to end the operation (2908).

If it is judged at 2904 that the booking condition 1 is satisfied, the response calculating unit 2814 calculates the response R (2905). The calculated response is delivered to the booking certificate verifying apparatus 2801 via the input/output control unit 2812 (2906). The response R is calculated in accordance with the following equation (2) from the challenge C, the modulus n and the public key e inputted from the booking certificate verifying apparatus 2801 via the input/output control unit 2812, the booking value t and the booking condition 1 contained in the booking certificate selected at 2903, and the consumer private information u held by the consumer private information memory unit 2813.

$$R = C^{t+f(n,\ e,\ u,\ l)} \bmod n \quad (2)$$

The booking certificate verifying apparatus 2801 having received the response R via the portable memory unit controller 2806 checks the legitimacy of the response R with the response checking unit 2805 (2907). For this checking are used the challenge C generated by the challenge generating unit 2803, and the modulus n and the public key e stored in the public key information memory unit 2804 in addition to the response R. If the following equation (3) holds, the verification is successful, or if not, it is a failure.

$$C = R^e \bmod n \quad (3)$$

As is evident from (1), (2) and (3), verification can be successful only when the combination of the modulus, public key, booking value, booking conditions and consumer private information is right. Invasion is difficult whether by diverting the booking certificate of a product or a service having a different verification public key, by using somebody else's booking certificate or by falsely altering the booking conditions.

Figure 30:
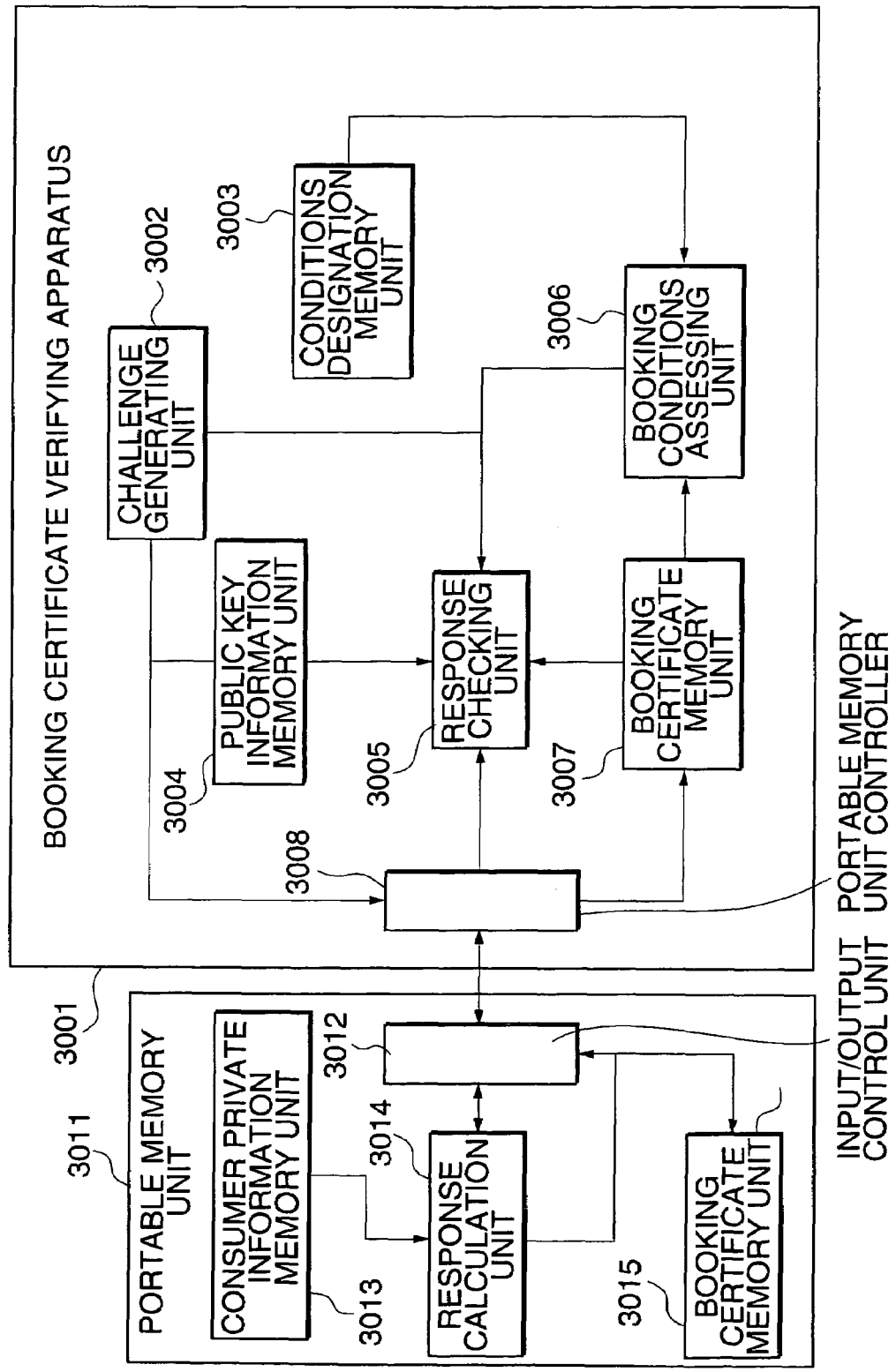
FIG. 30 illustrates a second example of configuration of a portable memory unit held by a consumer and a booking certificate verifying apparatus.

FIG. 30 illustrates another example of configuration of a portable memory unit and a booking certificate verifying apparatus where the portable memory unit held by the consumer has a computing function.

In FIG. 30, reference numeral 3001 denotes a booking certificate verifying apparatus and 3011, a portable memory unit connected to the booking certificate verifying apparatus 3001. The booking certificate verifying apparatus 3001 delivers a random value known as a challenge to the portable memory unit 3011. The portable memory unit 3011 calculates a value known as a response out of the received challenge. The legitimacy of the booking certificate that is held by the booking portable memory unit 3011 is verified by having the booking certificate verifying apparatus 3001 verify the correctness of the response. This configuration of FIG. 30 differs from that of FIG. 28 in that the booking value and the booking conditions contained in the booking certificate are used by the booking certificate verifying apparatus while they are used by the portable memory unit in the configuration of FIG. 28.

The booking certificate verifying apparatus 3001 is provided with a challenge generating unit 3002, a conditions designation memory unit 3003, a public key information memory unit 3004, a response checking unit 3005, a booking conditions assessing unit 3006, a booking certificate memory unit 3007, and a portable memory unit controller 3008.

The role of each constituent part of the booking certificate verifying apparatus 3001 will be described below.

Challenge generating unit 3002: It generates challenges to be delivered to the portable memory unit 3011.

Conditions designation memory unit 3003: Where the booking certificate verifying apparatus 3001 is so configured that a booking certificate is successfully verified only when booking conditions entered in the booking certificate satisfy specific conditions, designations concerning the booking conditions are held there.

Public key information memory unit 3004: It holds the identifier, the modulus and the public key of the verification public key assigned to this booking certificate verifying apparatus.

Response checking unit 3005: It checks the correctness of the response prepared by the portable memory unit 3011.

Booking conditions assessing unit 3006: It assesses whether or not the booking conditions entered in the booking certificate are satisfied.

Booking certificate memory unit 3007: It holds the booking certificate taken out of the portable memory unit 3011.

Portable memory unit controller 3008: It controls exchanges of information with the portable memory unit 3011.

Further, the portable memory unit 3011 is provided with an input/output control unit 3012, a consumer private information memory unit 3013, a response calculating unit 3014, and a booking certificate memory unit 3015.

The role of each constituent part of the portable memory unit 3011 will be described below.

Input/output control unit 3012: It controls the data inputting to and outputting from the booking certificate verifying apparatus 3001.

Consumer private information memory unit 3013: It holds consumer private information.

Response calculating unit 3014: It calculates responses to be delivered to the booking certificate verifying apparatus 3001.

Booking certificate memory unit 3015: It holds plural booking certificates.

Figure 31:
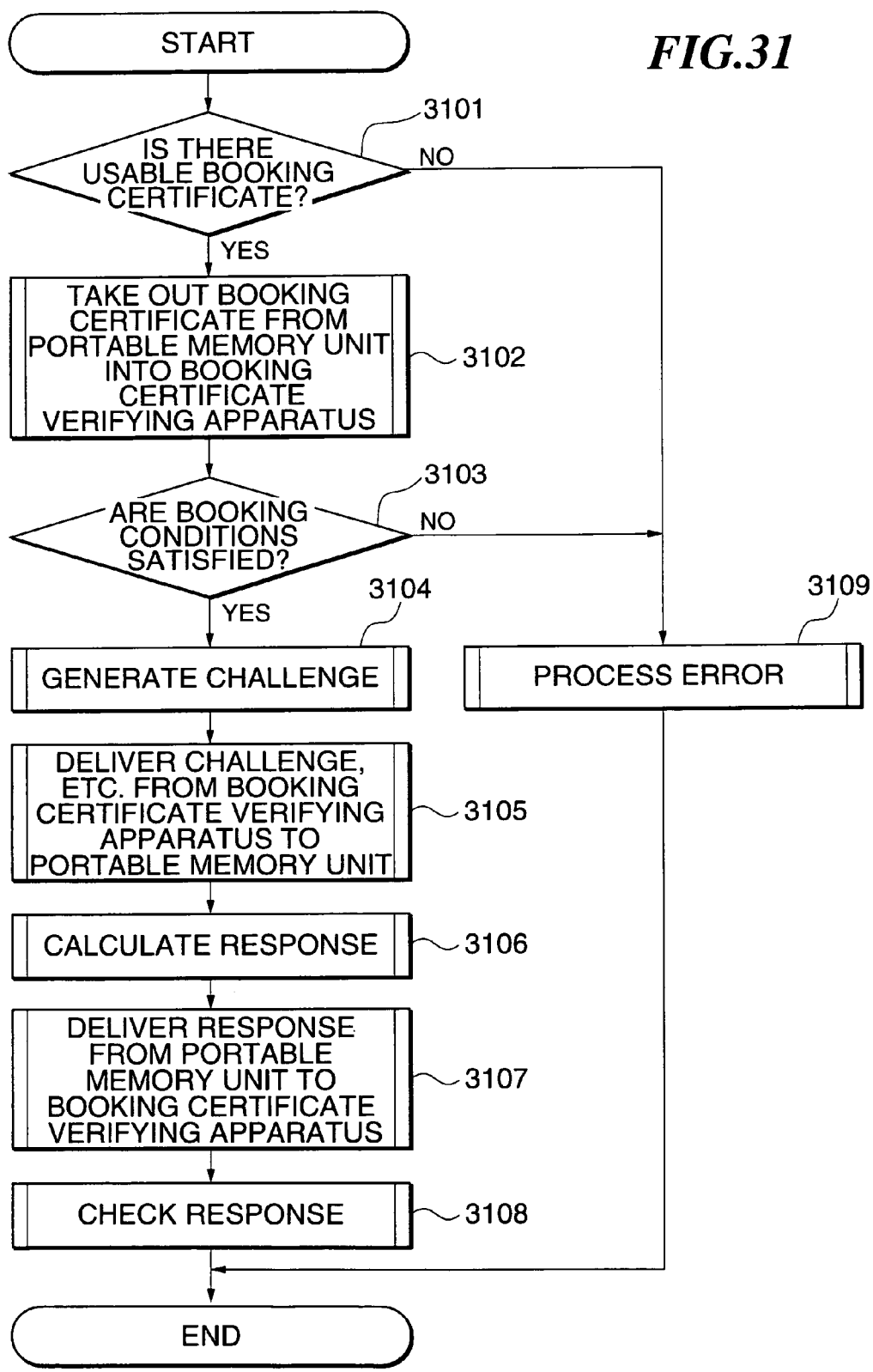
FIG. 31 is a flowchart showing the operation of the portable memory unit and the booking certificate verifying apparatus in checking a booking certificate in the second example of configuration of the portable memory unit held by a consumer and the booking certificate verifying apparatus.

FIG. 31 is a flowchart showing the operation of the booking certificate verifying apparatus 3001 and the portable memory unit 3011 in checking a booking certificate. The operation of the booking certificate verifying apparatus 3001 and the portable memory unit 3011 in checking a booking certificate will be described below with reference to FIG. 31.

Operation to verify a booking certificate is started by the booking certificate verifying apparatus 3001.

The booking certificate verifying apparatus 3001 accesses the booking certificate memory unit 3015 of the portable memory unit 3011 via the portable memory unit controller 3008, and searches for a booking certificate that can be, out of the booking certificates held by the booking certificate memory unit 3015, used for booking certificate verification by the booking certificate verifying apparatus 3001 (3101). Out of the booking certificates held by the booking certificate memory unit 3015, one of which the value of the public key identifier field is identical with the verification public key identifier held by the public key information memory unit 3004 is the booking certificate that is sought for. If no such booking certificate is found here, the attempt at booking certificate verification fails and, after error processing (3109), the operation is ended.

If a booking certificate meeting the requirement is found, the booking certificate is taken out, and stored into the booking certificate memory unit 3007 of the booking certificate verifying device 3001 (3102).

Next the booking conditions assessing unit 3006 checks whether or not the booking condition 1 contained in the booking certificate held by the booking certificate memory unit 3007 is satisfied (3103). To check the start and end requirements of the effective period of the booking certificate entered in the booking condition 1, the booking conditions assessing unit 3006 has a built-in clock. In addition, where a condition designation is held by the conditions designation memory unit 3003, it is also judged here whether or not the condition designation satisfies the booking condition 1. If, for instance, the booking certificate verifying device 3001 is installed on the door of a hotel room and it is desired that only the booking certificate having the number of that room as a booking condition be legitimate, the room number can be stored in the conditions designation memory unit 3003 as the condition designation, and the booking conditions assessing unit 3006 check whether or not the booking condition 1 contains the room number held by the conditions designation memory unit 3003.

If it is judged at 3103 that the booking condition 1 is not satisfied, the attempt at booking certificate verification fails and, after error processing (3109), the operation is ended.

If it is judged at 3103 that the booking condition 1 is satisfied, a challenge C is prepared by the challenge generating unit 3002 (3104). A challenge is a random value that varies every time verification is done, and the challenge generating unit 3002 has a random generating function built into it.

After a challenge is generated, the identifier ID, the modulus n and the public key e of the verification public key held by the public key information memory unit 3004, the booking condition 1 contained in the booking certificate stored in the booking certificate memory unit 3007, and the generated challenge C are delivered to the portable memory unit 3011 via the portable memory unit controller 3008 (3105).

The portable memory unit 3011 having received the challenge C calculates the response R with the response calculating unit 3014 (3106). The response R is delivered to the booking certificate verifying apparatus 3001 via the input/output control unit 3012 (3107). The response R is calculated in accordance with the following equation (4) from the challenge C, the modulus n, the public key e and the booking condition 1 inputted from the booking certificate verifying apparatus 3001 via the input/output control unit 3012, and the consumer private information u held by the consumer private information memory unit memory unit 3013.

$$R = C^{f(n,\ e,\ u,\ 1)} \bmod n \qquad (4)$$

The booking certificate verifying apparatus 3001 having received the response R via the portable memory unit controller 3008 checks the legitimacy of the response R with the response checking unit 3005 (3108). For this checking are used the challenge C generated by the challenge generating unit 3002, the modulus n and the public key e stored in the public key information memory unit 3004, and a booking value t contained in the booking certificate held by the booking certificate memory unit 3007 in addition to the response R. If the following equation (5) holds, the verification is successful, or if not, it is a failure.

$$C \equiv (C^t R)^e \bmod n \qquad (5)$$

As is evident from (1), (4) and (5), verification can be successful only when the combination of the modulus, public key, booking value, booking conditions and consumer private information is right. Invasion is difficult whether by diverting the booking certificate for a product or a service having a different verification public key, by using somebody else's booking certificate or by falsely altering the booking conditions.

Figure 32:
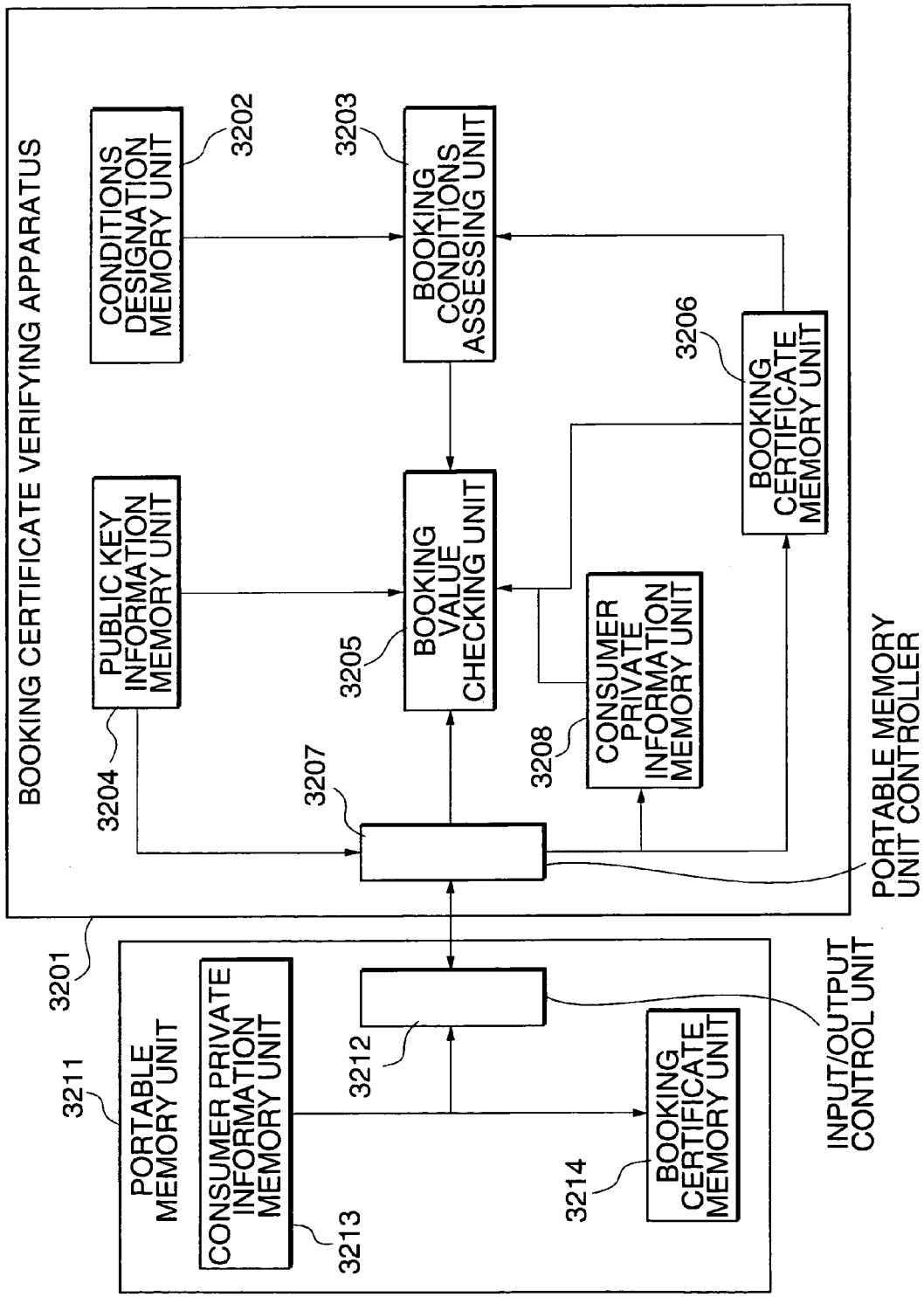
FIG. 32 illustrates a third example of configuration of a portable memory unit held by a consumer and a booking certificate verifying apparatus.

FIG. 32 illustrates another example of configuration of a portable memory unit and a booking certificate verifying apparatus where the portable memory unit held by the consumer has no computing function.

In FIG. 32, reference numeral 3201 denotes a booking certificate verifying apparatus and 3211, a portable memory unit connected to the booking certificate verifying apparatus 3201. The booking certificate verifying apparatus 3201 takes out a booking certificate that is held by the booking portable memory unit 3211 and checks its legitimacy.

The booking certificate verifying apparatus 3201 is provided with a conditions designation memory unit 3202, a booking conditions assessing unit 3203, a public key information memory unit 3204, a booking value checking unit 3205, a booking certificate memory unit 3206, a portable memory unit controller 3207, and a consumer private information memory unit 3208.

The role of each constituent part of the booking certificate verifying apparatus 3201 will be described below.

Conditions designation memory unit 3202: Where the booking certificate verifying apparatus 3201 is so configured that a booking certificate is successfully verified only when booking conditions entered in the booking certificate satisfy specific conditions, designations concerning the booking conditions are held there.

Booking conditions assessing unit 3203: It assesses whether or not the booking conditions entered in the booking certificate are satisfied.

Public key information memory unit 3204: It holds the identifier, the modulus and the public key of the verification public key assigned to this booking certificate verifying apparatus.

Booking value checking unit 3205: It checks the correctness of the booking value entered in the booking certificate.

Booking certificate memory unit 3206: It holds the booking certificate taken out of the portable memory unit 3211.

Portable memory unit controller 3207: It controls exchanges of information with the portable memory unit 3211.

Consumer private information memory unit 3208: It holds consumer private information taken out of the portable memory unit 3211.

Further, the portable memory unit 3211 is provided with an input/output control unit 3212, a consumer private information memory unit 3213, and a booking certificate memory unit 3214.

The role of each constituent part of the portable memory unit 3211 will be described below.

Input/output control unit 3212: It controls the data inputting to and outputting from the booking certificate verifying apparatus 3201.

Consumer private information memory unit 3213: It holds consumer private information.

Booking certificate memory unit 3214: It holds plural booking certificates.

Figure 33:
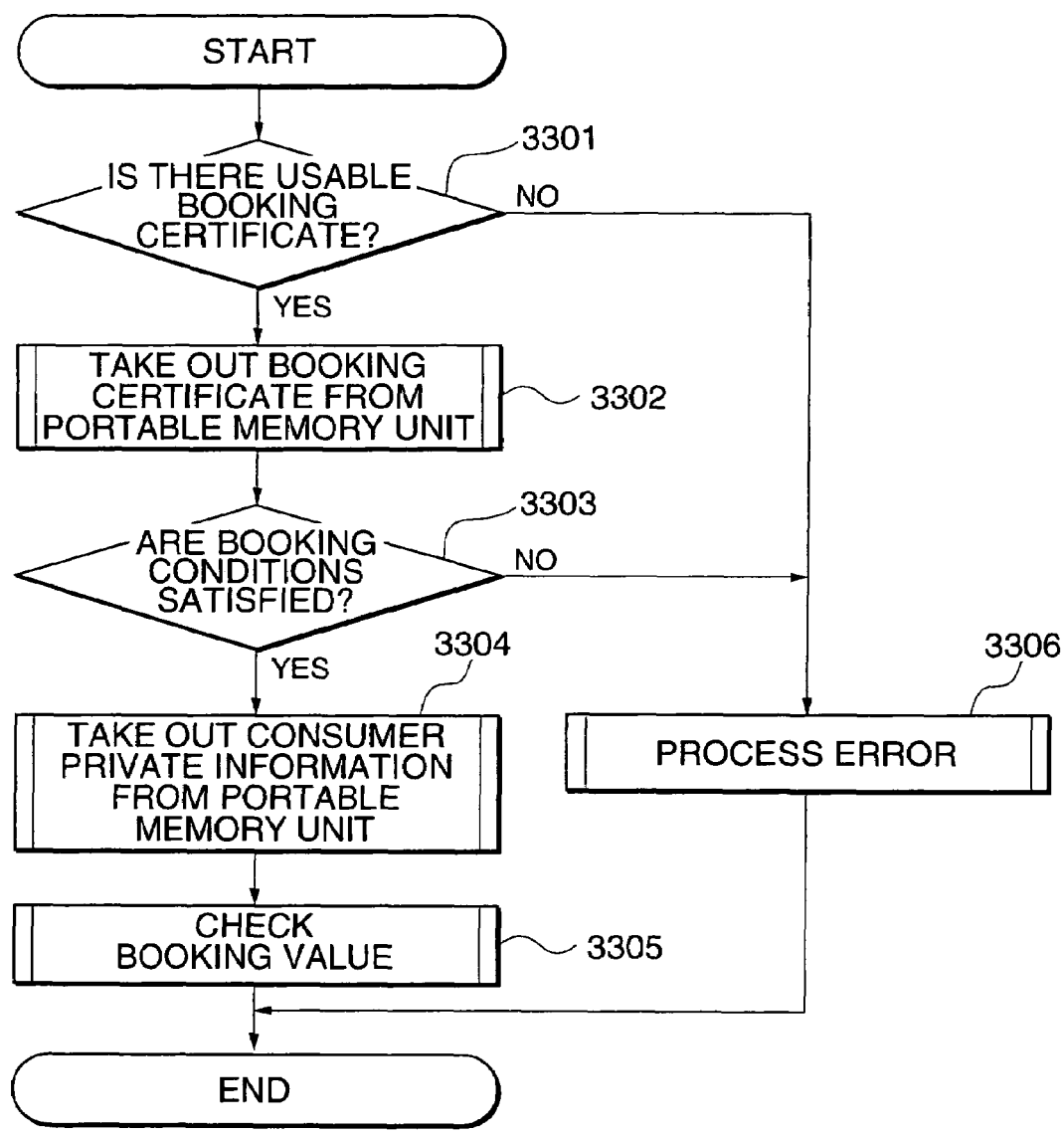
FIG. 33 is a flowchart showing the operation of the portable memory unit and the booking certificate verifying apparatus in checking a booking certificate in the third example of configuration of the portable memory unit held by a consumer and the booking certificate verifying apparatus.

FIG. 33 is a flowchart showing the operation of the booking certificate verifying apparatus 3201 and the portable memory unit 3211 in checking a booking certificate. The operation of the booking certificate verifying apparatus 3201 and the portable memory unit 3211 in checking a booking certificate will be described below with reference to FIG. 33.

The booking certificate verifying apparatus 3201 accesses the booking certificate memory unit 3214 of the portable memory unit 3211 via the portable memory unit controller 3207, and searches for a booking certificate that can be, out of the booking certificates held by the booking certificate memory unit 3214, used for booking certificate verification by the booking certificate verifying device 3201 (3301). Out of the booking certificates held by the booking certificate memory unit 3214, one of which the value of the public key identifier field is identical with the verification public key identifier held by the public key information memory unit 3204 is the booking certificate that is sought for. If no such booking certificate is found here, the attempt at booking certificate verification fails and, after error processing (3306), the operation is ended.

If a booking certificate meeting the requirement is found, the booking certificate is taken out, and stored into the booking certificate memory unit 3206 of the booking certificate verifying apparatus 3201 (3302).

Next the booking conditions assessing unit 3203 checks whether or not the booking condition 1 contained in the booking certificate held by the booking certificate memory unit 3206 is satisfied (3303). To check the start and end requirements of the effective period of the booking certificate entered in the booking condition 1, the booking conditions assessing unit 3203 has a built-in clock. In addition, where a condition designation is held by the conditions designation memory unit 3203, it is also judged here whether or not the condition designation satisfies the booking condition 1.

If it is judged at 3303 that the booking condition 1 is not satisfied, the attempt at booking certificate verification fails and, after error processing (3306), the operation is ended.

If it is judged at 3303 that the booking condition 1 is satisfied, the consumer private information memory unit 3213 of the portable memory unit 3211 is accessed via the portable memory unit controller 3207 to take out consumer private information u held in the consumer private information memory unit 3213. The accessed consumer private information is stored into the consumer private information memory unit 3208 of the booking certificate verifying apparatus 3201 (3304).

Finally, the booking value checking unit 3205 checks the legitimacy of the booking value t contained in the booking certificate held by the booking certificate memory unit 3206 (3305). For the verifying purpose, the booking value checking unit 3205 generates a random number r, and checks if the following equation (6) with respect to the modulus n and the public key e stored in the public key information memory unit 3204, the booking condition 1 contained in the booking certificate held by the booking certificate memory unit 3206, and the consumer private information u held by the consumer private information memory unit 3208.

$$r \equiv (r^{t+f(n,\ e,\ u,\ 1)})^e \bmod n \qquad (6)$$

As is evident from (1) and (6), verification of the booking value can be successful only when the combination of the modulus, public key, booking value, booking conditions and consumer private information is right. Invasion is difficult whether by diverting the booking certificate for a product or a service having a different verification public key, by using somebody else's booking certificate or by falsely altering the booking conditions.

[Issuance of Verification Public Key Information]

Verification public key information is prepared by the center at the request of a provider, and delivered to the requesting provider. At the time of requesting, a set of data known as a verification public key information request is transmitted and received. Although the sender usually is the requesting provider, and the receiver, the center accepting the request. Where some other entity connected to the Internet makes a request on behalf of the provider or accepts a request on behalf of the center, some other entity than the provider or the center may as well act as the sender or the receiver.

The data structure of the verification public key information request is as follows.

Verification public key information Request::={
  Sender field,
  Receiver field,
  Date/time field,
  Public key specifications field,
  Digital signature field,
  Certificate field
}

Sender field: The identifier of the sender of this request is entered. Although the sender usually is a provider, it may as well be another entity connected to the Internet.

Receiver field: The identifier of the receiver of this request is entered. Although the receiver usually is the booking certificate issuing center, it may as well be another entity connected to the Internet.

Date/time field: The date/time of the preparation of this request is entered.

Public key specifications field: The requester's requirements regarding the verification public key to be prepared by the center are entered. The identifier of the provider intending to use the verification public key, the public key encryption algorithm and information on the key length can be stated here.

Digital signature field: The digital signature by the sender for this request to endorse this request is entered.

Certificate field: A group of public key certificates including the public key for verifying the digital signature of the digital signature field of this request are entered.

The center having received the verification public key information request prepares a public key pair according to the public key specifications stated in the request, and prepares verification public key information, which is handed over to the provider, who is the requester. The center can decide whether or not the to prepare the requested verification public key information or whether or not to prepare the public key in conformity with the public key specifications stated in the request.

When the verification public key information is delivered, a set of data known as verification public key information delivery is transmitted and received. Although the sender usually is the booking certificate issuing center, which prepared the verification public key information, and the receiver usually is the provider to use the issued verification public key information. Where another entity connected to the Internet delivers the verification public key information on behalf of the booking certificate issuing center or receives the verification public key information on behalf of the provider, some other entity than the center or the provider may as well act as the sender or the receiver as the case may be.

The data structure of the verification public key information delivery is as follows.

Verification public key information delivery::={
  Sender field,
  Receiver field,
  Date/time field,
  Verification public key information field,
  Digital signature field,
  Certificate field
}

Sender field: The identifier of the sender of this verification public key information delivery is entered. Although the sender usually is the booking certificate issuing center, it may as well be another entity connected to the Internet.

Receiver field: The identifier of the receiver of this verification public key information delivery is entered. Although the receiver usually is a provider, it may as well be another entity connected to the Internet.

Date/time field: The date/time of the preparation of this verification public key information delivery is entered.

Verification public key information field: The verification public key information delivered by this verification public key information delivery is entered.

Digital signature field: The digital signature by the sender of this verification public key information delivery to endorse this verification public key information delivery is entered.

Certificate field: A group of public key certificates including the public key for verifying the digital signature field of this verification public key information delivery and the digital signature of the digital signature field of the verification public key information contained in this verification public key information delivery are entered.

[Booking Certificate Intermediation License]

In this embodiment, providers and retailers can be viable independently of each other. A retailer can offer for sale on an advance booking basis diverse tangible goods and/or services available from many different providers. It is also possible for a specific provider to have its goods and/or services sold by many retailers on an advance booking basis.

For a provider, it is basically an advantage to have its products sold by many retailers on an advance booking basis. But the provider cannot accept to have its products handled for advance booking by a retailer with whom the provider has no previous business relations or who is dubious in creditability because of the high risk of subsequent trouble. Therefore, the provider finds it necessary to qualify retailers who can handle the provider's goods and/or services.

To make this qualification possible, this embodiment uses a set of data called a booking certificate intermediation license.

A booking certificate intermediation license is a set of data that certifies that a provider has commissioned a specific retailer to sell its specific goods and/or services on an advance booking basis. A booking certificate intermediation license is prepared at the request of the retailer and delivered to the requesting retailer.

The data structure of the booking certificate intermediation license is as follows.

Booking certificate intermediation license::={
  Issuer field,
  Recipient field,
  Issue date field,
  Booking certificate intermediation license identifier field,
  Start date/time of effective period field,
  End date/time of effective period field,
  Verification public key identifier field,
  Booking conditions limitation information field,
  Digital signature field
}

Issuer field: The identifier of the provider, who is the issuer of this booking certificate intermediation license, is entered.

Recipient field: The identifier of the retailer, who is the recipient of this booking certificate intermediation license, is entered.

Issue date field: The issue date of this booking certificate intermediation license is entered.

Booking certificate intermediation license identifier field: The identifier assigned by the provider to this booking certificate intermediation license is entered.

Start date/time of effective period field: The starting date/time of the effective period of this booking certificate intermediation license is entered.

End date/time of effective period field: The ending date/time of the effective period of this booking certificate intermediation license is entered.

Public key identifier field: The verification public key identifier assigned to the verification public key for which intermediation of the booking certificate is approved by this booking certificate intermediation license is entered.

Booking conditions limitation information field: Booking conditions limitation information, which is information to limit the scope of booking conditions to be entered in the booking certificate, is entered.

Digital signature field: The digital signature by the provider, who is the issuer, covering all this booking certificate intermediation license is entered.

With the booking conditions limitation information entered in the booking conditions limitation information field, the provider can control in detail the booking conditions to be entered in the booking certificate issued by the retailer.

The data structure of the booking conditions limitation information is as follows.

Booking conditions limitation information::={
  Minimum effective period field,
  Maximum effective period field,
  . . .
}

Minimum effective period field: The minimum length of time between the start and the end of the effective period entered in the booking conditions field of the booking certificate, which is issued based on the booking certificate intermediation license including this booking conditions limitation information, is entered. The length of time between the start and the end of the effective period entered in the booking conditions field of the booking certificate should not be shorter than the value entered here.

Maximum effective period field: The maximum length of time between the start and the end of the effective period entered in the booking conditions field of the booking certificate, which is issued based on the booking certificate intermediation license including this booking conditions limitation information, is entered. The length of time between the start and the end of the effective period entered in the booking conditions field of the booking certificate should not be longer than the value entered here.

In the booking conditions limitation information, it is possible to set various limitations on selling the product and/or the service on advance booking base in besides the minimum effective period and the maximum effective period. For instance, where the verification public key designated in the public key identifier field, which is specified in the booking certificate intermediation license, matches the reservation of a seat in a concert and it is desired to limit the seat to be offer for sale by a specific retailer on an advance booking basis, the set of seat numbers the retailer is authorized to offer can be entered in the booking conditions limitation information field. The seat numbers to be entered in the booking conditions fields of booking certificates can be thereby limited.

[Issuance of Booking Certificate Intermediation License]

A booking certificate intermediation license is prepared by a provider at the request of a retailer, and delivered to the requesting retailer. When one is requested, a set of data known as a booking certificate intermediation license request is transmitted and received. Usually the sender is the requesting retailer, and the receiver, the provider accepting the request. Where some other entity connected to the Internet makes a request on behalf of the retailer or accepts a request on behalf of the provider, some other entity than the retailer or the provider may as well act as the sender or the receiver.

The data structure of a booking certificate intermediation license request is as follows.

Booking certificate intermediation license request::={
  Sender field,
  Receiver field,
  Date/time field,
  Booking certificate intermediation license specifications field,
  Digital signature field,
  Certificate field
}

Sender field: The identifier of the sender of this request is entered. Although the sender usually is a retailer, it may as well be another entity connected to the Internet.

Receiver field: The identifier of the receiver of this request is entered. Although the receiver usually is the provider, it may as well be another entity connected to the Internet.

Date/time field: The date/time of the preparation of this request is entered.

Booking certificate intermediation license specifications field: The requester's requirements regarding the booking certificate intermediation license to be prepared are entered here.

Digital signature field: The digital signature by the sender for this to endorse this request is entered.

Certificate field: A group of public key certificates including the public key for verifying the digital signature of the digital signature field of this request are entered.

The data structure of the booking certificate intermediation license specifications entered in the booking certificate intermediation license specifications field of the request is as follows.

Booking certificate intermediation license specifications::={
  Licenser field,
  Licensee field,
  Public key identifier field,
  Desired booking conditions limitation information field
}

Licenser field: The identifier of the provider desiring to have a booking certificate intermediation license prepared is entered.

Licensee field: The identifier of the retailer licensed with the booking certificate intermediation license so desired is entered.

Public key identifier field: The verification public key identifier assigned to the verification public key subject to desired licensing of intermediation of the booking certificate with the booking certificate intermediation license is entered.

Desired booking conditions limitation information field: The booking conditions limitation information desired to be entered in the booking certificate intermediation license to be prepared is entered.

The provider having received the booking certificate intermediation license request prepares a booking certificate intermediation license according to the booking certificate intermediation license specifications stated in the request. The provider hands the prepared booking certificate intermediation license over to the retailer. The provider can decide whether or not to prepare the requested booking certificate intermediation license or whether or not to prepare the booking certificate intermediation license according to the designated booking certificate intermediation license specifications.

When the prepared booking certificate intermediation license is handed over, a set of data known as a booking certificate intermediation license delivery is transmitted and received. Usually the sender is the provider who prepared the booking certificate intermediation license, and the receiver, the retailer who will use the issued booking certificate intermediation license. Where some other entity connected to the Internet delivers the booking certificate intermediation license on behalf of the provider or accepts the booking certificate intermediation license on behalf of the retailer, some other entity than the provider or the retailer may as well act as the sender or the receiver.

The data structure of the booking certificate intermediation license delivery is as follows.

Booking certificate intermediation license delivery::={
　Sender field,
　Receiver field,
　Date/time field,
　Booking certificate intermediation license field,
　Digital signature field,
　Certificate field
}

Sender field: The identifier of the sender of this booking certificate intermediation license delivery is entered. Although the sender usually is a provider, it may as well be another entity connected to the Internet.

Receiver field: The identifier of the receiver of this booking certificate intermediation license delivery is entered. Although the receiver usually is a receiver, it may as well be another entity connected to the Internet.

Date/time field: The date/time of the preparation of this booking certificate intermediation license delivery is entered.

Booking certificate intermediation license field: The booking certificate intermediation license delivered by this booking certificate intermediation license delivery is entered.

Digital signature field: The digital signature by the sender of this booking certificate intermediation license delivery to endorse this booking certificate intermediation license delivery is entered.

Certificate field: A group of public key certificates including the public key for verifying the digital signature of this booking certificate intermediation license delivery and the digital signature of the booking certificate intermediation license contained in this booking certificate intermediation license delivery are entered.

[Issuance of Booking Certificate]

A booking certificate is issued at the request of a consumer. The consumer delivers to a retailer a booking certificate request for booking of a specific product or service under specific booking conditions. The retailer having received the request usually prepares a booking certificate request for requesting the center to issue a booking certificate to the consumer, who is the original requester, and delivers it to the center. The center having received the request from the retailer prepares a booking certificate for the consumer, and hands it over to the retailer who delivered the booking certificate request. The retailer having received the booking certificate delivers that booking certificate to the consumer, who is the requester. For delivering a booking certificate from the center or the retailer, a set of data known as a booking certificate delivery is transmitted and received.

It is also possible for plural retailers to intermediate between a consumer and the center. In this case, a retailer having received a request directly from the consumer delivers a booking certificate request to a second retailer, and the second delivers to the center a booking certificate request. The issued booking certificate reaches the consumer as booking certificate deliveries are delivered over the same route in the reverse direction.

The data structure of a booking certificate request is as follows.

Booking certificate request::={
　Sender field,
　Receiver field,
　Date/time field,
　Booking particulars field,
　Digital signature field,
　Certificate field
}

Sender field: The identifier of the sender of this request is entered.

Receiver field: The identifier of the receiver of this request is entered.

Date/time field: The date/time of the preparation of this request is entered.

Booking particulars field: This is a field for entering requirements regarding the particulars of the requested booking certificate. Usually, booking specifications stating requirements regarding booking particulars are entered. But, where the receiver is a retailer and the retailer's own reference number is assigned to the product or service sold by the retailer on an advance booking basis, that number may be entered.

Digital signature field: The digital signature by the sender for this request to endorse this request is entered.

Certificate field: A group of public key certificates including the public key for verifying the digital signature of this request are entered.

The data structure of a booking specification stated in the booking particulars field of the booking certificate request is as follows.

Booking specifications::={
　Public key identifier field,
　Consumer identifier field,
　Booking conditions field,
　Booking certificate intermediation license field
}

Public key identifier field: A verification public key identifier assigned to a verification public key with which the booking certificate covered by the booking certificate request is entered.

Consumer identifier field: The identifier of the consumer, whose booking is certified by the booking certificate requested with the booking certificate request is entered.

Booking conditions field: Booking conditions desired to be entered into the booking certificate requested with the booking certificate request is entered.

Booking certificate intermediation license field: This field includes, where the sender of the request for booking certificate is a retailer, a booking certificate intermediation license certifying that the retailer is licensed to intermediate a booking certificate matching the verification public key having an identifier designated in the public key identifier field of this set of booking specifications under the booking conditions entered in the booking conditions field of this set of booking specifications.

The center decides whether or not to issue a booking certificate having booking conditions exactly as stated in the booking conditions filed of the booking specifications. In particular, against a request not licensed by the booking certificate intermediation license contained in the booking specifications, no booking certificate is issued.

Further, in the process of requesting a booking certificate, the intermediating retailer may modify the particulars in the booking conditions field of the booking specifications.

The data structure of the booking certificate delivery is as follows.

Booking certificate delivery::={
　Sender field,
　Receiver field,
　Date/time field, Booking certificate field,
Digital signature field,
Certificate field
}

Sender field: The identifier of the deliverer of this booking certificate delivery is entered.

Receiver field: The identifier of the receiver of this booking certificate delivery is entered.

Date/time field: The date/time of the preparation of this booking certificate delivery is entered.

Booking certificate field: The booking certificate delivered by this booking certificate delivery is entered.

Digital signature field: The digital signature by the sender of this booking certificate delivery to endorse this booking certificate delivery is entered.

Certificate field: A group of public key certificates including the public key for verifying the digital signature field of this booking certificate delivery and the digital signature of the booking certificate contained in this booking certificate delivery are entered.

[Configuration of the Center]

The center in this embodiment has a function to process verification public key information requests and booking certificates requests entered via the Internet, a function to prepare the issuance history of booking certificates and to deliver it to providers or retailers via the Internet, and a function to prepare the issuance history of verification public key information and to deliver it to providers via the Internet.

Figure 2:
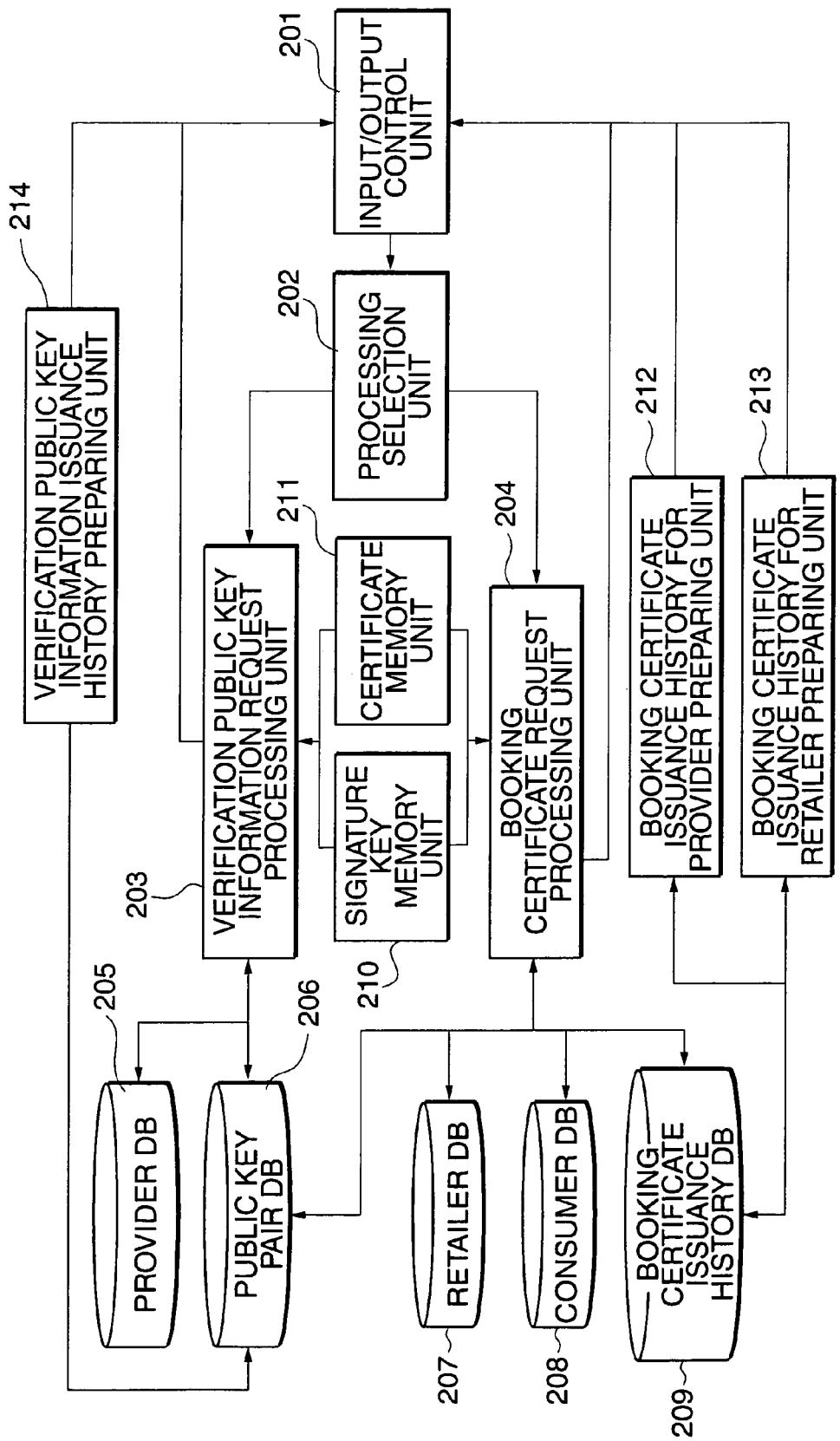
FIG. 2 illustrates the configuration of a booking certificate issuing center to which the invention is applied.

FIG. 2 illustrates the configuration of the center in this embodiment.

The center is provided with an input/output control unit 201, processing selection unit 202, a verification public key information request processing unit 203, a for booking certificate request processing unit 204, a provider DB 205, a public key pair DB 206, a retailer DB 207, a consumer DB 208, a booking certificate issuance history DB 209, a signature key memory unit 210, a certificate memory unit 211, a booking certificate issuance history for provider preparing unit 212, a booking certificate issuance history for retailer preparing unit 213, and a verification public key information issuance history preparing unit 214. The center is connected to the Internet via the input/output control unit 201.

The role of each section of the center in this embodiment will be described below.

Input/output control unit 201: It accepts data inputs via the Internet and outputs via the Internet data prepared by the verification public key information request processing unit 203 and data prepared by the booking certificate request processing unit 204. Usable methods of inputting from the Internet to the input/output control unit 201 or from the input/output control unit 201 to the Internet include making ready a WWW site connected to the input/output control unit 201 and offering it for accessing by providers and retailers and either automatic or manual interlocking of an electronic mail system and the input/output control unit 201.

Processing selection unit 202: It judges whether the entered set of data is a verification public key information request or a booking certificate request, and calls the verification public key information request processing unit 203 if it is a verification public key information request or the booking certificate request processing unit 204 if it is a booking certificate request.

Verification public key information request processing unit 203: It processes a verification public key information request, prepares a verification public key information delivery, and delivers it to the requester via the input/output control unit 201. In the process of preparing a verification public key information delivery, it refers to the provider DB 205 and adds a new entry to the public key pair DB 206.

Booking certificate request processing unit 204: It processes a booking certificate request, prepares a booking certificate delivery, and delivers it to the requester via the input/output control unit 201. In the process of preparing a booking certificate delivery, it refers to the public key pair DB 206, the retailer DB 207, and the consumer DB 208, and adds a new entry to the booking certificate issuance history DB.

Provider DB 205: This DB holds data regarding the provider.

Public key pair DB 206: This DB holds the public key pair to be used for preparing verification public key information or a booking certificate.

Retailer DB 207: This DB holds data regarding the retailer.

Consumer DB 208: This DB holds data regarding the consumer.

Booking certificate issuance history DB 209: This DB holds data regarding the issuance history of booking certificates.

Signature key memory unit 210: It holds a signature key for the digital signature prepared by the center.

Certificate memory unit 211: It holds a public key certificate containing a verification key with which a digital signature prepared with the signature key stored in the signature key memory unit 210 can be checked.

Booking certificate issuance history for provider preparing unit 212: It prepares a booking certificate issuance history for each provider, and delivers it to the provider via the input/output control unit 201.

Booking certificate issuance history for retailer preparing unit 213: It prepares a booking certificate issuance history for each retailer, and delivers each to each retailer via the input/output control unit 201.

Verification public key information issuance history preparing unit 214: It prepares a verification public key information issuance history for each provider, and delivers it to the provider via the input/output control unit 201.

[Databases the Center has]

The center has five databases including the provider DB 205, the public key pair DB 206, the retailer DB 207, the consumer DB 208, and the booking certificate issuance history DB 209.

The provider DB 205 is a database holding information regarding entities recognized as providers by the center.

The structure of the provider DB 205 is FIG. 6. The provider DB 205 is a table having the following sole attribute.

Provider identifier attribute: The identifier of an entity recognized as a provider by the center.

The center recognizes no other entity as a provider than the providers registered in this database. Therefore the center never issues verification public key information to any unregistered entity; nor does it issue a booking certificate for any product or service offered by any such entity.

When it is desired to increase entities recognized as providers by the center, a new entry or entries can be added to this database.

The public key pair DB 206 is a database that holds information regarding verification public keys issued to providers and private keys respectively matching them. In this embodiment, RSA is used as the public key encryption algorithm for the verification public keys and the private key respectively matching them. Therefore, the public key pair DB 206 is a database that holds information regarding public key pairs of RSA.

The structure of the public key pair DB 206 is illustrated in FIG. 7. The public key pair DB 206 is a table listing the following 8 attributes, in which each entry is information regarding one public key pair.

Public key identifier attribute: The verification public key identifier assigned to the public key pair of this entry.

Modulus attribute: RSA modulus.

Public key attribute: RSA public key.

Private key attribute: RSA private key.

Provider identifier attribute: The identifier of the provider to whom verification public key information including the public key of the public key pair of this entry has been issued.

Start of effective period attribute: The starting date/time of the effective period of the verification public key information including the public key of the public key pair of this entry.

End of effective period attribute: The ending date/time of the effective period of the verification public key information including the public key of the public key pair of this entry.

Issue date attribute: The issue date/time of the verification public key information including the public key of the public key pair of this entry.

The retailer DB 207 is a database that holds information regarding entities recognized as retailers by the center.

The structure of the retailer DB 207 is illustrated in FIG. 8. The retailer DB 207 a table having the following sole attribute.

Retailer identifier attribute: The identifier of an entity recognized as a retailer by the center.

The center recognizes no other entity as a retailer than the retailers registered in this database. Therefore, the center never issues a booking certificate against a booking certificate request from any unregistered entity.

When it is desired to increase entities recognized as retailers by the center, a new entry or entries can be added to this database.

The consumer DB 208 is a database that holds information regarding entities recognized as consumers by the center.

The structure of the consumer DB 208 is illustrated in FIG. 9. The consumer DB 208 is a table having the following two attributes.

Consumer identifier attribute: The identifier of an entity recognized as a consumer by the center. It is a value also held in the portable memory unit carried by the consumer.

Consumer private information attribute: consumer private information held in the portable memory unit holding the consumer designated by the consumer identifier attribute.

The booking certificate issuance history DB 209 is a database that holds information regarding the booking certificates so far issued by the center.

The structure of the booking certificate issuance history DB 209 is illustrated in FIG. 10. The booking certificate issuance history DB 209 is a table listing the following six attributes, in which each entry is information regarding one booking certificate.

Public key identifier attribute: The verification public key identifier assigned to the verification public key of the booking certificate of this entry.

Provider identifier attribute: The identifier of the provider to whom verification public key information including the verification public key designated by the public key identifier attribute of this entry has been issued.

Consumer identifier attribute: The consumer identifier contained in the portable memory unit of the consumer whose booking is certified by the booking certificate of this entry.

Intermediary identifier attribute: The identifier of the retailer have request issuance of the booking certificate of this entry.

Booking conditions attribute: The result encoding the booking conditions entered in the booking certificate of this entry in accordance with Basic Encoding Rule: ITU-T Recommendation X. 690 (BER).

Issuance date attribute: The Issuance date/time of the booking certificate of this entry.

Figure 3:
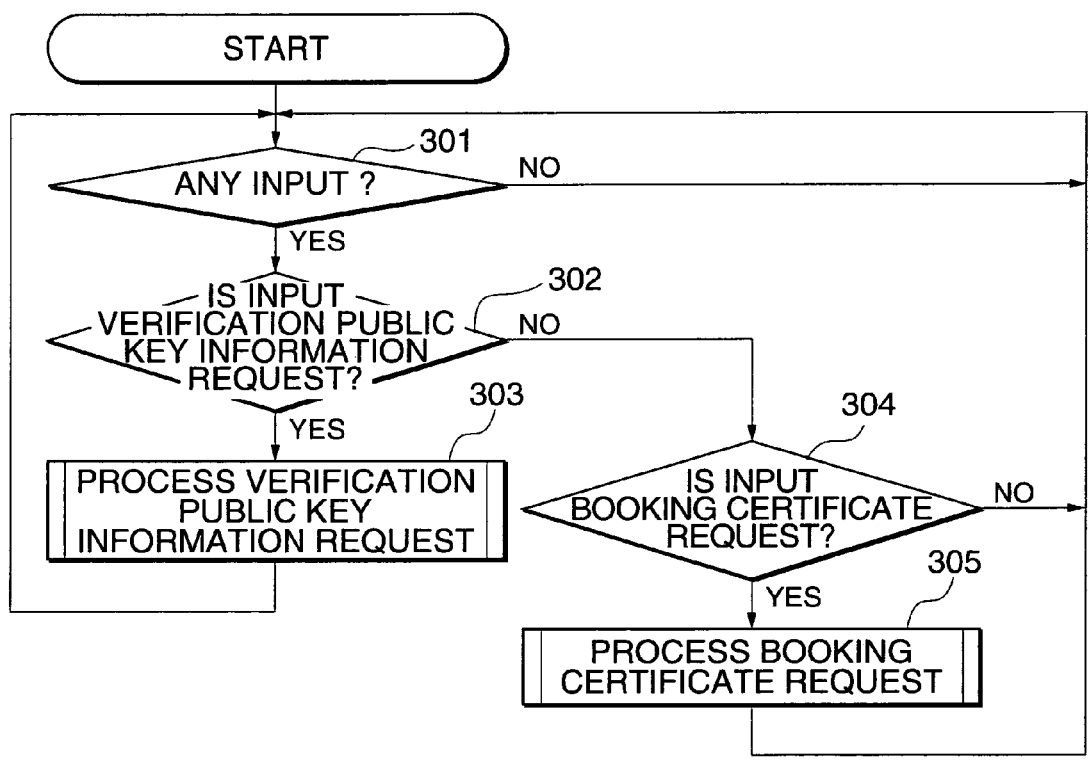
FIG. 3 is a flowchart showing the operation of the booking certificate issuing center to which the invention is applied.

FIG. 3 is a flowchart showing the operation of the center in this embodiment. The operation of the center in this embodiment will be described with reference to the flowchart of FIG. 3.

As shown in FIG. 3, the center in this embodiment keeps on waiting for inputting of data and, if there is any, performs processing as the input requires, followed by a return to the input awaiting state. It is an endless process.

First, it is checked whether or not there is any input to the input/output control unit 201 (301). If there is no input, the center returns to input checking (301) again.

If any input is detected by input checking (301), the processing selection unit 202 judges whether or not the input is a verification public key information request (302). If the input is a verification public key information request, the verification public key information request processing unit 203 is called, and the verification public key information request is processed (303). Upon completion of the processing of the verification public key information request, the center returns to input checking (301) again.

If it is judged at step 302 that the input is not a verification public key information request, the processing selection unit 202 judges whether or not the input is a booking certificate request (304). If the input is a booking certificate request, the booking certificate request processing unit 204 is called, and the booking certificate request is processed (305). Upon completion of the processing of the booking certificate request, the center returns to input checking (301) again.

Or if it is judged at step 304 that the input is not a booking certificate request, the center returns to input checking (301) again.

[Verification Public Key Information Request Processing Unit]

Figure 4:
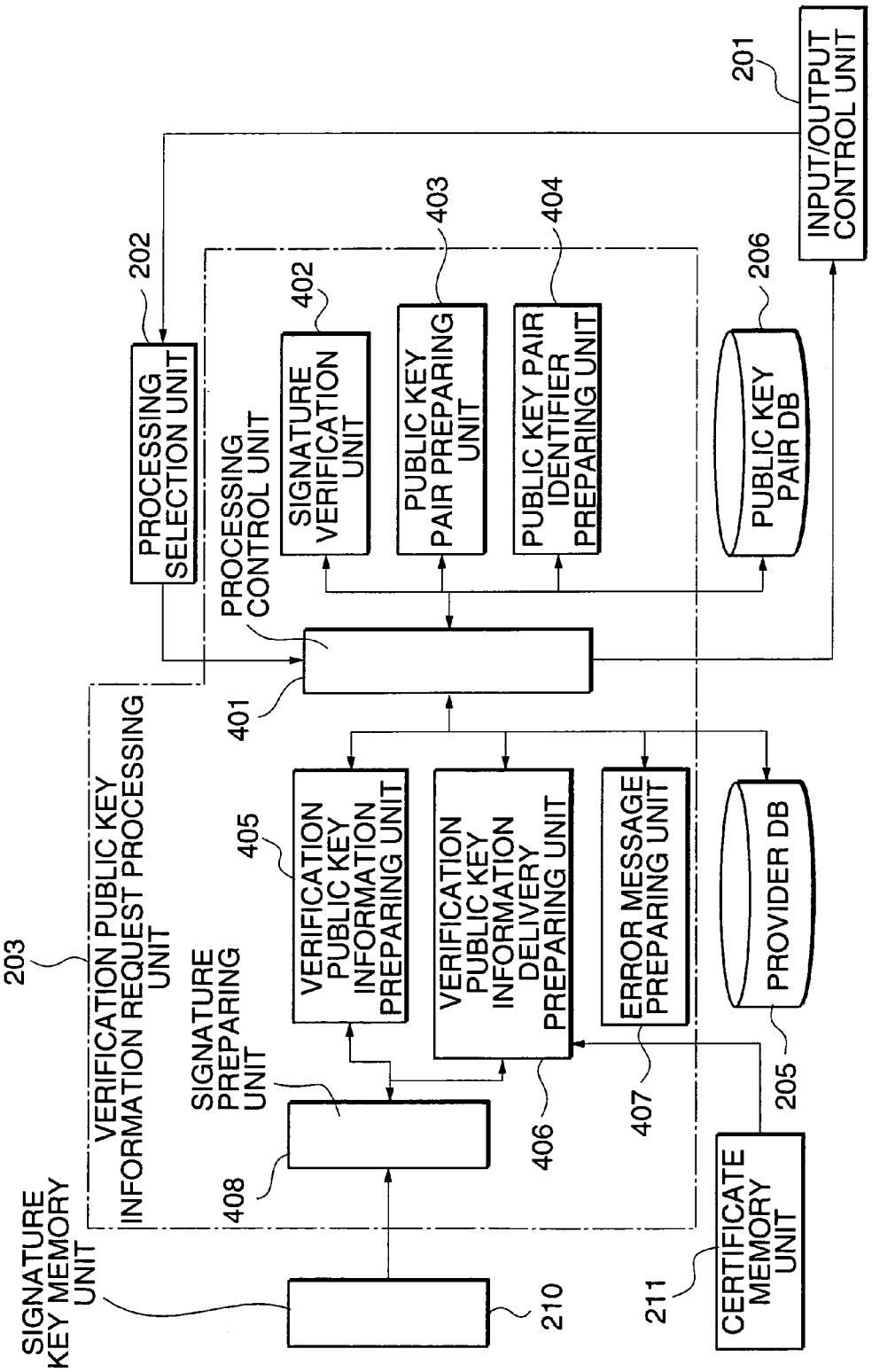
FIG. 4 illustrates the internal structure of a verification public key information request processing unit provided in the booking certificate issuing center to which the invention is applied.

FIG. 4 illustrates the internal structure of the verification public key information request processing unit 203 provided in the center of this embodiment.

The verification public key information request processing unit 203, having a function to process verification public key information requests. This unit is provided with a processing control unit 401, a signature verification unit 402, a public key pair preparing unit 403, a verification public key identifier preparing unit 404, a verification public key information preparing unit 405, a verification public key information delivery preparing unit 406, an error message preparing unit 407, and a signature preparing unit 408.

The role of each constituent part of the verification public key information request processing unit 203 will be described below.

Processing control unit 401: This unit performs the functions to accept an input from the processing selection unit 202, provide an output to the input/output control unit 201, refer to the provider DB 205, and add an entry to the public key pair DB 206. Furthermore, this unit carries out overall control of the processing of a verification public key information request.

Signature verification unit 402: It verifies the digital signature of a verification public key information request inputted from the processing selection unit 202.

Public key pair preparing unit 403: It prepares a public key pair used for the preparation of a verification public key information and a booking certificate.

Public key pair identifier preparing unit 404: It prepares a verification public key identifier assigned to a verification public key. It is designed to prevent duplication of generated identifiers, such as taking out a bit string at random from a sufficiently large space.

Verification public key information preparing unit 405: It prepares verification public key information. It calls the signature preparing unit 408 to affix a digital signature to the verification public key information.

Verification public key information delivery preparing unit 406: It prepares a verification public key information delivery. It calls the signature preparing unit 408 to affix a digital signature to the verification public key information delivery. It further accesses the certificate memory unit 211 to obtain a public key certificate for the verification key of the signature of the center.

Error message preparing unit 407: It prepares an error message.

Signature preparing unit 408: It prepares digital signatures for verification public key information and a verification public key information delivery. In order to obtain a signature key for the digital signature, it accesses the signature key memory unit 210.

Figure 5:
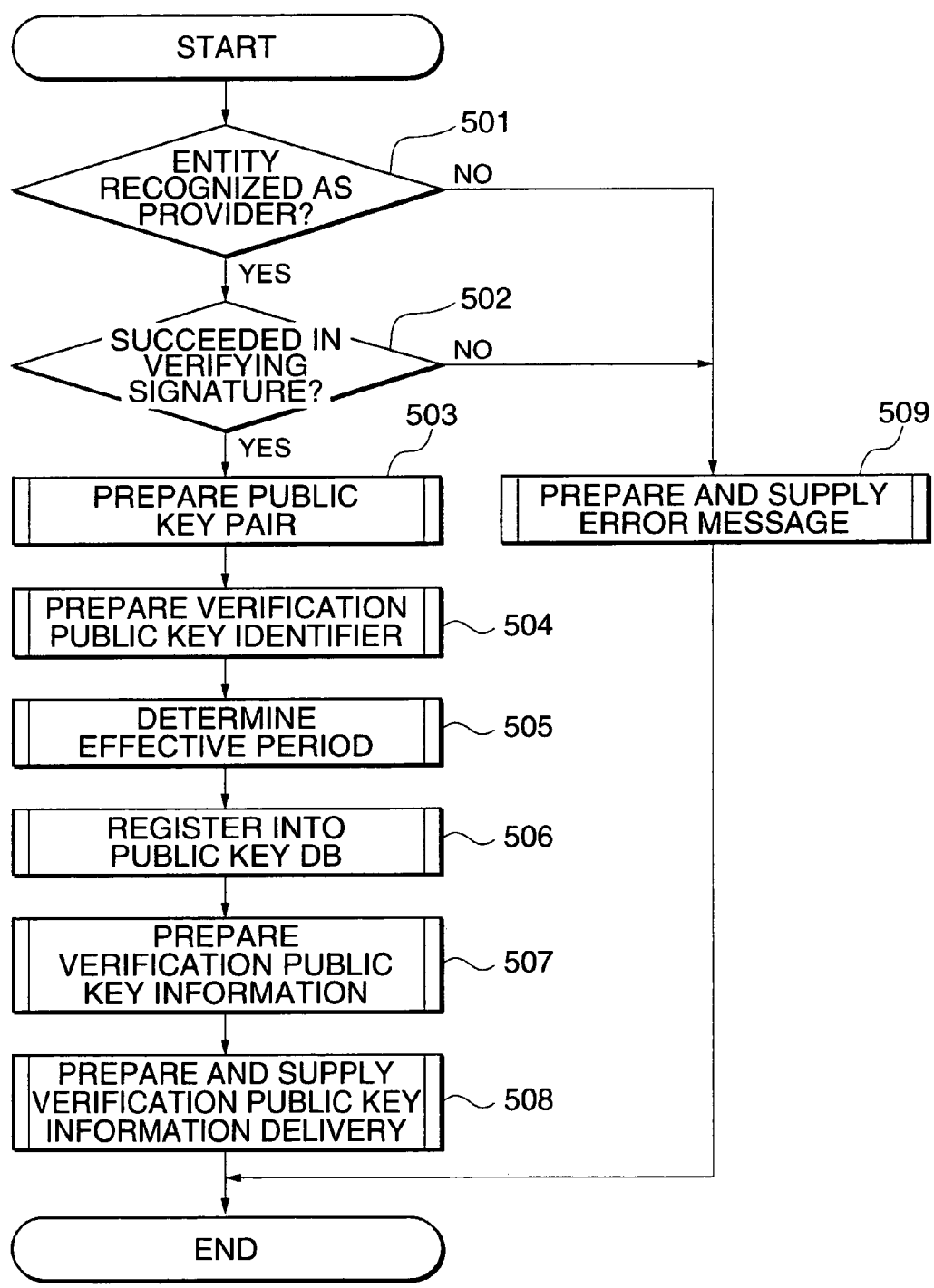
FIG. 5 is a flowchart showing the operation of a processing control unit of a verification public key information request processing unit provided in the booking certificate issuing center to which the invention is applied.

FIG. 5 is a flowchart showing the operation of a processing control unit 401 of the verification public key information request processing unit 203 provided in the center of this embodiment. The operation of the processing control unit 401 will be described below with reference to FIG. 5.

First, the identifier of the entity, who is the user of the requested verification public key information and is specified in the public key specifications field of the verification public key information request inputted from the processing selection unit 202, is taken out. And it is checked whether or not the center recognizes the entity having this identifier as a provider by referencing the provider DB 205(501). If any entry having this identifier exists in the provider DB 205, it is found to be an entity recognized as a provider.

If it is judged at step 501 that it is an entity not recognized as a provider, an error message is prepared by the error message preparing unit 407 and, after supplying it to the input/output control unit 201 (509), the processing is ended.

If it is judged at step 501 that it is an entity recognized as a provider, the digital signature of the verification public key information request is checked (502). As the verification key, what is appended to the certificate field of the request is used, but if the required public key certificate is absent in the certificate field, the signature is checked after a public key certificate is obtained from the CA 111.

If the signature fails to be verified, an error message is prepared by the error message preparing unit 407 and, after it is supplied to the input/output control unit 201 (509), the processing is ended.

If the signature is successfully verified, the public key pair preparing unit 403 is called to have an RSA public key pair prepared, and the modulus, the public key and the private key that are prepared are received (503). Further, the public key pair identifier preparing unit 404 is called to have an identifier for assignment to the verification public key information prepared, and receives the identifier so prepared (504).

Next, after the starting date/time and the ending date/time of the effective period of the verification public key information are appropriately determined (505), a new entry is added to the public key pair DB (506). The following values are set for the attributes of the new entry.

Public key identifier attribute: The identifier prepared at step 504.

modulus attribute: The RSA modulus prepared at step 503.

Public key attribute: The RSA public key prepared at step 503.

Private key attribute: The RSA private key prepared at step 503.

Provider identifier attribute: The identifier of the provider, who is the user of the verification public key specified in the public key specifications field of the verification public key information request.

Start of effective period attribute: The starting date/time of the effective period prepared at step 505.

End of effective period attribute: The ending date/time of the effective period prepared at step 505.

Issuance date attribute: The current date/time.

Next, the verification public key information preparing unit (405) is called to have verification public key information prepared, and its result is received (507). The following values are set in the fields of the verification public key information.

Issuer field: The center's own identifier.

Recipient field: The identifier of the provider, who is the user of the verification public key specified in the public key specifications field of the verification public key information request.

Issue date field: The current point of time.

Start of effective period field: The starting date/time of the effective period prepared at step 505.

End of effective period field: The ending date/time of the effective period prepared at step 505.

Verification public key identifier field: The identifier prepared at step 504.

Public key information field: The modulus and the public key prepared at step 503.

Digital signature field: The digital signature for data in other fields of this verification public key information than this field. The signature preparing unit 408 is called to prepare the digital signature, and the resultant signature value is received and set in this field.

Finally, the verification public key information delivery preparing unit 406 is called to have a verification public key information delivery prepared and, after the result is received and supplied to the input/output control unit 201 (508), the processing is ended. The following values are set in the fields of the verification public key information delivery.

Sender field: The center's own identifier.

Receiver field: The identifier entered in the sender field of the verification public key information request.

Date/time field: The current point of time.

Verification public key information field: The verification public key information prepared at step 507.

Digital signature field: The digital signatures for data in other fields of this verification public key information delivery than this and certificate fields. The signature preparing unit 408 is called to prepare the digital signatures, and the resultant signature values are received and set in this field.

Certificate field: The public key certificate stored in the certificate memory unit 211.

[Booking Certificate Request Processing Unit]

Figure 11:
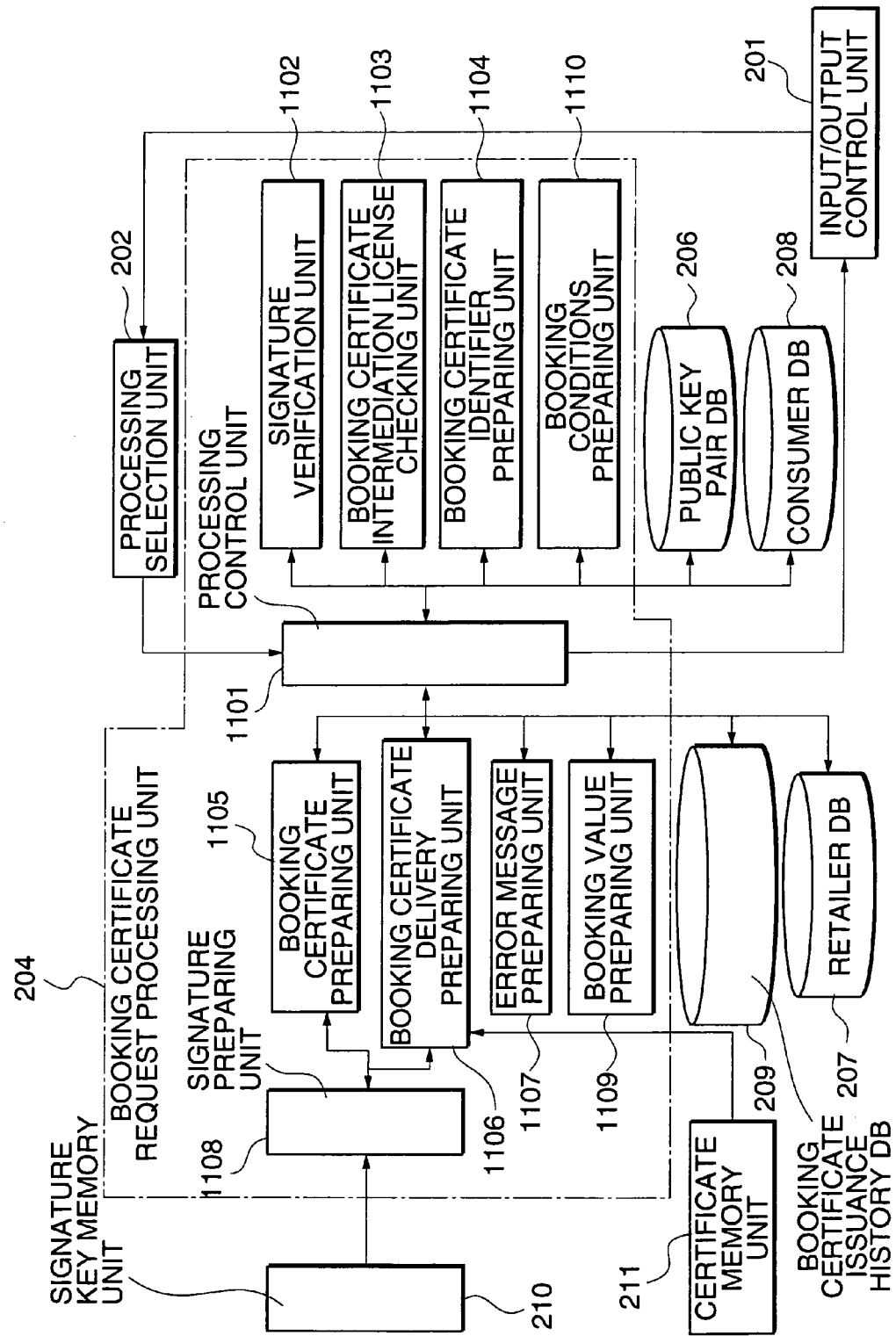
FIG. 11 illustrates the internal structure of a booking certificate request processing unit provided in the booking certificate issuing center to which the invention is applied.

FIG. 11 illustrates the internal configuration of the booking certificate processing request unit 204 the center in this embodiment has.

The booking certificate request processing unit 204 has a function to process a booking certificate request. This unit is provided with a processing control unit 1101, a signature verification unit 1102, a booking certificate intermediation license checking unit 1103, a booking certificate identifier preparing unit 1104, a booking certificate preparing unit 1105, a booking certificate delivery preparing unit 1106, an error message preparing unit 1107, a signature preparing unit 1108, a booking value preparing unit 1109, and a booking conditions preparing unit 1110.

The role of each constituent part of the booking certificate processing request unit 204 will be described below.

Processing control unit 1101: This unit performs the functions to accept an input from the processing selection unit 202, provide an output to the input/output control unit 201, refer to the public key pair 206, the retailer DB 207 and the consumer DB 208, and add an entry to the booking certificate issuance history DB 209. Furthermore, this unit carries out overall control of the processing of a booking certificate request.

Signature verification unit 1102: It checks digital signature in the booking certificate request inputted from the processing selection unit 202 and in the booking certificate intermediation license contained in the request.

Booking certificate intermediation license checking unit 1103: It checks whether or not the intermediation of a booking certificate requested with the booking certificate request inputted from the processing selection unit 202 is licensed by the booking certificate intermediation license contained in the request. Booking certificate identifier preparing unit 1104: It prepares a booking certificate identifier to be assigned to a booking certificate. It is designed to prevent duplication of generated identifiers, such as taking out a bit string at random from a sufficiently large space.

Booking certificate preparing unit 1105: It prepares a booking certificate, and calls the signature preparing unit 1108 to append a digital signature to the booking certificate.

Booking certificate delivery preparing unit 1106: It prepares a booking certificate delivery, and calls the signature preparing unit 1108 to append a digital signature to the booking certificate delivery. It further accesses the certificate memory unit 211 to obtain the public key certificate of a verification key for the signature of the center.

Error message preparing unit 1107: It prepares an error message.

Signature preparing unit 1108: It prepares a digital signature for the booking certificate and the booking certificate delivery, and accesses the signature memory unit 210 to obtain a signature key for a digital signature.

Booking value preparing unit 1109: It prepares a booking value to be contained in a booking certificate.

Booking conditions preparing unit 1110: It prepares booking conditions to be contained in a booking certificate.

Figure 12:
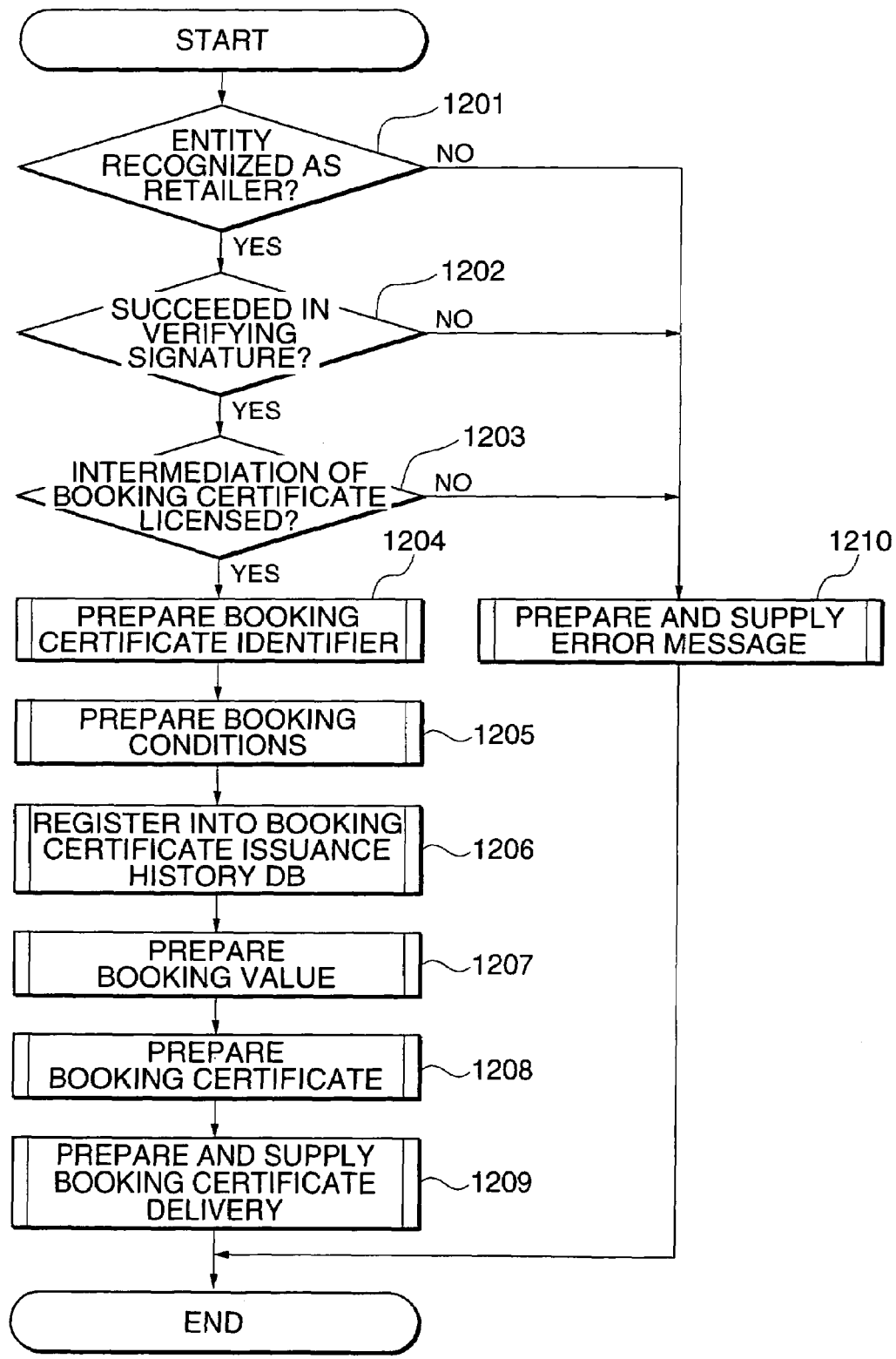
FIG. 12 is a flowchart showing the operation of a processing control unit of the booking certificate request processing unit provided in the booking certificate issuing center to which the invention is applied.

FIG. 12 is a flowchart showing the operation of the processing control unit of the booking certificate request processing unit 204 provided in the center of this embodiment. The operation of the processing control unit 1101 will be described below with reference to FIG. 12.

First, the identifier entered in the sender field of a booking certificate request, which is inputted from the processing selection unit 202, is taken out. Further, it is checked by referencing the retailer DB 207 whether or not the entity of this identifier is recognized as a retailer by the center (1201). If there is an entry having this identifier in the retailer DB 207, it is found to be an entry recognized as a retailer.

If the entity is not found at step 1201 to be recognized as a retailer, an error message is prepared by the error message preparing unit 1107. After sending the prepared error message to the input/output control unit 201 (1210), the processing is ended.

If the entity is found at step 1201 to be recognized as a retailer, the digital signature of the booking certificate request and the digital signature of a booking certificate intermediation license contained in the request are checked (1202). As the verification key, what is appended to the certificate field of the request is used. But if the required public key certificate is absent in the certificate field, the signatures are checked after a public key certificate is obtained from the CA 111.

If the signature fails to be verified, an error message is prepared by the error message preparing unit 1107 and, after it is supplied to the input/output control unit 201 (1210), the processing is ended.

If the signature is successfully verified, it is checked whether or not the intermediation for a booking certificate requested with the request is licensed by the booking certificate intermediation license contained in the request (1203). More specifically, booking specifications contained in the booking particulars field of the request are checked by the booking certificate intermediation license checking unit 1103. The booking certificate intermediation license checking unit checks whether or not the issuance of a booking certificate matching the verification public key having a verification public key identifier designated in the public key identifier field of the booking specifications under the booking conditions entered in the booking conditions field of the booking specifications is licensed with the booking certificate intermediation license contained in the booking specifications.

If it is found at step 1203 that the issuance is not licensed, an error message is prepared by the error message preparing unit 1107 and, after it is supplied to the input/output control unit 201 (1210), the processing is ended.

If it is found at step 1203 that the issuance is licensed, the booking certificate identifier preparing unit 1104 is called to have an identifier to be assigned to the booking certificate prepared (1204). After receiving the prepared identifier, the booking conditions preparing unit 1110 is called to determine the booking conditions to be entered in the booking certificate (1205). Usually, the booking conditions generated by the booking conditions preparing unit may either exactly the values of the booking conditions field of the booking specifications contained in the booking particulars field of the booking certificate request. The generated booking conditions may be the result of appropriate modification of the values of the booking conditions field within an extend licensed by the booking certificate intermediation license contained in the booking certificate intermediation license field of the booking specifications.

After the preparation of the booking conditions, a new entry is added to the booking certificate issuance history DB 209 (1206). The following values are set for the attributes of the new entry.

Public key identifier attribute: The value of the public key identifier field of the booking specifications contained in the booking particulars field of the booking certificate request.

Provider identifier attribute: The public key pair DB is accessed to take out the provider identifier attribute of the entry, in the public key pair DB, whose public key identifier attribute has the same value as that of the public key identifier field of the booking specifications contained in the booking particulars field, and this value is set.

Consumer identifier attribute: The value of the consumer identifier field of the booking specifications contained in the booking particulars field of the request.

Intermediary identifier attribute: The value of the sender field of the request.

Booking conditions attribute: The booking conditions prepared by the booking conditions preparing unit at step 1205.

Issuance date attribute: The current date/time.

Next, the booking value preparing unit 1109 is called to have a booking value prepared, and the result is received (1207).

Then, the booking certificate preparing unit 1105 is called to have a booking certificate prepared, and the result is received (1208). The following values are set in the fields of the booking certificate.

Issuer field: The center's own identifier.

Recipient field: The value of the consumer identifier field of the booking specifications contained in the booking particulars field of the booking certificate request.

Issuance date field: The value of the issuance date attribute of the entry added to the booking certificate issuance history DB 209 at step 1206.

Booking certificate identifier field: The identifier prepared at step 1204.

Public key identifier field: The value of the public key identifier field of the booking specifications contained in the booking particulars field of the request.

Booking conditions field: The booking conditions prepared by the booking conditions preparing unit at step 1205.

Booking value field: The booking value prepared at 1207.

Digital signature field: Digital signatures for data in other fields of this booking certificate than this field. To prepare the digital signatures, the signature preparing unit 1108 is called, and the resultant signatures are received and set in this field.

Finally, the booking certificate delivery preparing unit 1106 is called to have a booking certificate delivery prepared. After the result is received and supplied to the input/output control unit 201 (1209), the processing is ended. The following values in the fields of the booking certificate delivery.

Sender field: The center's own identifier.

Receiver field: The value of the sender field of the booking certificate request.

Date/time field: The current point of time.

Booking certificate field: The booking certificate prepared at step 1208.

Digital signature field: The digital signatures for data in other fields of this booking certificate delivery than this and certificate fields. The signature preparing unit 1108 is called to prepare the digital signatures, and the resultant signature values are received and set in this field.

Certificate field: The public key certificate stored in the certificate memory unit 211.

[Other Functions the Center has]

The center in this embodiment can deliver booking certificate issuance history information to providers.

The booking certificate issuance history information delivered to a provider is information on the issuance of booking certificates matching the verification public key assigned to that provider. It is prepared by the booking certificate issuance history for provider preparing unit 212, and delivered to the provider via the input/output control unit 201. For the provider, this history information is reliable information indicating what quantity of the product or service it provides has been sold by which retailer on an advance booking basis. Further, this information is the essential basis of confirmation by the provider of the correctness of the margin of the sales on an advance booking basis delivered from a retailer to the provider.

The booking certificate issuance history for provider preparing unit 212 is given the designation of the identifier of the provider for whom the history is to be prepared and the starting date/time and the ending date/time of the period the history is to cover. Then, this unit takes out of the booking certificate issuance history DB 209 a group of entries the value of whose provider identifier attribute is identical with the designated provider identifier and the value of the issuance date attribute is within the designated period of coverage by the history. Furthermore, this unit takes out the values of the public key identifier attribute, the intermediary identifier attribute, the booking conditions attribute and the issuance date attribute from the extracted entries. In this embodiment, the designation of the identifier of the provider for whom the history is to be prepared and of the period to be covered by the history so prepared is received from the operator of the center. But it may as well be inputted by the provider via the Internet.

The center of this embodiment can deliver booking certificate issuance history information to retailers as well.

The booking certificate issuance history information delivered to a retailer is information regarding the issuance of booking certificates requested by that retailer. It is prepared by the booking certificate issuance history for retailer preparing unit 213, and delivered to the retailer via the input/output control unit 201. This history serves as the basis of the margin for the booking certificate issuance the center receives from the retailer.

The booking certificate issuance retailer history preparing unit 213 is given the designation of the identifier of the retailer for whom the history is to be prepared and the starting date/time and the ending date/time of the period the history is to cover. Then, this unit takes out of the booking certificate issuance history DB 209 a group of entries the value of whose intermediary identifier attribute is identical with the designated retailer identifier and the value of the issuance date attribute is within the designated period of coverage by the history. Furthermore, the unit takes out the values of the public key identifier attribute, the retailer identifier attribute, the consumer identifier attribute, the booking conditions attribute and the issuance date attribute from the extracted entries. In this embodiment, the designation of the identifier of the retailer for whom the history is to be prepared and of the period to be covered by the history so prepared is received from the operator of the center. But it may as well be inputted by the retailer via the Internet.

The center in this embodiment can also deliver verification public key information issuance history information to providers.

The verification public key information issuance history information delivered to a provider is information on the issuance of verification public key information to that provider. It is prepared by the verification public key information issuance history preparing unit 214, and delivered to the provider via the input/output control unit 201. This history information serves as the basis of collection by the center of commissions for the issuance of verification public key information from the provider.

The verification public key information issuance history preparing unit 214 is given the designation of the identifier of the provider for whom the history is to be prepared and the starting date/time and the ending date/time of the period the history is to cover. Then, this unit takes out of the public key pair DB 206 a group of entries the value of whose provider identifier attribute is identical with the designated provider identifier and the value of the issuance date attribute is within the designated period of coverage by the history. Furthermore, the unit takes out the values of the public key identifier attribute, the modulus attribute, the public key attribute, the start of effective period attribute, the end of effective period attribute and the issuance date attribute from the extracted entries. In this embodiment, the designation of the identifier of the provider for whom the history is to be prepared and of the period to be covered by the history so prepared is received from the operator of the center. But it may as well be inputted by the provider via the Internet.

Such history information may be delivered to the provider or the retailer by electronic mail. Or it may be issued on demand on a WWW base. Where there is a fear of tapping or alteration, it is preferable to apply encryption or a digital signature.

[Configuration of a Provider]

Figure 13:
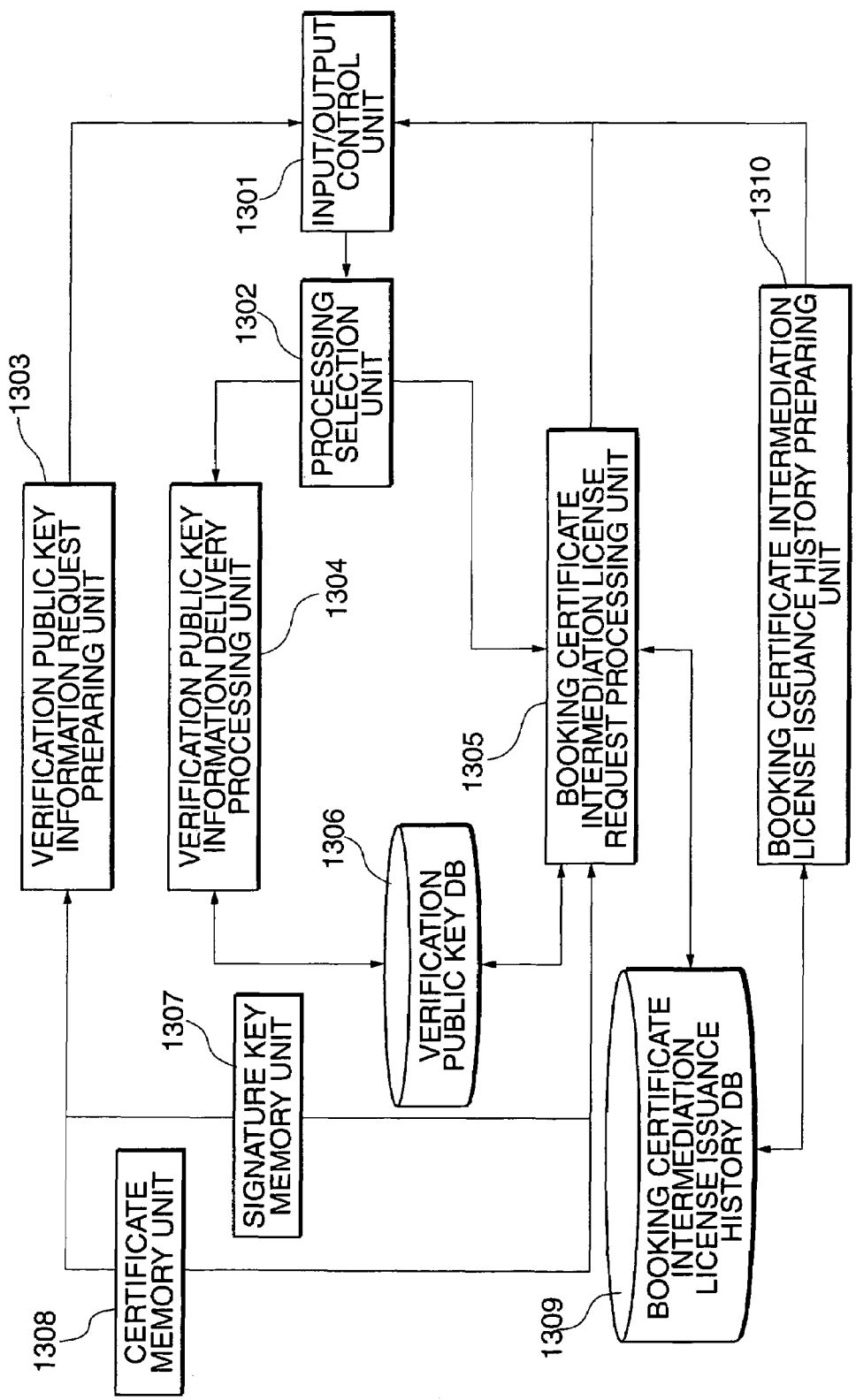
FIG. 13 illustrates the configuration of a provider to which the invention is applied.

FIG. 13 illustrates the configuration of a provider in this embodiment of the invention.

A provider in this embodiment has a function to prepare a verification public key information request and deliver it to the center via the Internet. Furthermore, the provider has a function to process a verification public key information delivery and a booking certificate intermediation license request inputted via the Internet. The provider has an input/output control unit 1301, a processing selection unit 1302, a verification public key information request preparing unit 1303, a verification public key information delivery processing unit 1304, a booking certificate intermediation license request processing unit 1305, a verification public key DB 1306, a signature key memory unit 1307, a certificate memory unit 1308, a booking certificate intermediation license issuance history DB 1309 and a booking certificate intermediation license issuance history preparing unit 1310. The provider is connected to the Internet via the input/output control unit 1301.

The roles of various parts of the provider in this embodiment will be described below.

Input/output control unit 1301: While monitoring data inputs via the Internet, this unit supplies via the Internet data prepared by the verification public key information request preparing unit 1303 and the booking certificate intermediation license request processing unit 1305. Methods usable for inputs from the Internet to the input/output control unit 1301 or outputs from the input/output control unit 1301 includes establishment of a WWW site connected to the input/output control unit 1301 to be offered for accessing by other entities. Posting data prepared by the provider to a WWW site available from another entity is included in the methods too. Automatic or manual interlocking of an electronic mail system and the input/output control unit 1301 can be used for connecting the input/output control unit 1301 and the Internet.

Processing selection unit 1302: It judges whether the set of data that is inputted is a verification public key information delivery or a booking certificate intermediation license request. Then, this unit calls the verification public key information delivery processing unit 1304 if it is a verification public key information delivery or the booking certificate intermediation license request processing unit 1305 if it is a booking certificate intermediation license request.

Verification public key information request preparing unit 1303: It prepares a verification public key information request, and delivers it to the center via the input/output control unit 1301. In the process of preparing the verification public key information request, it accesses the signature key memory unit 1307 and the certificate memory unit 1308.

Verification public key information delivery processing unit 1304: It processes the verification public key information delivery, and registers the verification public key into the verification public key DB 1306.

Booking certificate intermediation license request processing unit 1305: It processes a booking certificate intermediation license request, prepares a booking certificate intermediation license delivery, and delivers it to the requester via the input/output control unit 1301. In the process of preparing the booking certificate intermediation license delivery, it refers to the verification public key DB 1306, adds a new entry to the booking certificate intermediation license DB, and accesses the signature key memory unit 1307 and the certificate memory unit 1308.

Verification public key DB 1306: This DB holds information regarding verification public keys.

Signature key memory unit 1307: It holds a signature key to be used for the digital signature prepared by the provider.

Certificate memory unit 1308: It holds a public key certificate containing a verification key with which a digital signature prepared with a signature key stored in the signature key memory unit 1307 can be checked.

Booking certificate intermediation license issuance history DB 1309: This DB holds the booking certificate intermediation license issuance history.

Booking certificate intermediation license issuance history preparing unit 1310: It prepares a booking certificate intermediation license issuance history for each retailer.

[Databases Maintained by a Provider]

A provider has two databases including the verification public key DB 1306 and the booking certificate intermediation license issuance history DB 1309.

The verification public key DB 1306 is a database for holding the particulars of verification public key information issued by the center together with the uses of the verification public keys determined by the provider itself.

The structure of the verification public key DB 1306 is illustrated in FIG. 14. The verification public key DB 1306 is a table listing the following six attributes, in which each entry is information regarding one verification public key.

Public key identifier attribute: A verification public key identifier assigned to a verification public key by the center.

Modulus attribute: An RSA modulus contained in the verification public key information.

Public key attribute: An RSA public key contained in the verification public key information.

Start of effective period attribute: The starting date/time of the effective period of the verification public key information.

End of effective period attribute: The ending date/time of the effective period of the verification public key information.

Use attribute: The use assigned by the provider to the verification public key of this entry. It is information on a product or a service regarding which the legitimacy of a booking certificate is checked with the verification public key of this entry.

The booking certificate intermediation license issuance history DB 1309 is a database for holding the history of booking certificate intermediation licenses issued by the provider.

The structure of the booking certificate intermediation license issuance history DB 1309 is illustrated in FIG. 34. The booking certificate intermediation license issuance history DB 1309 is a table having the following seven attributes, in which each entry is information regarding one issuance of one booking certificate intermediation license.

Booking certificate intermediation license identifier attribute: An identifier assigned by the provider to the booking certificate intermediation license that has been issued.

Public key identifier attribute: A verification public key identifier assigned by the center to the verification public key for which intermediation of a booking certificate is licensed with the booking certificate intermediation license that has been issued.

Retailer identifier attribute: The identifier of the retailer to be licensed with the booking certificate intermediation license that has been issued.

Booking conditions limitation information attribute: The booking conditions limitation information entered in the booking certificate intermediation license that has been issued.

Start of effective period attribute: The starting date/time of the effective period of the booking certificate intermediation license that has been issued.

End of effective period attribute: The ending date/time of the effective period of the booking certificate intermediation license that has been issued.

Issuance date attribute: The issuance date/time of the booking certificate intermediation license that has been issued.

[Verification Public Key Information Request Preparing Unit]

A provider in this embodiment, when there is a product or a service it desires to newly start selling on an advance booking basis, requests the center to issue verification public key information containing a verification public key to be assigned to that product or service. When requesting verification public key information, the provider prepares a verification public key information request with the verification public key information request preparing unit 1303, and delivers it to the center via the input/output control unit 1301.

The verification public key information request preparing unit 1303 sets the following in the fields of the verification public key information request.

Sender field: The provider's own identifier.
Receiver field: The center's identifier.
Date/time field: The current point of time.
Public key specifications field: Requirements regarding the verification public key to be prepared. The provider enters its own identifier as the user of the verification public key, and further enters the required public key encryption algorithm and key length. Since this embodiment allows the use of only RSA as the public key encryption algorithm, the value of the public key encryption algorithm is fixed to RSA.

Digital signature field: The digital signatures for data in other fields of this request than this and certificate fields. For preparing digital signatures, the verification public key information request preparing unit 1303 includes a signature preparing unit, and the values of signature prepared by this signature preparing unit are set in this field. The signature key is obtained by accessing the signature key memory unit 1307.

Certificate field: A public key certificate stored in the certificate memory unit 1308.

[Verification Public Key Information Delivery Processing Unit]

When a verification public key information request is prepared by the verification public key information request preparing unit 1303 and delivered to the center, a verification public key information delivery is transmitted from the center in return. The verification public key information delivery is delivered via the input/output control unit 1301 and the processing selection unit 1302 to the verification public key information delivery processing unit 1304, where it is processed.

Figure 15:
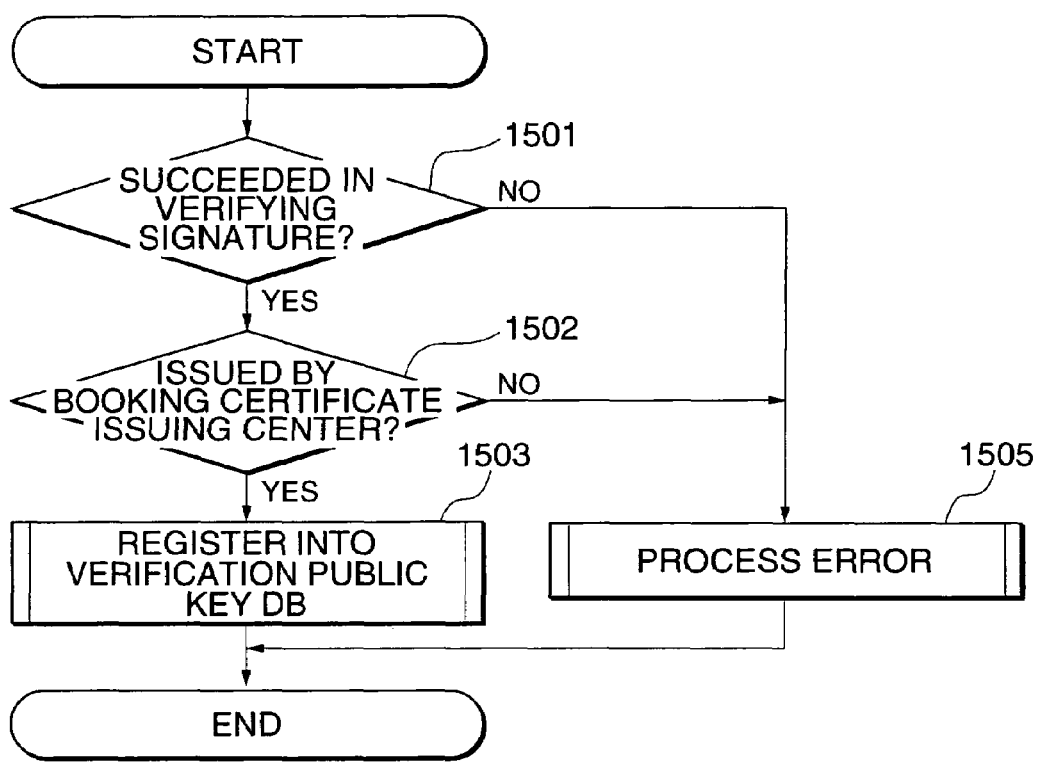
FIG. 15 is a flowchart showing the operation of a verification public key information delivery processing unit.

FIG. 15 is a flowchart showing the operation of a verification public key information delivery processing unit 1304 which a provider in this embodiment has. The operation of the verification public key information delivery processing unit 1304 will be described below with reference to FIG. 15.

First, the digital signature of the verification public key information delivery inputted from the processing selection unit 1302 and the digital signature of the verification public key information contained in the verification public key information delivery are checked (1501). As the verification key, what is appended to the certificate field of the verification public key information delivery is used. But if the required public key certificate is absent in the certificate field, the signature is checked after a public key certificate is obtained from the CA 111. For verification of signatures, the verification public key information delivery processing unit 1304 includes a signature verifying unit dedicated to checking of digital signatures.

If the digital signature fails to be verified at step 1501, the processing is ended after error processing (1505).

If the digital signature is successfully verified at step 1501, it is checked whether or not the issuer of the verifying public key contained in the verification public key information delivery is the center (1502). This checking can be accomplished by testing whether or not the identifier entered in the issuer field of the verification public key information is that of the center.

If it is found by checking at step 1502 that the issuer of the verification public key information is not the center, the processing is ended after error processing (1505).

If it is found by checking at step 1502 that the issuer of the verification public key information is the center, then a new entry is added to the verification public key DB 1306 (1503). The following values are set for the attributes of the new entry.

Public key identifier attribute: The value of the verification public key identifier field of the verification public key information contained in the verification public key information delivery.

Modulus attribute: The RSA modulus contained in the public key information field of the verification public key information contained in the verification public key information delivery.

Public key attribute: The RSA public key contained in the public key information field of the verification public key information contained in the verification public key information delivery.

Start of effective period attribute: The value of the start date/time of effective period field of the verification public key information contained in the verification public key information delivery.

End of effective period attribute: The value of the end date/time of effective period field of the verification public key information contained in the verification public key information delivery.

Use attribute: Information on the use assigned by the provider to this verification public key included in the verification public key information contained in the verification public key information delivery.

[Booking Certificate Intermediation License Request Processing Unit]

Figure 16:
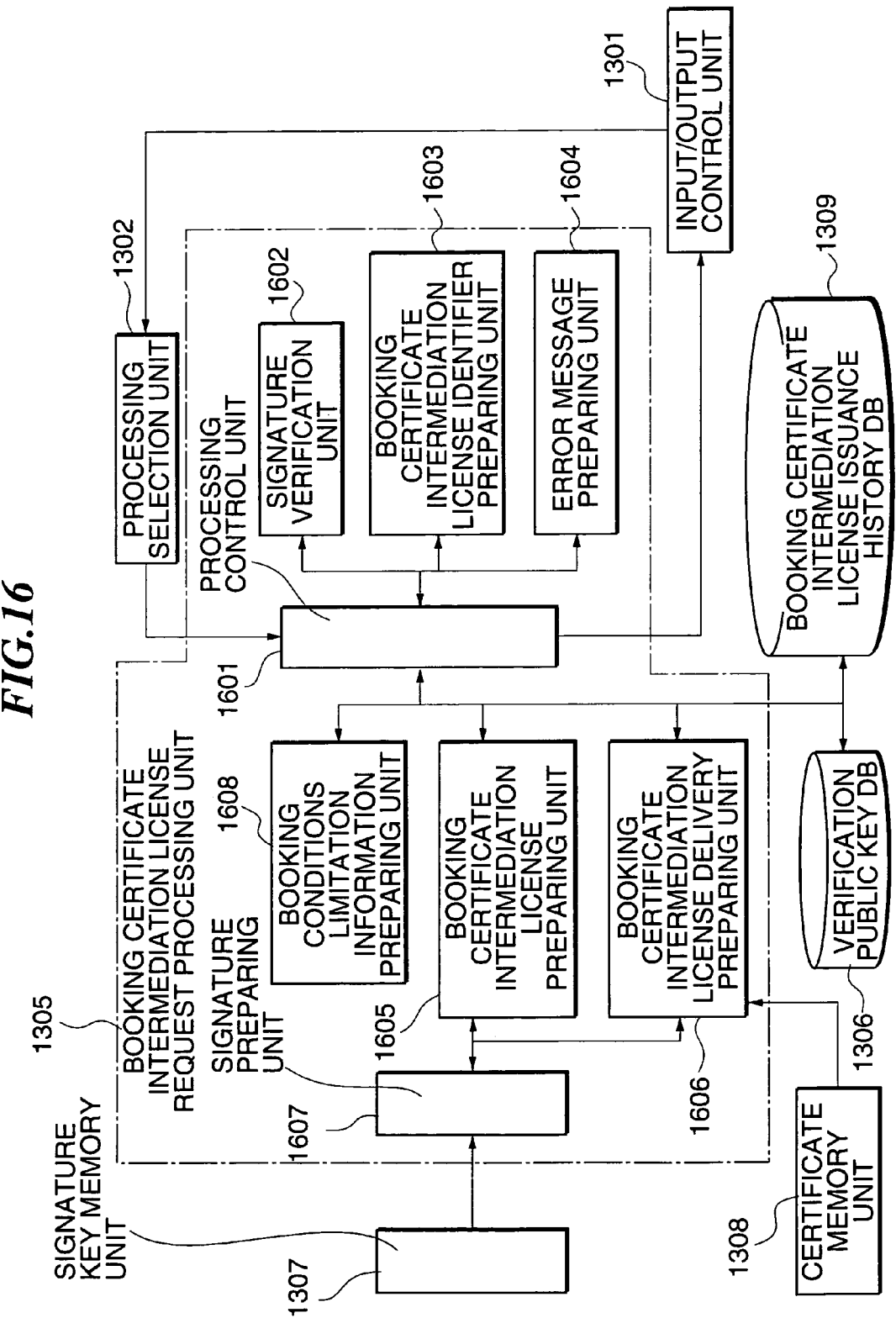
FIG. 16 illustrates the internal structure of a booking certificate intermediation license request processing unit provided in the provider to which the invention is applied.

FIG. 16 illustrates the internal structure of a booking certificate intermediation license request processing unit 1305 the provider in this embodiment has.

The booking certificate intermediation license request processing unit 1305 has a function to process booking certificate intermediation license requests. This unit has a processing control unit 1601, a signature verification unit 1602, a booking certificate intermediation license identifier preparing unit 1603, an error message preparing unit 1604, a booking certificate intermediation license preparing unit 1605, a booking certificate intermediation license delivery preparing unit 1606, a signature preparing unit 1607 and a booking conditions limitation information preparing unit 1608.

The role of each constituent part of the booking certificate intermediation license request processing unit 1305 will be described below.

Processing control unit 1601: This unit performs the functions to accept an input from the processing selection unit 1302, provide an output to the input/output control unit 1301, refer to the verification public key DB 1306, and add an entry to the booking certificate intermediation license issuance history DB 1309. Furthermore, this unit carries out overall control of the processing of booking certificate intermediation license request.

Signature verification unit 1602: It verifies the digital signature of a booking certificate intermediation license request from the processing selection unit 202.

Booking certificate intermediation license identifier preparing unit 1603: It prepares a booking certificate intermediation license identifier assigned to a booking certificate intermediation license. It is designed to prevent duplication of generated identifiers, such as taking out a bit string at random from a sufficiently large space.

Error message preparing unit 1604: It prepares an error message.

Booking certificate intermediation license preparing unit 1605: It prepares a booking certificate intermediation license. To append a digital signature to the booking certificate intermediation license, it calls the signature preparing unit 1607.

Booking certificate intermediation license delivery preparing unit 1606: It prepares a booking certificate intermediation license delivery. To append a digital signature to the booking certificate intermediation license delivery, it calls the signature preparing unit 1607. It further accesses the certificate memory unit 1308 to obtain the public key certificate of a verification key for the signature of the provider.

Signature preparing unit 1607: It prepares a digital signature for a booking certificate intermediation license and a booking certificate intermediation license delivery, and accesses the certificate memory unit 1307 to obtain a signature key for a digital signature.

Booking conditions limitation information preparing unit 1608: It prepares booking conditions limitation information to be entered in a booking certificate intermediation license.

Figure 17:
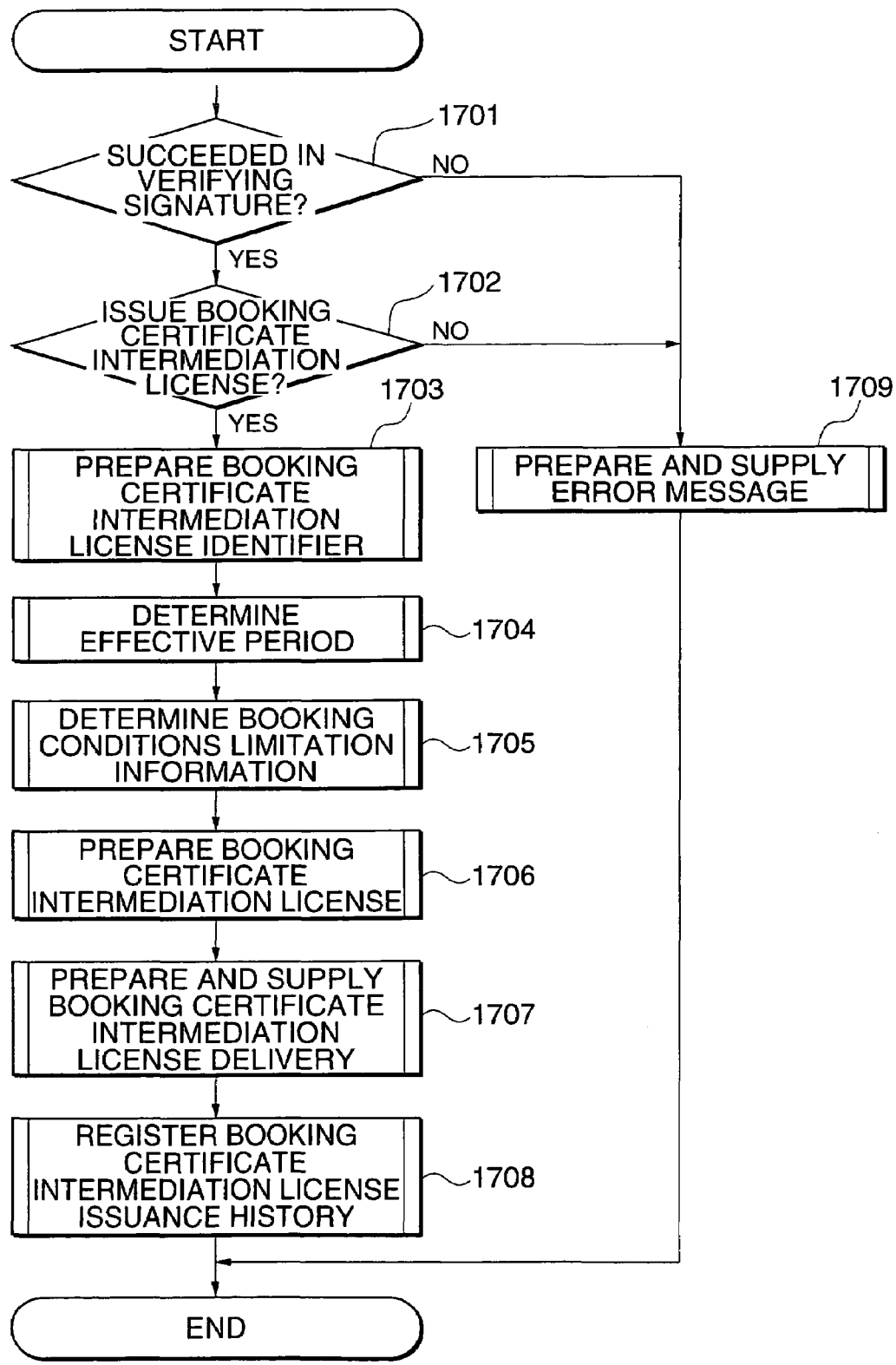
FIG. 17 is a flowchart showing the operation of a processing control unit of a booking certificate intermediation license request processing unit provided in the provider to which the invention is applied.

FIG. 17 is a flowchart showing the operation of a processing control unit of the booking certificate intermediation license request processing unit provided in the provider of this embodiment. The operation of the processing control unit 1601 will be described below with reference to FIG. 17.

First, the digital signature of the booking certificate intermediation license request inputted from the processing selection unit 1302 is checked (1701). As the verification key, what is appended to the certificate field of the request is used. But if the required public key certificate is absent in the certificate field, the signature is checked after a required public key certificate is obtained from the CA 111.

If the signature fails to be verified, an error message is prepared by the error message preparing unit 1604 and, after it is supplied to the input/output control unit 1301 (1709), the processing is ended.

If the signature is successfully verified, it is determined whether or not to issue the booking certificate intermediation license requested with the booking certificate intermediation license request (1702). It is up to the provider to decide whether or not to the booking certificate intermediation license. The provider doesn't issue a booking certificate intermediation license when the identifier entered in the licenser field of the booking certificate intermediation license specifications contained in the request is different from the provider's. And when the verification public key information having the verification public key identifier entered in the public key identifier field of the booking certificate intermediation license specifications contained in the request is not information issued to the provider, the provider doesn't issue a license. Also, when it is impossible to comply with the preference stated in the desired booking conditions limitation information field of the booking certificate intermediation license specifications contained in the request, the provider doesn't issue a license. Furthermore, the issuance of the booking certificate intermediation license is refrained if, for instance, the retailer to be licensed with the booking certificate intermediation license is not trustworthy.

If it is decided at step 1702 not to issue the booking certificate intermediation license, an error message is prepared by the error message preparing unit 1604. After it is supplied to the input/output control unit 1301 (1709), the processing is ended.

If it is decided at step 1702 to issue the booking certificate intermediation license, the booking certificate intermediation license identifier preparing unit 1603 is called to have an identifier to be assigned to the booking certificate intermediation license prepared. After receiving the identifier so prepared (1703), the effective period of the forthcoming booking certificate intermediation license is appropriately determined (1704).

Further, the booking conditions limitation information preparing unit 1608 is called to have the booking conditions limitation information to be contained in the forthcoming booking certificate intermediation license prepared, and the result is received (1705). The booking conditions limitation information prepared here may be what is entered in the desired booking conditions limitation information field of the booking certificate intermediation license specifications contained in the booking certificate intermediation license request. In addition, it may be what is determined by the provider at its own discretion to be appropriate booking conditions limitation information.

Next, the booking certificate intermediation license preparing unit 1605 is called to have the booking certificate intermediation license prepared, and the result is received (1706). The following values are set in the fields of the booking certificate intermediation license.

Issuer field: The provider's own identifier.

Recipient field: The value of the licensee field of the booking certificate intermediation license specifications contained in the booking certificate intermediation license request.

Issuance date field: The current date/time.

Booking certificate intermediation license identifier field: The identifier prepared at step 1703.

Start of effective period attribute: The starting date/time of the effective period determined at step 1704.

End of effective period attribute: The ending date/time of the effective period determined at step 1704.

Public key identifier field: The value of the identifier field of the public key of the booking certificate intermediation license specifications contained in the request.

Booking conditions limitation information field: The value of the booking conditions limitation information determined at step 1705.

Digital signature field: The digital signatures for data of other fields of this booking certificate intermediation license than this field. To prepare the digital signatures, the signature preparing unit 1607 is called, and the resulting signature values are received and set in this field.

Next, the booking certificate intermediation license delivery preparing unit 1606 is called to have a booking certificate intermediation license delivery prepared, and the result is received and supplied to the input/output control unit 1301 (1707). The following values are set in the fields of the booking certificate intermediation license delivery.

Sender field: The provider's own identifier.

Receiver field: The identifier entered in the sender field of the booking certificate intermediation license request.

Date/time field: The current date/time.

Booking certificate intermediation license field: The booking certificate intermediation license prepared at step 1706.

Digital signature field: The digital signatures for data of other fields of the booking certificate intermediation license delivery than this and certificate fields. To prepare the digital signatures, the signature preparing unit 1607 is called, and the resulting signature values are set in this field.

Certificate field: The public key certificate stored in the certificate memory unit 1308.

Finally, after adding a new entry representing the issuance booking certificate intermediation license to the booking certificate intermediation license issuance history DB 1309, the processing is ended. The following values are stored as the attributes of the additional entry.

Booking certificate intermediation license identifier attribute: The identifier prepared at step 1703.

Public key identifier attribute: The value of the public key identifier field of the booking certificate intermediation license specifications contained in the booking certificate intermediation license request.

Retailer identifier attribute: The value of the licensee field of the booking certificate intermediation license specifications contained in the request.

Booking conditions limitation information attribute: The value of the booking conditions limitation information determined at step 1705.

Start of effective period attribute: The starting date/time of the of the effective period determined at step 1704.

End of effective period attribute: The ending date/time of the effective period determined at step 1704.

Issuance date attribute: The value entered in the issuance date field of the booking certificate intermediation license prepared at step 1706.

[Other Functions the Provider has]

The provider in this embodiment can deliver booking certificate intermediation license issuance history information to retailers.

The booking certificate intermediation license issuance history information to be delivered to a retailer, which is information regarding booking certificate intermediation licenses issued to that retailer, is prepared by the booking certificate intermediation license issuance history preparing unit 1310, and delivered to the retailer via the input/output control unit 1301. This history serves as the basis of the fee for the issuance of any booking certificate intermediation license the provider charges to the retailer.

The booking certificate intermediation license issuance history preparing unit 1310 is given the identifier of the retailer for whom the history is to be prepared and the designation of the starting date/time and the ending date/time of the period to be covered by the history so prepared. Then, the unit takes out of the booking certificate intermediation license issuance history DB 1309 a group of entries the value of whose retailer identifier attribute is identical with the designated retailer identifier and the value of the issuance date attribute is within the designated period of coverage by the history. Furthermore, the unit takes out the values of the booking certificate intermediation license identifier attribute, the public key identifier attribute, the booking conditions limitation information attribute, the start of effective period attribute, the end of effective period attribute and the issuance date attribute from the extracted entries. In this embodiment, the designation of the identifier of the retailer for whom the history is to be prepared and of the period to be covered by the history so prepared is received from the operator of the provider. But it may as well be inputted by the retailer via the Internet.

The means of delivering this history information may be either electronic mail or issuance on demand on a WWW base. Where there is a fear of tapping or alteration, it is preferable to apply encryption or a digital signature.

[Configuration of a Retailer]

Figure 18:
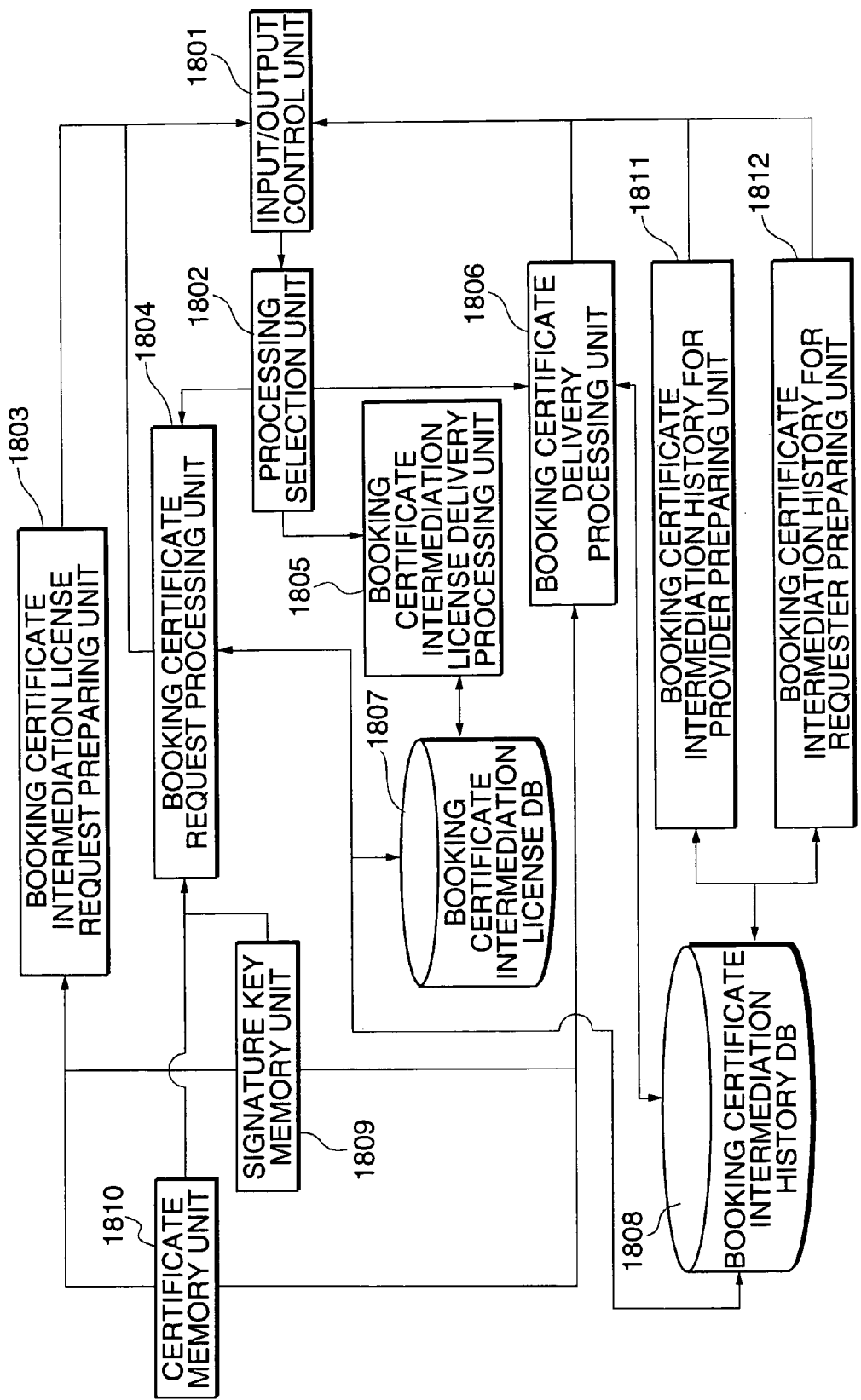
FIG. 18 illustrates the configuration of a retailer to which the invention is applied.

FIG. 18 illustrates the configuration of a retailer in this embodiment of the invention.

A retailer in this embodiment has a function to prepare a booking certificate intermediation license request and deliver it to the provider via the Internet. In addition, the retailer has a function to process a booking certificate intermediation license delivery, a booking certificate request and a booking certificate delivery inputted via the Internet. Furthermore, the retailer has a function to prepare a booking certificate intermediation history and deliver it to the provider and/or the requestor of intermediation of booking certificate via the Internet. The retailer has an input/output control unit 1801, a processing selection unit 1802, a booking certificate intermediation license request preparing unit 1803, a booking certificate request processing unit 1804, a booking certificate intermediation license delivery processing unit 1805, a booking certificate delivery processing unit 1806, a booking certificate intermediation license DB 1807, a booking certificate intermediation history DB 1808, a signature key memory unit 1809, a certificate memory unit 1810, booking certificate intermediation history for provider preparing unit 1811 and a booking certificate intermediation history for requester preparing unit 1812. The retailer is connected to the Internet via the input/output control unit 1801.

The roles of various parts of the retailer in this embodiment will be described below.

Input/output control unit 1801: While monitoring data inputs via the Internet, this unit supplies via the Internet data prepared by the booking certificate intermediation license request preparing unit 1803, the booking certificate request processing unit 1804 and the booking certificate delivery processing unit 1806. Methods usable for inputs from the Internet to the input/output control unit 1804 or outputs from the input/output control unit 1804 include establishment of a WWW site connected to the input/output control unit 1804 to be offered for accessing by other entities. Accessing a WWW site prepared by another entity for delivery of data prepared by the retailer is another possible method. In addition, either automatic or manual interlocking of an electronic mail system and the input/output control unit 1804 is available method for connecting this unit and the Internet too.

Processing selection unit 1802: It judges whether the set of data that is inputted is a booking certificate request, a booking certificate intermediation license delivery or a booking certificate delivery. After the judgement, this unit calls the booking certificate request processing unit 1804 if it is a booking certificate request, the booking certificate intermediation license delivery processing unit 1805 if it is a booking certificate intermediation license delivery, or the booking certificate delivery processing unit 1806 if it is a booking certificate delivery.

Booking certificate intermediation license request preparing unit 1803: It prepares a booking certificate intermediation license request, and delivers it to the provider via the input/output control unit 1801. In the course of preparing the booking certificate intermediation license request, it accesses the signature key memory unit 1809 and the certificate memory unit 1810.

Booking certificate request processing unit 1804: It processes a booking certificate request from a consumer, prepares a second booking certificate request, and delivers it to the center via the input/output control unit 1801. In the course of processing, it refers to the booking certificate intermediation license DB 1807, and adds a new entry to the booking certificate intermediation history DB 1808. It further accesses the signature key memory unit 1809 and the certificate memory unit 1810.

Booking certificate intermediation delivery processing unit 1805: It processes the booking certificate intermediation license delivery from the provider, and registers the booking certificate intermediation license contained in the booking certificate intermediation license delivery into the booking certificate intermediation license DB 1807.

Booking certificate delivery processing unit 1806: It processes a booking certificate delivery delivered from the center, prepares a second booking certificate delivery, and delivers it to a consumer via the input/output control unit 1801. In the course of processing, it updates entries in the booking certificate intermediation history DB 1808, and accesses the signature key memory unit 1809 and the certificate memory unit 1810.

Booking certificate intermediation license DB 1807: This DB holds a booking certificate intermediation license issued by the provider to this retailer.

Booking certificate intermediation history DB 1808: This DB holds a history concerning booking certificates for which this retailer served as the intermediator.

Signature key memory unit 1809: It holds the signature key to be used for the digital signature prepared by the retailer.

Certificate memory unit 1810: It holds a public key certificate containing a verification key with which a digital signature prepared with a signature key stored in the signature key memory unit 1809 can be checked.

Booking certificate intermediation history for provider preparing unit 1811: It prepares a booking certificate intermediation history for each provider, and delivers it to the pertinent provider via the input/output control unit 1801.

Booking certificate intermediation history for requester preparing unit 1812: It prepares a booking certificate intermediation history for each requester pertaining to booking certificate intermediation requests the retailer has received, and delivers it to the pertinent requester via the input/output control unit 1801.

[Databases the Retailer has]

The retailer has two databases including the booking certificate intermediation license DB 1807 and the booking certificate intermediation history DB 1808.

The booking certificate intermediation license DB 1807 is a database that holds information regarding booking certificate intermediation licenses the retailer has received from plural providers.

The structure of the booking certificate intermediation license DB 1807 is illustrated in FIG. 19. The booking certificate intermediation license DB 1807 is a table listing the following five attributes, in which each entry corresponds to one booking certificate intermediation license.

Booking certificate intermediation license identifier attribute: The booking certificate intermediation license identifier assigned to the booking certificate intermediation license issued by the provider.

Public key identifier attribute: The identifier of the verification public key pertaining to which intermediation of a request for booking certificate has been licensed with a booking certificate intermediation license issued by the provider.

Provider identifier attribute: The identifier of the provider who issued the booking certificate intermediation license.

Booking certificate intermediation license attribute: Data resulting from the encoding, in accordance with BER, of the booking certificate intermediation license itself issued by the provider.

Provider certificate attribute: Data resulting from the encoding, in accordance with BER, of public key certificate containing the public key with which the digital signature of the provider who issued the booking certificate intermediation license can be checked.

The booking certificate intermediation history DB 1808 is a database holding information regarding booking certificates of which the retailer performed intermediation.

The structure of the booking certificate intermediation history DB 1808 is illustrated in FIG. 20. The booking certificate intermediation history DB 1808 is a table listing the following eight attributes, in which each entry corresponds to intermediation of one booking certificate.

Booking certificate identifier attribute: The identifier assigned by the center to the booking certificate pertaining to which intermediation was performed.

Public key identifier attribute: The identifier assigned by the center to the verification public key with which the legitimacy of the booking certificate having undergone intermediation can be checked.

Provider identifier attribute: The identifier of the provider who is the user of the verification public key information designated by the public key identifier attribute.

Consumer identifier attribute: The identifier of the consumer to whom the booking certificate has been issued.

Requester identifier attribute: The identifier of the entity who has delivered the booking certificate request to the retailer.

Booking conditions attribute: The booking conditions entered in the booking certificate having undergone intermediation.

Request date/time attribute: The preparation date/time of the booking certificate request the retailer has received.

Sending date/time attribute: The date/time of preparation of the booking certificate delivery by the retailer.

[Booking Certificate Intermediation License Request Preparing Unit]

A retailer in this embodiment, when it wishes to start selling on an advance booking basis any product or service available from a provider, should receive from the provider a booking certificate intermediation license for the intermediation of a booking certificate corresponding to the verification public key assigned to that product of service. In order to get the booking certificate intermediation license from the provider, the retailer prepares a booking certificate intermediation license request at the booking certificate intermediation license request preparing unit 1803, and delivers it to the provider via the input/output control unit 1801.

The booking certificate intermediation license request preparing unit 1803 sets the following values in the fields of the booking certificate intermediation license request.

Sender field: The retailer's own identifier.

Receiver field: The identifier of the provider, whom the booking certificate intermediation license is requested for.

Date/time field: The current point of time.

Booking certificate intermediation license specifications field: The preferences of the retailer regarding the booking certificate intermediation license to be prepared are entered.

Digital signature field: The digital signatures for data of other fields of this request than this and certificate fields. To prepare the digital signatures, the booking certificate intermediation license request preparing unit 1803 includes a signature preparing unit, and the values of signatures prepared by this signature preparing unit are set in this field. The signature key is obtained by accessing the signature key memory unit 1809.

Certificate field: The public key certificate stored in the certificate memory unit 1810.

The following values are set in the fields of the booking certificate intermediation license specifications entered in the booking certificate intermediation license specifications field of the booking certificate intermediation license request.

Licenser field: The identifier of the provider from whom a booking certificate intermediation license is desired.

Licensee field: The retailer's own identifier.

Public key identifier field: The verification public key identifier assigned to the verification public key with which the issuance of a booking certificate intermediation license is desired.

Desired booking conditions limitation information field: The booking conditions limitation information desired to be entered into the booking certificate intermediation license.

[Booking Certificate Intermediation Delivery Processing Unit]

As the booking certificate intermediation license request preparing unit 1803 prepares a booking certificate intermediation license request and delivers the request to the provider, a booking certificate intermediation license delivery is transmitted from the provider in return. The booking certificate intermediation license delivery is delivered to the booking certificate intermediation delivery processing unit 1805 via the input/output control unit 1801 and the processing selection unit 1802, and processed there.

Figure 21:
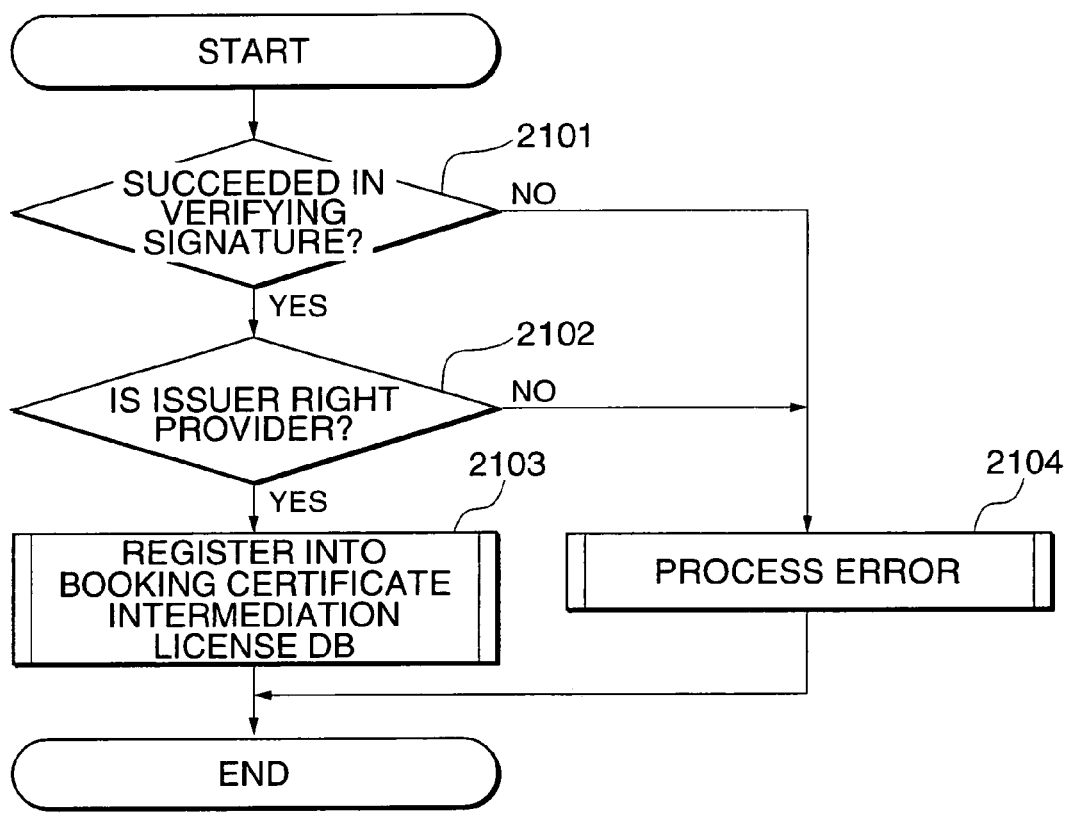
FIG. 21 is a flowchart showing the operation of a booking certificate intermediation license delivery processing unit provided in the retailer to which the invention is applied.

FIG. 21 is a flowchart showing the operation of a booking certificate intermediation license delivery processing unit 1805 the retailer in this embodiment is provided with. The operation of the booking certificate intermediation delivery processing unit 1805 will be described below with reference to FIG. 21.

First, the digital signature of the booking certificate intermediation license delivery inputted from the processing selection unit 1802 and the digital signature of the booking certificate intermediation license contained in the booking certificate intermediation license delivery are checked (2101). As the verification key, what is appended to the certificate field of the booking certificate intermediation license delivery is used, but if the required public key certificate is absent in the certificate field, the signature is checked after a public key certificate is obtained from the CA 111. For verification of signatures, the booking certificate intermediation delivery processing unit 1805 includes a signature verifying unit dedicated to checking of digital signatures.

If the signature fails to be verified at step 2101, the processing is ended after error processing (2104).

If the digital signature is successfully verified at step 2101, it is checked whether or not the originator of the booking certificate intermediation license contained in the booking certificate intermediation license delivery is the right provider (2102). A number of variations are conceivable for the criterion of distinguishing the right provider from wrong ones. One of the conceivable criteria is, for instance, whether or not the value of the issuer field of the booking certificate intermediation license contained in the booking certificate intermediation license delivery is identical with the identifier entered in the licenser field of the booking certificate intermediation license specifications contained in the booking certificate intermediation license request by the requester. If it is desired to check the relationship between the verification public key with which intermediation of the booking certificate is to be licensed by the booking certificate intermediation license included in the booking certificate intermediation license delivery and the issuer of the booking certificate intermediation license included in the same booking certificate intermediation license delivery, the verification public key information issued by the center can be referred to. Since disclosure of verification public key information doesn't cause any security problem, it can be freely disclosed by either the center or the provider in the form of downloading the verification public key information.

If checking at step 2102 reveals that the originator of the booking certificate intermediation license is not the right provider, the processing is ended after error processing (2104).

If checking at step 2102 reveals that the originator of the booking certificate intermediation license is the right provider, a new entry is added to the booking certificate intermediation license DB 1807 (2103). The following values are set as the attributes of the new entry.

Booking certificate intermediation license identifier attribute: The value of the booking certificate intermediation license identifier field of the booking certificate intermediation license contained in the booking certificate intermediation license delivery.

Public key identifier attribute: The value of the identifier field in the booking certificate intermediation license contained in the booking certificate intermediation license delivery.

Provider identifier attribute: The value of the issuer field of the booking certificate intermediation license contained in the booking certificate intermediation license delivery.

Booking certificate intermediation license attribute: The result of encoding in accordance with BER of the booking certificate intermediation license contained in the booking certificate intermediation license delivery.

Provider certificate attribute: The result of encoding in accordance with BER of the public key certificate including the signature verification key of the provider contained in the booking certificate intermediation license delivery.

[FOR Booking Certificate Request Processing Unit]

Figure 22:
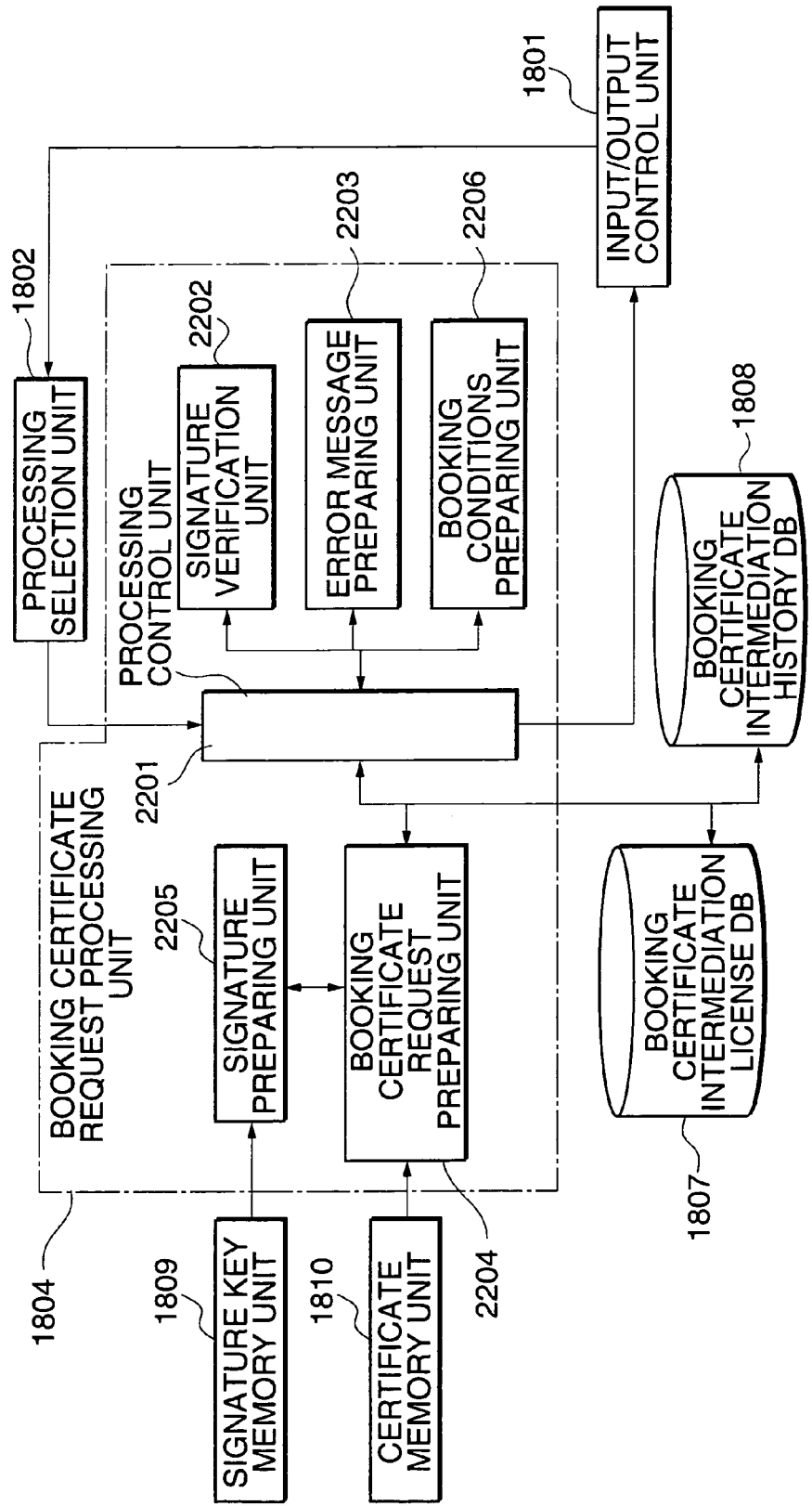
FIG. 22 illustrates the internal structure of a booking certificate request processing unit provided in the retailer to which the invention is applied.

FIG. 22 illustrates the internal structure of the booking certificate request processing unit 1804 the retailer in this embodiment has.

The booking certificate request processing unit 1804 has a function to process a booking certificate request transmitted from a consumer or another retailer, prepare a booking certificate request addressed to the center, and deliver it via the input/output control unit 1801. This unit has a processing control unit 2201, a signature verification unit 2202, an error message preparing unit 2203, a booking certificate request preparing unit 2204, a signature preparing unit 2205 and a booking conditions preparing unit 2206.

The roles of various constituent parts of the booking certificate request processing unit 1804 will be described below.

Processing control unit 2201: In addition to performing the functions to accept an input from the processing selection unit 1802, this unit provides an output to the input/output control unit 1801, refers to the booking certificate intermediation license DB 1807, and adds an entry to the booking certificate intermediation history DB 1808. Furthermore, this unit carries out overall control of the processing of a request for booking certificate.

Signature verification unit 2202: It verifies the digital signature of a booking certificate request inputted from the processing selection unit 1802.

Error message preparing unit 2203: It prepares an error message.

Booking certificate request preparing unit 2204: It prepares a booking certificate request to be delivered to the center. It calls the signature preparing unit 2205 to append a digital signature to the request. It further accesses the certificate memory unit 1810 to obtain the public key certificate of the verification key for the retailer's signature.

Signature preparing unit 2205: It prepares a digital signature for the booking certificate request prepared by the booking certificate request preparing unit 2204. It accesses the signature key memory unit 1809 to obtain the signature key for the digital signature.

Booking conditions preparing unit 2206: It prepares the booking conditions to be contained in the requested booking certificate.

Figure 23:
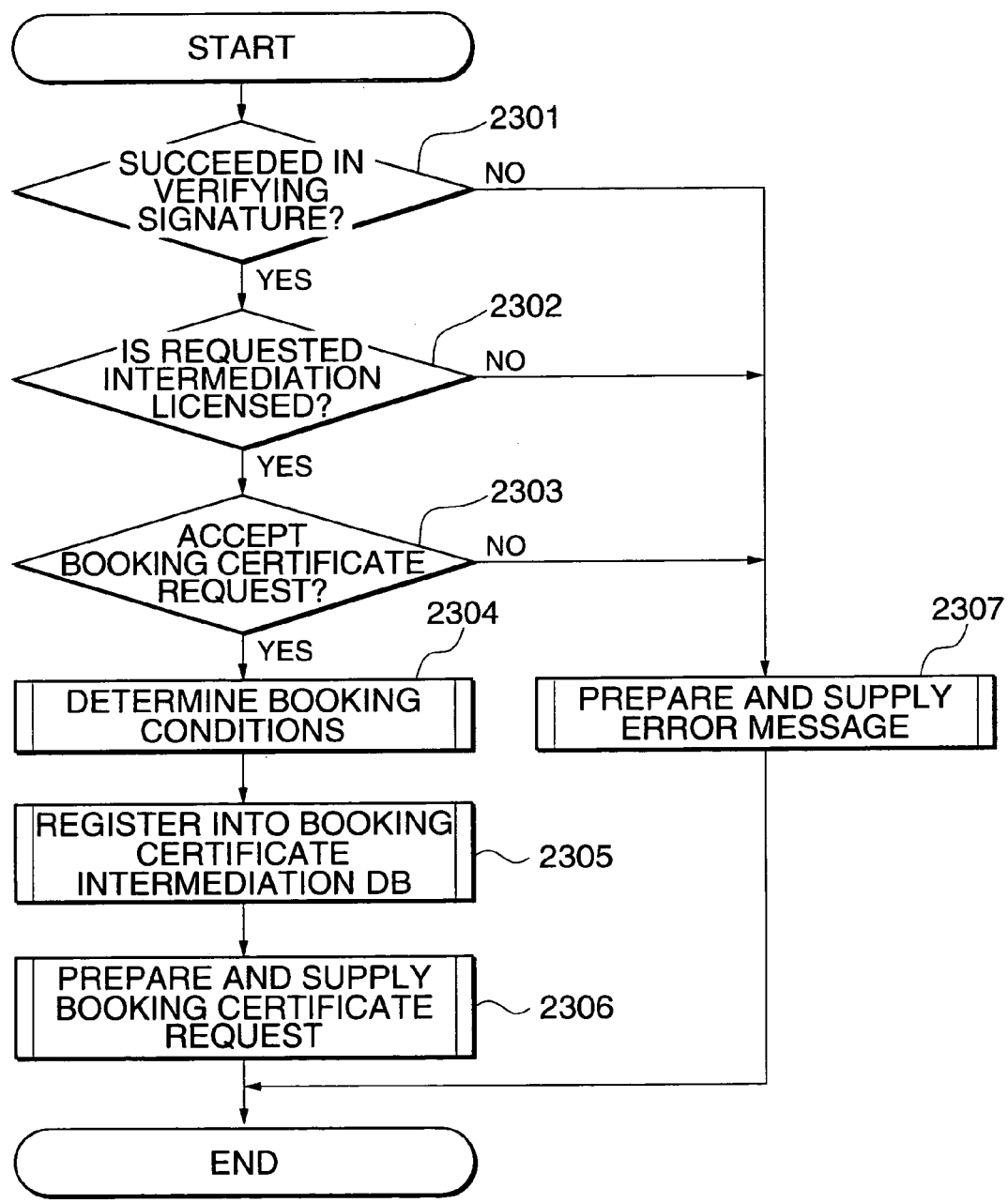
FIG. 23 is a flowchart showing the operation of the booking certificate request processing unit provided in the retailer to which the invention is applied.

FIG. 23 is a flowchart showing the operation of the processing control unit 2201 of the booking certificate request processing unit 1804 the retailer in this embodiment is provided with. The operation of the processing control unit 2201 will be described below with reference to FIG. 23.

First, the digital signature of the booking certificate request inputted from the processing selection unit 1802 is checked (2301). As the verification key, what is appended to the certificate field of the booking certificate request is used, but if the required public key certificate is absent in the certificate field, the signature is checked after a public key certificate is obtained from the CA 111.

If the signature fails to be verified, an error message is prepared by the error message preparing unit 2203 and, after it is supplied to the input/output control unit 1801 (2307), the processing is ended.

If the signature is successfully verified, it is checked whether or not intermediation of the booking certificate whose intermediation is requested with the inputted request is licensed (2302). If there exists in the booking certificate intermediation license DB 1807 a booking certificate intermediation license for the verification public key, the booking certificate matching with which is requested with the request and the booking conditions entered in the request are within the extent of the booking conditions limitation information entered in the booking certificate intermediation license held in the booking certificate intermediation license DB 1807, it is judged that the intermediation is licensed.

If it is judged by checking at step 2302 no intermediation is licensed, an error message is prepared by the error message preparing unit 2203 and, after it is supplied to the input/output control unit 1801 (2307), the processing is ended.

If it is judged by checking at step 2302 the intermediation is licensed, it is judged whether or not to accept the booking certificate request (2303). If the consumer or the retailer, who is the sender of the inputted request, is not trustworthy, it is determined here not to accept the request.

If it is determined at step 2303 not to accept the request, an error message is prepared by the error message preparing unit 2203 and, after it is supplied to the input/output control unit 1801 (2307), the processing is ended.

If it is determined at step 2303 to accept the booking certificate request, the booking conditions preparing unit 2206 is called to have booking conditions to be entered into the request for booking certificate for delivery to the center prepared, and its result is received (2304). The booking conditions prepared by the booking conditions preparing unit 2206 may either be the booking conditions entered in the inputted request as they are or be modified if necessary to some other appropriate booking conditions at the discretion of the retailer.

Once the booking conditions are determined, the entry holding information concerning the booking certificate request currently being processed is added to the booking certificate intermediation history DB 1808 (2305). The following values are set as the attributes of the new entry.

Booking certificate identifier attribute: No value is set at this point of time.

Public key identifier attribute: The value entered in the public key identifier field of the booking specifications contained in the inputted request.

Provider identifier attribute: The identifier of the provider, who is the user of the verification public key information identified by the identifier set in the public key identifier attribute. The identifier of the provider can be obtained by referencing the booking certificate intermediation license DB. Thus, it is the provider identifier attribute of an entry in the booking certificate intermediation license DB, having the value of the public key identifier attribute identical with the value of the public key identifier attribute described above.

Consumer identifier attribute: The value of the consumer identifier field of the booking specifications contained in the entered request.

Requester identifier attribute: The value of the sender field of the entered request.

Booking conditions attribute: The booking conditions determined at step 2304.

Request date/time attribute: The value of the date/time field of the entered request.

Sending date/time attribute: No value is set at this point of time.

Finally, the booking certificate request to be delivered to the center is prepared. After sending the generated request to the center via the input/output control unit 1801 (2306), the process is ended. The following values are set in the fields of the generated request to be delivered to the center.

Sender field: The retailer's own identifier.
Receiver field: The center's identifier.
Date/time field: The current date/time.
Booking particulars field: The booking specifications to be described below.

Digital signature field: The digital signatures for data of other fields of the generated request than this and certificate fields. To prepare the digital signatures, the signature preparing unit 2205 is called to have the signatures prepared, and the result is set in this field. The signature key is obtained by accessing the signature key memory unit 1809.

Certificate field: The public key certificate stored in the certificate memory unit 1810.

The following values are entered into the fields of the booking specifications to be stated in the booking particulars field.

Public key identifier field: The value entered in the public key identifier field of the booking specifications contained in the inputted booking certificate request.

Consumer identifier field: The value entered in the consumer identifier field of the booking specifications of the inputted request.

Booking conditions field: The booking conditions determined at step 2304.

Booking certificate intermediation license field: The booking certificate intermediation license for the verification public key with which the issuance of a booking certificate has been requested with the inputted request held by the booking certificate intermediation license DB 1807.

[Booking Certificate Delivery Processing Unit]

Figure 24:
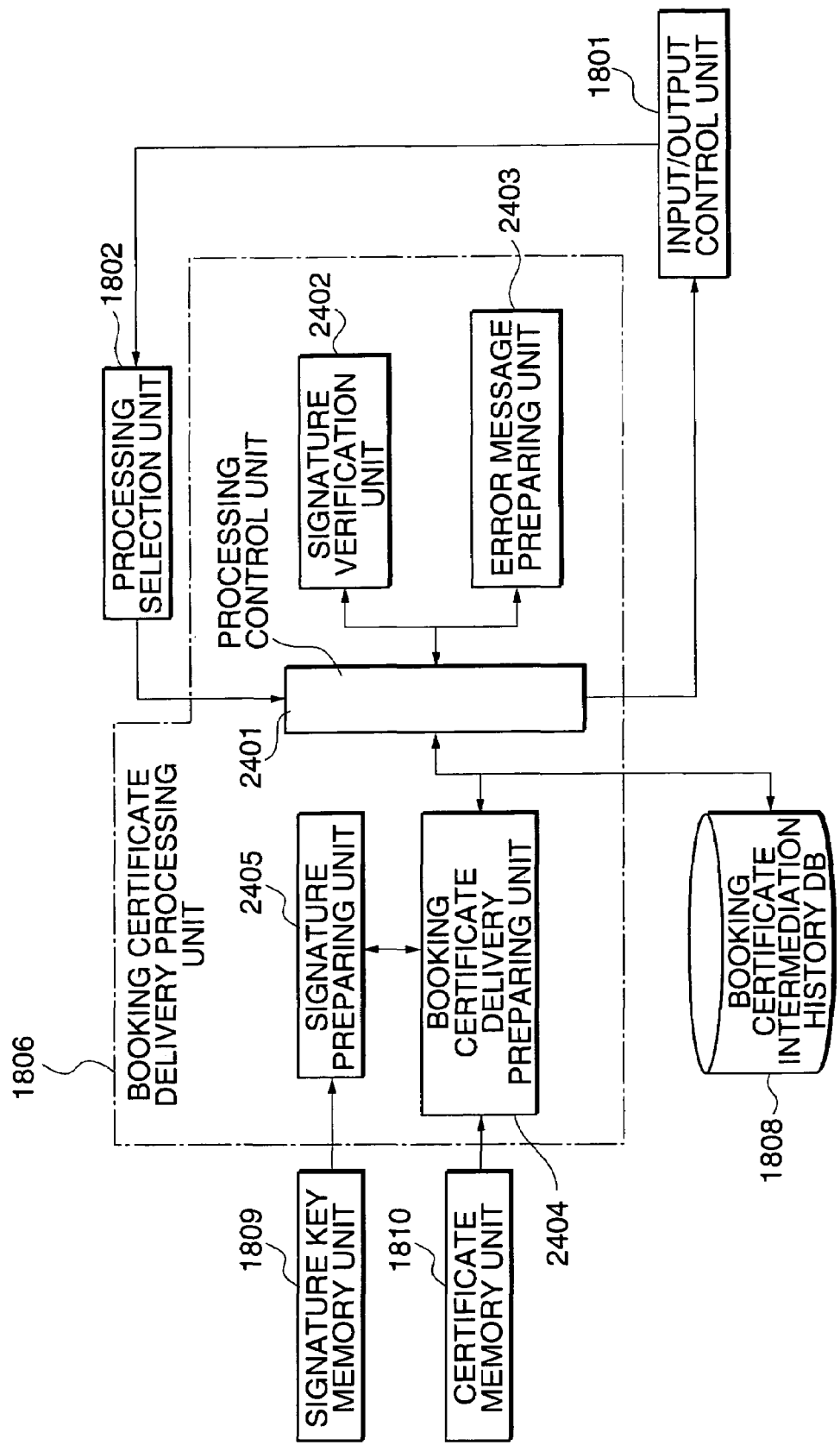
FIG. 24 illustrates the internal structure of the booking certificate delivery processing unit provided in the retailer to which the invention is applied.

FIG. 24 illustrates the internal structure of the booking certificate delivery processing unit 1806 the retailer in this embodiment is provided with.

The booking certificate delivery processing unit 1806 has functions to process a booking certificate delivery transmitted from either the center or another retailer, prepare a booking certificate delivery to be delivered to the requester of the booking certificate, and deliver it to the requester via the input/output control unit 1801. The booking certificate delivery processing unit has a processing control unit 2401, a signature verification unit 2402, an error message preparing unit 2403, a booking certificate delivery preparing unit 2404 and a signature preparing unit 2405.

The roles of various constituent parts of the booking certificate delivery processing unit 1806 will be described below.

Processing control unit 2401: This unit has the functions to accept an input from the processing selection unit 1802, provide an output to the input/output control unit 1801, and update entries in the booking certificate intermediation history DB 1808. In addition, this unit carries out overall control of the processing of a booking certificate delivery.

Signature verification unit 2402: It verifies the digital signature of a booking certificate delivery entered from the processing selection unit 1802 and the digital signature of the booking certificate contained in the booking certificate delivery.

Error message preparing unit 2403: It prepares an error message.

Booking certificate delivery preparing unit 2404: It prepares a booking certificate delivery to be delivered to the requester of the booking certificate. The signature preparing unit 2405 is called to append a digital signature to the booking certificate delivery to be newly prepared. It further accesses the certificate memory unit 1810 to obtain the public key certificate of the verification key of the retailer's signature.

Signature preparing unit 2405: It prepares the digital signature for the booking certificate delivery to be prepared by the booking certificate delivery preparing unit 2404. It accesses the signature key memory unit 1809 to obtain the signature key for the digital signature.

Figure 25:
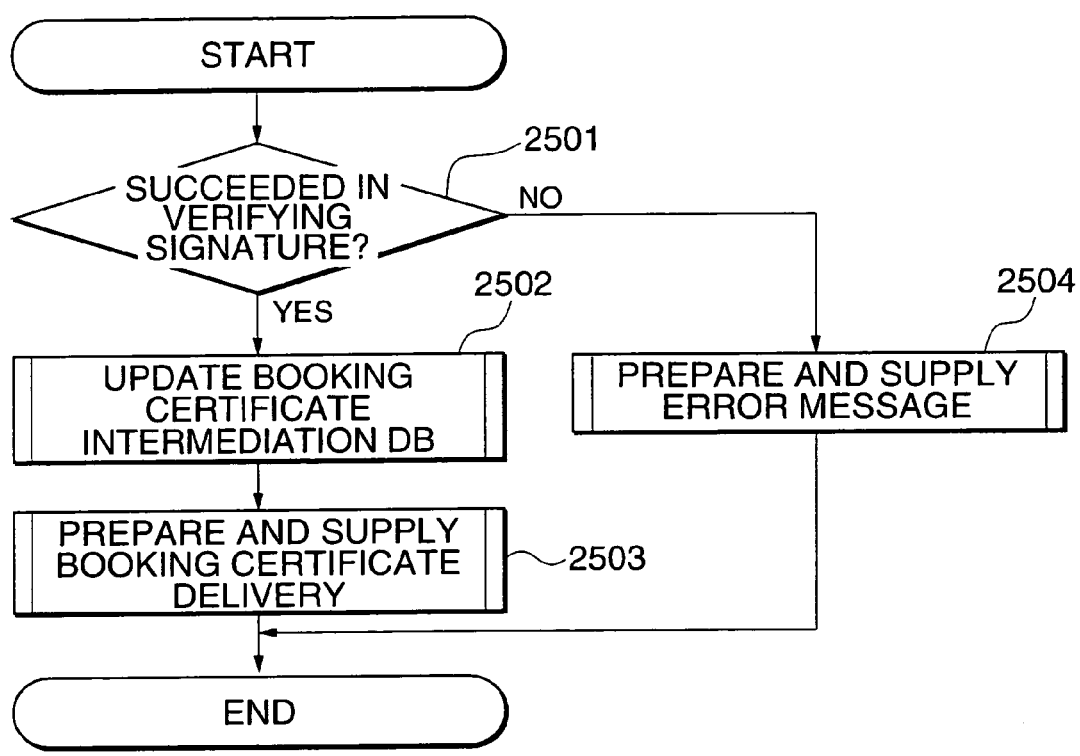
FIG. 25 is a flowchart showing the operation of the booking certificate delivery processing unit provided in the retailer to which the invention is applied.

FIG. 25 is a flowchart showing the operation of the processing control unit 2401 of the booking certificate delivery processing unit 1806 the retailer in this embodiment has. The operation of the processing control unit 2401 will be described below with reference to FIG. 25.

First, the digital signature of the booking certificate delivery entered from the processing selection unit 1802 and the digital signature of the booking certificate contained in the booking certificate delivery are checked (2501). As the verification key, what is appended to the certificate field of the booking certificate delivery is used. But if the required public key certificate is absent in the certificate field, the signature is checked after a public key certificate is obtained from the CA 111.

If the signature fails to be verified, an error message is prepared by the error message preparing unit 2403 and, after it is supplied to the input/output control unit 1801 (2504), the processing is ended.

If the signature is successfully verified, an entry in the booking certificate intermediation history DB 1808 is updated in accordance with the particulars delivered with the inputted booking certificate delivery (2502). The entry to be updated is the entry that was added when the booking certificate request matching the inputted booking certificate delivery was processed. The values of the public key identifier attribute and the consumer identifier attribute of the entry to be updated are respectively identical with the values of the public key identifier field and the recipient field of the booking certificate contained in the inputted booking certificate delivery. Furthermore, no values are set for the booking certificate identifier attribute and the sending date/time attribute of the entry to be updated.

The attributes of the entry are updated in the following manner.

Booking certificate identifier attribute: The value of the booking certificate identifier field of the booking certificate contained in the inputted booking certificate delivery.

Public key identifier attribute: No change.
Provider identifier attribute: No change.
Consumer identifier attribute: No change.
Requester identifier attribute: No change.
Booking conditions attribute: The value of the booking conditions field of the booking certificate contained in the inputted booking certificate delivery.
Request date/time attribute: No change.
Sending date/time attribute: The current point of time.

Finally, a new booking certificate delivery to be delivered to the requester of the booking certificate is prepared. After delivering it to the requester of the booking certificate via the input/output control unit 1801 (2503), the processing is ended. The following values are set in the fields of the newly prepared booking certificate delivery.

Sender field: The retailer's own identifier.

Receiver field: The value of the requester identifier attribute of the entry in the booking certificate intermediation history DB 1808 updated at step 2502.

Date/time field: The value of the sending date/time attribute of the entry in the booking certificate intermediation history DB 1808 updated at step 2502.

Booking certificate field: The booking certificate contained in the inputted booking certificate delivery.

Digital signature field: The digital signatures for data of other fields of this booking certificate delivery than this and certificate fields. To prepare the digital signatures, the signature preparing unit 2405 is called to have the signatures prepared, and the resultant signature values are set in this field.

Certificate field: Out of the public key certificate stored in the certificate memory unit 1810 and the certificate contained in the certificate field of the inputted booking certificate delivery, which includes a verification key with which the digital signature of the booking certificate contained in the booking certificate delivery can be verified.

[Billing or Account Settlement for a Booking Certificate Request]

The retailer in this embodiment can bill or settle the account for the issuance of a booking certificate in the course processing of the booking certificate request. The billing or the account settlement is done after the booking certificate request is received from the consumer and before the second booking certificate request is delivered to the center.

In the case of billing, fees for booking certificate issuance are added for each consumer in the course of processing booking certificate requests, and charged to the consumer afterwards. For this purpose, the retailer in this embodiment has a database for holding the current sum of booking certificate issuance fees to be received from each consumer.

The retailer in this embodiment can also settle the account for booking certificate issuance every time its booking certificate request is processed. There are number of available methods of settlement including the use of a credit card the consumer has and prepayment. In any case a booking certificate request for a consumer is delivered to the center only after the settlement of the account for issuance of the booking certificate request has been confirmed.

The fee for booking certificate issuance may as well be collected through the provider at the time of checking the legitimacy of the booking certificate.

In this case, fee information is entered in the booking conditions contained in the booking certificate. Either direct or automatic collection of the fee can be checked when the booking certificate verifying device installed at the provider checks the booking certificate and judges whether or not the booking conditions contained in the booking certificate are satisfied.

[History Information Issued by the Retailer]

The retailer in this embodiment can deliver booking certificate intermediation history information to the provider.

The booking certificate intermediation history information delivered to the provider concerns the intermediation of the booking certificate matching the verification public key assigned to that provider. It is prepared by the booking certificate intermediation history for provider preparing unit 1811, and delivered to the provider via the input/output control unit 1801. This history serves as the basis of the sum of the margin the retailer delivers to the provider.

The booking certificate intermediation history for provider preparing unit 1811, given the designation of the identifier of the provider for whom the history is prepared and of the starting date/time and the ending date/time of the period to be covered by the history. Then, this unit takes out of the booking certificate intermediation history DB 1808 a group of entries the value of whose provider identifier attribute is identical with the designated provider identifier and the value of the issue date attribute is within the designated period of coverage by the history. Furthermore, the unit gets the values of the booking certificate identifier attribute, the public key identifier attribute, the booking conditions attribute, the request date/time attribute and the sending date/time attribute from the extracted entries. In this embodiment, the designation of the identifier of the provider for whom the history is to be prepared and of the period to be covered by the history so prepared is received from the operator of the retailer. It may as well be entered by the provider via the Internet.

The retailer in this embodiment can deliver booking certificate intermediation history information to the requester of booking certificate intermediation as well.

The booking certificate intermediation history information to be delivered to the requester concerns the intermediation of the booking certificate requested by that requester. It is prepared by the booking certificate intermediation history for requester preparing unit 1812, and delivered to the requester via the input/output control unit 1801. This history serves as the basis of the sum of the commission the retailer charges to the requester.

The preparing unit booking certificate intermediation history for requester preparing unit 1812, given the designation of the identifier of the requester for whom the history is prepared and of the starting date/time and the ending date/time of the period to be covered by the history. Then, this unit takes out of the booking certificate intermediation history DB 1808 a group of entries the value of whose requester identifier attribute is identical with the designated requester identifier and the value of the issue date attribute is within the designated period of coverage by the history. Furthermore, the unit gets the values of the booking certificate identifier attribute, the public key identifier attribute, the provider identifier attribute, the consumer identifier attribute, the booking conditions attribute, the request date/time attribute and the sending date/time attribute from the extracted entries. In this embodiment, the designation of the identifier of the requester for whom the history is to be prepared and of the period to be covered by the history so prepared is received from the operator of the retailer. It may as well be entered by the requester via the Internet.

The means of delivering this history information to the provider or the requester may be either electronic mail or issuance on demand on a WWW base. Where there is a fear of tapping or alteration, it is preferable to apply encryption or a digital signature.

[Configuration of a Consumer]

Figure 26:
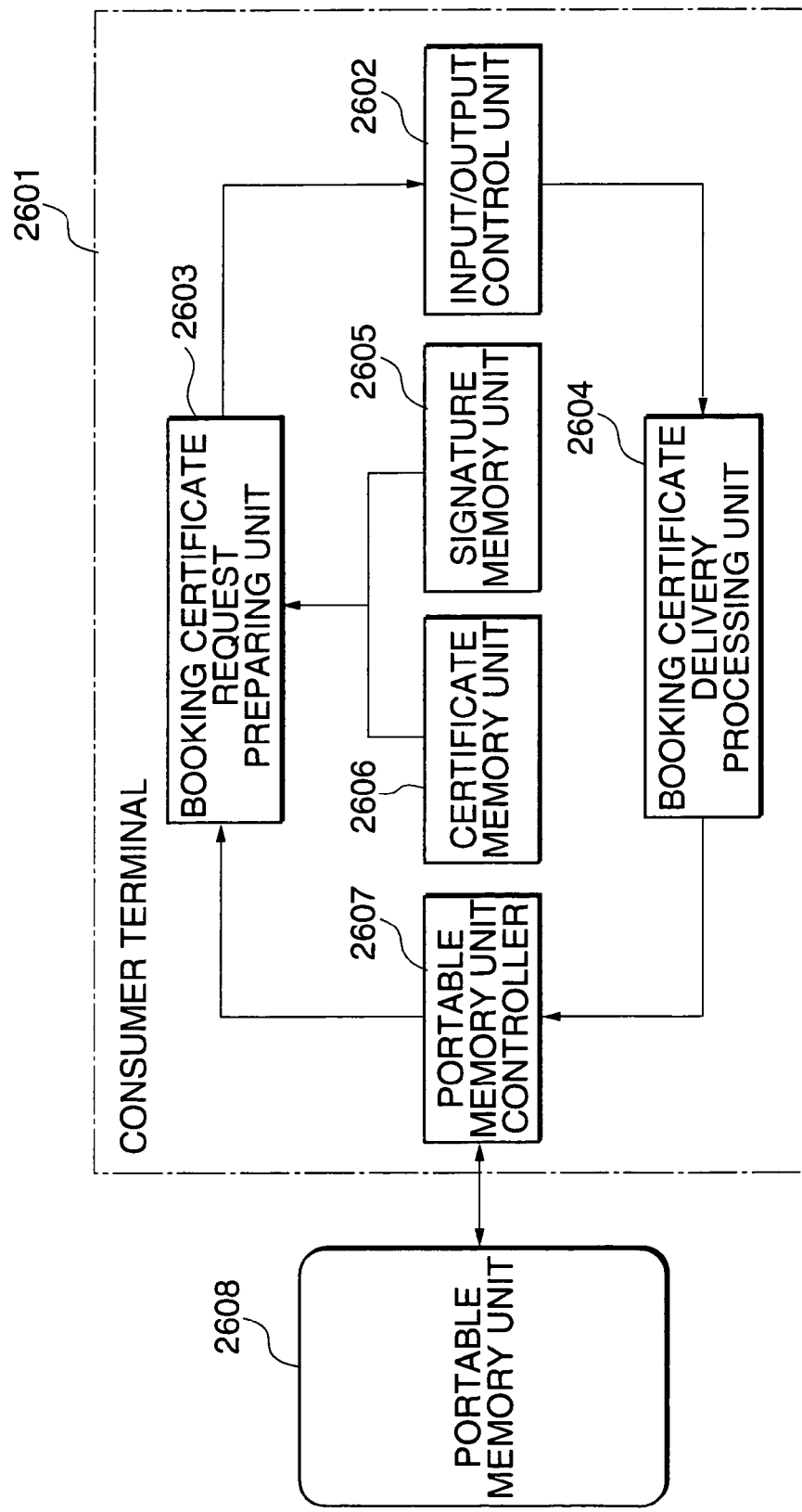
FIG. 26 illustrates the configuration of a consumer terminal to which the invention is applied.

FIG. 26 illustrates the configuration of a consumer terminal in this embodiment of the invention.

A consumer terminal in this embodiment receives a booking certificate from a retailer via the Internet. It has functions to prepare a booking certificate request and deliver it to the retailer via the Internet. In addition, the consumer terminal has functions to process a booking certificate delivery delivered from the retailer via the Internet. The consumer terminal has an input/output control unit 2602, a booking certificate request preparing unit 2603, a booking certificate delivery processing unit 2604, a signature key memory unit 2605, a certificate memory unit 2606 and a portable memory unit controller 2607. The terminal is connected to the Internet via the input/output control unit 2602 and to a portable memory unit via the portable memory unit controller 2607.

The roles of various parts of the consumer terminal in this embodiment will be described below.

Input/output control unit 2602: While accepting data inputs via the Internet, this unit supplies via the Internet booking certificate requests prepared by the booking certificate request preparing unit 2603. Methods usable for inputs from the Internet to the input/output control unit 2602 or outputs from the input/output control unit 2602 include accessing a WWW site maintained by another entity for delivery of data prepared by the consumer terminal. Also, Either automatic or manual interlocking of an electronic mail system and the input/output control unit 2602 can be used for the method of connecting between the input/output control unit 2602 and the Internet.

Booking certificate request preparing unit 2603: It prepares a booking certificate request, and delivers it to a retailer via the input/output control unit 2602. In the course of preparing the request, it accesses the signature key memory unit 2605 and the certificate memory unit 2606, and accesses the portable memory unit 2608 via the portable memory unit controller 2607.

Booking certificate delivery processing unit 2604: This unit processes a booking certificate delivery from the retailer, and records the booking certificate contained in the booking certificate delivery into the portable memory unit 2608 via the portable memory unit controller 2607.

Signature key memory unit 2605: It holds the signature key for use in the digital signature prepared by the consumer terminal.

Certificate memory unit 2606: It holds a public key certificate containing a verification key with which a digital signature prepared with the signature key stored in the signature key memory unit 2605 can be checked.

Portable memory unit controller 2607: It writes data into and access the portable memory unit 2608.

In this embodiment, the signature key for use in applying a digital signature to a booking certificate request of a public key certificate containing a verification key with which a signature prepared with that signature key is verified are held by the consumer terminal. A configuration in which they are held by the portable memory unit is also acceptable.

[Booking Certificate Request Preparing Unit]

The consumer terminal in this embodiment, where there is a product or a service the consumer using that terminal desires to book in advance, prepares with the booking certificate request preparing unit 2603 a booking certificate request for requesting intermediation of a booking certificate, and delivers it to a retailer via the input/output control unit 2602.

The booking certificate request preparing unit 2603 sets the following values in the fields of the booking certificate request.

Sender field: The consumer terminal's own identifier.
Receiver field: The retailer's identifier.
Date/time field: The current point of time.
Booking particulars field: Booking specifications to be described below.
Digital signature field: The digital signatures for data of other fields of this booking certificate request than this and certificate fields. To prepare the digital signatures, the booking certificate request preparing unit 2603 includes a signature preparing unit, and the values of signatures prepared by this signature preparing unit are set in this field. The signature key is obtained by accessing the signature key memory unit 2605.
Certificate field: The public key certificate stored in the certificate memory unit 2606.

The following values are set in the fields of the booking specifications designated in the booking particulars field.

Public key identifier field: The identifier of the verification public key assigned to the product or the service desired to be booked in advance.

Consumer identifier field: The identifier of the consumer using the consumer terminal. The consumer identifier is stored in the portable memory unit 2608, and the booking certificate request preparing unit 2603 obtains the consumer identifier from the portable memory unit 2608 via the portable memory unit controller 2607.

Booking conditions field: Appropriate conditions reflecting the consumer's desire and other factors are determined by the booking certificate request preparing unit 2603 and set here.

Booking certificate intermediation license field: Nothing is set.

[Booking Certificate Delivery Processing Unit]

As a booking certificate request is prepared by the booking certificate request preparing unit 2603 and delivered to the retailer, a booking certificate delivery is transmitted from the retailer in return. The booking certificate delivery is entered via the input/output control unit 2602 into the booking certificate delivery processing unit 2604 and processed there.

Figure 27:
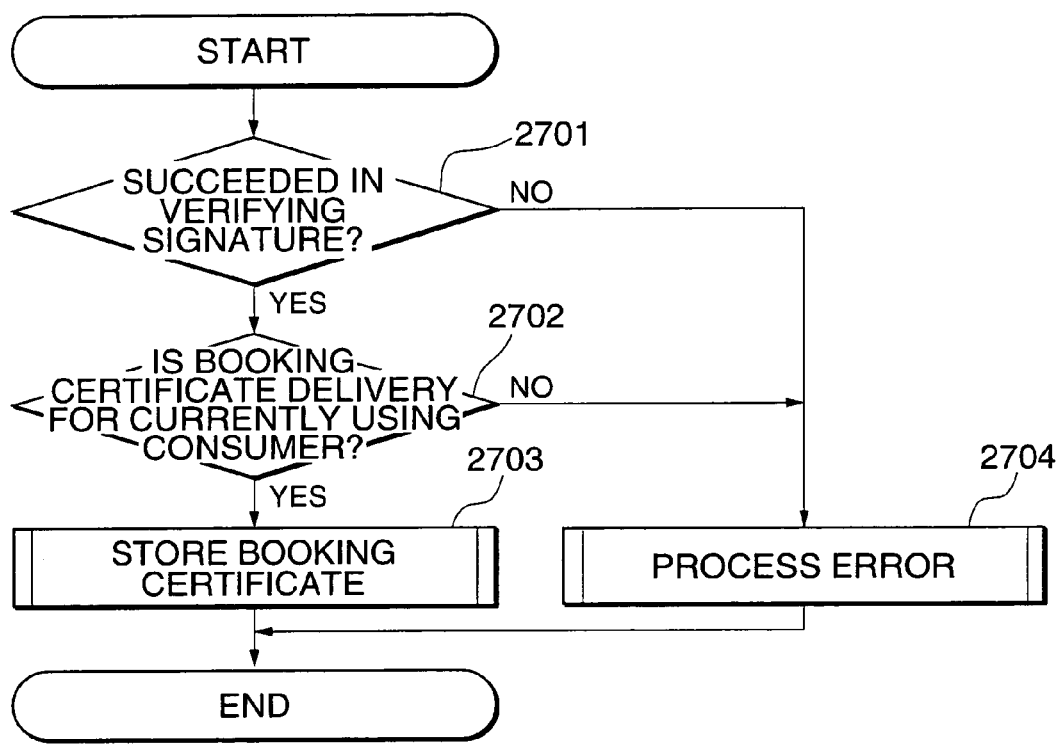
FIG. 27 is a flowchart showing the operation of a booking certificate delivery processing unit provided in the consumer terminal to which the invention is applied.

FIG. 27 is a flowchart showing the operation of the booking certificate delivery processing unit 2604 the consumer terminal in this embodiment has. The operation of the booking certificate delivery processing unit 2604 will be described below with reference to FIG. 27.

First, the digital signature of the inputted booking certificate delivery entered and the digital signature of the booking certificate contained in the booking certificate delivery are checked (2701). As the verification key, what is appended to the certificate field of the verification public key information delivery is used. But if the required public key certificate is absent in the certificate field, the signature is checked after a public key certificate is obtained from the CA 111.

If the signature fails to be verified at step 2701, the processing is ended after error processing (2704).

If the digital signature is successfully verified at step 2701, it is checked whether or not the booking certificate contained in the inputted booking certificate delivery is intended for the consumer currently using the consumer terminal (2702). The checking refers to whether the consumer identifier obtained from the portable memory unit 2608 via the portable memory unit controller 2607 is identical with the value of the recipient field of the booking certificate contained in the inputted booking certificate delivery.

If it is judged by checking at step 2702 that the booking certificate contained in the inputted booking certificate delivery is not intended for the consumer currently using the consumer terminal, the processing is ended after error processing (2704).

If it is judged by checking at step 2702 that the booking certificate contained in the inputted booking certificate delivery is intended for the consumer currently using the consumer terminal, the booking certificate is recorded into the portable memory unit 2608 via the portable memory unit controller 2607 (2703), and the processing is ended.

As hitherto described, according to the present invention, no individual booking vender needs to spend a resource for issuing certificates when selling goods and/or services on an advance booking basis.

What is claimed is:

1. A booking certificate issuance method for issuing an electronic booking certificate, comprising:
   electronically preparing verification information required for verifying a legitimacy of a booking certificate, the booking certificate certifying that a supply of a product and/or a service is booked in advance for a specific consumer;
   electronically inputting information for identifying the verification information;
   electronically preparing a booking certificate including a booking value that includes a booking condition and is verifiable with the verification information identified by the inputted information for identifying verification information;
   electronically outputting the booking certificate thus prepared;
   electronically preparing an encrypted public key pair; and
   electronically holding a private key out of the public key pair,
   wherein the verification information is a public key out of the public key pair, and the booking certificate is prepared by using the private key.

2. A computerized booking certificate issuance system for issuing an electronic booking certificate, comprising:
   verification information preparing means for preparing verification information required for verifying a legitimacy of a booking certificate including a booking value that includes a booking condition and certifies that a supply of a product and/or a service is booked in advance for a specific consumer;
   verification information output means for outputting the verification information prepared by the verification information preparing means;
   booking certificate preparing means, to which information for identifying the verification information is inputted, for preparing a booking certificate verifiable with the verification information identified by the input;
   booking certificate output means for outputting the booking certificate prepared by the booking certificate preparing means;
   encrypted public key pair preparing means for preparing an encrypted public key pair; and
   private key holding means for holding a private key out of the public key pair prepared by the encrypted public key pair preparing means,
   wherein the verification information is a public key prepared by the encrypted public key pair preparing means, and the booking certificate is prepared by using the private key held by the private key holding means.

3. A booking certificate issuance system, as claimed in claim 2, further comprising:
   booking conditions preparing means for preparing booking conditions, which are conditions for limiting booking particulars, wherein
   the booking certificate prepared by the booking certificate preparing means contains the booking conditions prepared by the booking conditions preparing means.

4. A booking certificate issuance system, as claimed in claim 2, wherein the booking certificate preparing means receives input of information for identifying an intermediary of a request for booking certificate, together with the information for identifying verification information, and a booking certificate intermediation license certifying that the intermediary is licensed to intermediate the request for booking certificate corresponding to the verification information thus identified, checks whether or not the intermediary is licensed for intermediation of the request for booking certificate corresponding to the verification information by referencing the booking certificate intermediation license, and prepares the booking certificate only when the intermediary is found to be licensed.

5. The booking certificate verification apparatus of claim 2, wherein the booking certificate is usable to be downloaded to a portable memory unit to be presented for receiving the booked product and/or service.

6. The booking certificate verification apparatus of claim 5, wherein the portable memory unit comprises an IC card.

7. A booking certificate issuance system as claimed in claim 2, further comprising:
   a booking certificate issuance history memory unit that stores a booking certificate issuance history;
   a booking certificate issuance history for provider preparing unit, to which information for identifying a provider of a product and/or a service is inputted, that extracts a booking certificate issuance history for provider regarding the product and/or the service available from the provider out of the issuance history stored in the booking certificate issuance history memory unit; and
   a booking certificate issuance history for provider output unit that outputs the booking certificate issuance history for provider prepared by the booking certificate issuance history for provider preparing unit.

8. A booking certificate issuance system as claimed in claim 2, further comprising:
   booking certificate request accepting means for accepting a request for booking certificate, wherein:
   a booking certificate is prepared by the booking certificate preparing means when the booking certificate request accepting means has accepted a request for booking certificate, and wherein the system further comprises:
   a booking certificate issuance history memory unit that stores a booking certificate issuance history;
   a booking certificate issuance history for requester preparing unit, to which information for identifying a requester of booking certificate is inputted, that extracts a booking certificate issuance history for requester, which is a history of booking certificate issuance for the requester, out of the issuance history stored in the booking certificate issuance history memory unit; and a booking certificate issuance history for requester output unit that outputs the booking certificate issuance history for requester prepared by the booking certificate issuance history for requester preparing unit.

9. A booking certificate issuance system as claimed in claim 2, further comprising:

a verification information issuance history memory unit that stores a verification information issuance history;

a verification information issuance history preparing unit, to which information for identifying a grantee of verification information is inputted, that extracts a verification information issuance history for grantee, which is a verification information issuance history regarding the verification information issued to the grantee, out of the issuance history stored in the verification information issuance history memory unit; and a verification information issuance history output unit that outputs the verification information issuance history for grantee prepared by the verification information issuance history preparing unit.

10. A computerized booking certificate issuance system for issuing an electronic booking certificate for certifying that a supply of a product or a service is booked in advance for a specific consumer, comprising:

verification information preparing means for preparing verification information required for verifying a legitimacy of a booking certificate;

verification information output means for outputting the verification information prepared by the verification information preparing means;

booking certificate preparing means, to which information for identifying the verification information is inputted, for preparing a booking certificate verifiable with the verification information identified by the input;

booking certificate output means for outputting the booking certificate prepared by the booking certificate preparing means;

a booking certificate issuance history memory unit that stores a booking certificate issuance history;

a booking certificate issuance history for provider preparing unit, to which information for identifying a provider of a product and/or a service is inputted, that extracts a booking certificate issuance history for provider regarding the product and/or the service available from the provider out of the issuance history stored in the booking certificate issuance history memory unit; and a booking certificate issuance history for provider output unit that outputs the booking certificate issuance history for provider prepared by the booking certificate issuance history for provider preparing unit.

11. A computerized booking certificate issuance system for issuing an electronic booking certificate for certifying that a supply of a product or a service is booked in advance for a specific consumer, comprising:

verification information preparing means for preparing verification information required for verifying a legitimacy of a booking certificate;

verification information output means for outputting the verification information prepared by the verification information preparing means;

booking certificate preparing means, to which information for identifying the verification information is inputted, for preparing a booking certificate verifiable with the verification information identified by the input;

booking certificate output means for outputting the booking certificate prepared by the booking certificate preparing means;

booking certificate request accepting means for accepting a request for booking certificate, wherein:

a booking certificate is prepared by the booking certificate preparing means when the booking certificate request accepting means has accepted a request for booking certificate, and wherein the system further comprises:

a booking certificate issuance history memory unit that stores a booking certificate issuance history;

a booking certificate issuance history for requester preparing unit, to which information for identifying a requester of booking certificate is inputted, that extracts a booking certificate issuance history for requester, which is a history of booking certificate issuance for the requester, out of the issuance history stored in the booking certificate issuance history memory unit; and a booking certificate issuance history for requester output unit that outputs the booking certificate issuance history for requester prepared by the booking certificate issuance history for requester preparing unit.

12. A computerized booking certificate issuance system for issuing an electronic booking certificate for certifying that a supply of a product or a service is booked in advance for a specific consumer, comprising:

verification information preparing means for preparing verification information required for verifying a legitimacy of a booking certificate;

verification information output means for outputting the verification information prepared by the verification information preparing means;

booking certificate preparing means, to which information for identifying the verification information is inputted, for preparing a booking certificate verifiable with the verification information identified by the input;

booking certificate output means for outputting the booking certificate prepared by the booking certificate preparing means;

a verification information issuance history memory unit that stores a verification information issuance history;

a verification information issuance history preparing unit, to which information for identifying a grantee of verification information is inputted, that extracts a verification information issuance history for grantee, which is a verification information issuance history regarding the verification information issued to the grantee, out of the issuance history stored in the verification information issuance history memory unit; and a verification information issuance history output unit that outputs the verification information issuance history for grantee prepared by the verification information issuance history preparing unit.

13. A booking certificate intermediation method for performing intermediation of a request for an electronic booking certificate, comprising:

electronically receiving a first request for booking certificate, which is a request for an issuance of a booking certificate including a booking value that includes a booking condition and certifies an advance booking of a specific product and/or service;

electronically preparing a second request for booking certificate, which is a request for the issuance of the booking certificate requested with the received first request for booking certificate, the second request prepared based on the received first request; and electronically outputting the second request for booking certificate thus prepared.

14. A computerized booking certificate intermediation system for performing intermediation of a request for an electronic booking certificate for certifying that a supply of a product or a service is booked in advance for a specific consumer, comprising:
booking certificate request acceptance means for accepting a first request for booking certificate, which is a request for an issuance of a booking certificate including a booking value that includes a booking condition and certifies a booking in advance for a specific product and/or service that is offered for supply;
booking certificate request preparing means for preparing a second request for booking certificate requesting the issuance of the booking certificate requested with the accepted first request for booking certificate, the second request prepared based on the received first request; and
booking certificate request output means for outputting the second request for booking certificate generated by the booking certificate request preparing means.

15. A booking certificate intermediation system, as claimed in claim 14, wherein verification information needed for verifying a legitimacy of a specific booking certificate is associated with a specific product and/or service, and the first and second requests for booking certificates contain information for identifying verification information for specifying the product and/or service for which a booking certificate is requested with the requests.

16. A booking certificate intermediation system, as claimed in claim 14, wherein the requested booking certificate contains booking conditions, which are conditions for limiting booking particulars, and wherein the system further comprises:
booking conditions preparing means for preparing the booking conditions to be contained in the requested booking certificate, wherein
the second request for booking certificate prepared by the booking certificate request preparing means contains the booking conditions prepared by the booking conditions preparing means.

17. A booking certificate intermediation system, as claimed in claim 14, further comprising:
booking certificate intermediation license storage means for holding a booking certificate intermediation license to certify that the system is licensed for intermediation of the first request for booking certificate regarding the specific product and/or service, wherein:
the second request for booking certificate, outputted from the booking certificate request output means contains the booking certificate intermediation license to intermediate the first request for the booking certificate regarding the specific product and/or service.

18. A booking certificate intermediation system, as claimed in claim 14, further comprising:
billing means for charging a fee for booking certificate issuance to a requester of the first request for booking certificate, wherein
the fee is charged by the billing means to the requester when the first request for booking certificate is inputted.

19. A booking certificate intermediation system, as claimed in claim 14, further comprising:
account settlement means for collecting a fee for booking certificate issuance from a requester of the first request for booking certificate, wherein the fee is collected by the account settlement means from the requester when the first request for booking certificate is inputted.

20. The booking certificate verification apparatus of claim 14, wherein the booking certificate is usable to be downloaded to a portable memory unit to be presented for receiving the booked product and/or service.

21. The booking certificate verification apparatus of claim 20, wherein the portable memory unit comprises an IC card.

22. A booking certificate intermediation license method for licensing an intermediation of a request for an electronic booking certificate, comprising:
electronically inputting information for identifying an intermediary to perform intermediation of a request for a booking certificate including a booking value that includes a booking condition and certifies that a supply of a product and/or a service is booked in advance by a specific consumer;
electronically inputting information for specifying the product and/or service for which the intermediary is licensed for intermediation;
electronically preparing a booking certificate intermediation license for certifying that the intermediation of the request for booking certificate for the product and/or service specified by the latter input information is licensed to the intermediary identified by the former input information; and
electronically outputting the booking certificate intermediation license certificate thus prepared, wherein the booking certificate is prepared by using a private key of a public key pair.

23. A computerized booking certificate intermediation licensing system for licensing intermediation of a request, comprising:
booking certificate intermediation license preparing means, to which information for identifying an intermediary to perform intermediation of a request for an electronic booking certificate including a booking value that includes a booking condition and certifies that a supply of a product and/or a service is booked in advance for a specific consumer and information for specifying a product and/or a service for which the intermediary is licensed for intermediation are inputted, for preparing a booking certificate intermediation license for certifying that the intermediary identified by the former input information is licensed for the intermediation of the request for booking certificate for the product and/or service specified by the latter input information; and
booking certificate intermediation license output means for outputting the booking certificate intermediation license prepared by the booking certificate intermediation license preparing means, wherein the booking certificate is prepared by using a private key of a public key pair.

24. A booking certificate intermediation licensing system, as claimed in claim 23, further comprising:
booking conditions limitation information preparing means for preparing booking conditions limitation information, which is information for limiting a scope of booking conditions, which are conditions for limiting booking particulars to be entered in the booking certificate issued by intermediation by the intermediary, who is the recipient of the license, wherein
the booking certificate intermediation license prepared by the booking certificate intermediation license preparing means contains the booking conditions limitation information prepared by the booking conditions limitation information preparing means.

25. A booking certificate intermediation licensing system, as claimed in claim 23, further comprising:
a booking certificate intermediation license issuance history memory unit that stores a license issuance history;
a booking certificate intermediation license issuance history for intermediary preparing unit, to which information for specifying the intermediary of a request for booking certificate is inputted, that extracts out of issuance history recorded in the booking certificate intermediation license issuance history memory unit a booking certificate intermediation license issuance history for intermediary, which is a history regarding license issued to the intermediary; and
a booking certificate intermediation license issuance history for intermediary output unit that outputs the booking certificate intermediation license issuance history for intermediary prepared by the booking certificate intermediation license issuance history for intermediary preparing unit.

26. The booking certificate verification apparatus of claim 23, wherein the booking certificate is usable to be downloaded to a portable memory unit to be presented for receiving the booked product and/or service.

27. The booking certificate verification apparatus of claim 26, wherein the portable memory unit comprises an IC card.

28. A booking certificate verifying method for verifying a legitimacy of an electronic booking certificate, comprising:
electronically storing verification information for verifying a booking certificate including a booking value that includes a booking condition and certifies that a supply of a product and/or a service is booked in advance for a specific consumer;
electronically inputting the booking certificate;
electronically verifying the legitimacy of the input booking certificate by using the stored verification information;
electronically preparing an encrypted public key pair; and
electronically holding a private key out of the public key pair,
wherein the verification information is a public key out of the public key pair, and the booking certificate is prepared by using the private key.

29. A booking certificate verification apparatus for verifying a legitimacy of an electronic booking certificate, comprising:
verification information storage means for storing verification information for verifying the booking certificate including a booking value that includes a booking condition and certifies that a supply of a product and/or a service is booked in advance for a specific consumer;
booking certificate verification means, to which the booking certificate is inputted, for verifying the legitimacy of the input booking certificate by using the verification information stored in the verification information storage means;
encrypted public key pair preparing means for preparing an encrypted public key pair; and
private key holding means for holding a private key out of the public key pair prepared by the encrypted public key pair preparing means,
wherein the verification information is a public key prepared by the encrypted public key pair preparing means, and the booking certificate is prepared by using the private key held by the private key holding means.

30. A booking certificate verification apparatus, as claimed in claim 29, further comprising:
connection means for connecting a portable memory apparatus holding the booking certificate, wherein
the booking certificate verification means verifies through the connection means the legitimacy of the booking certificate stored in the portable memory apparatus.

31. The booking certificate verification apparatus of claim 29, wherein the portable memory apparatus comprises an IC card.

32. A storage medium storing a set of program instructions executable on a data processing device and usable to issue an electronic booking certificate, the set of program instructions comprising:
instructions for preparing verification information required for verifying a legitimacy of a booking certificate certifying that a supply of a product and/or a service is booked in advance for a specific consumer;
instructions for inputting information for identifying the verification information;
instructions for preparing a booking certificate including a booking value that includes a booking condition and is verifiable with the verification information identified by the inputted information for identifying verification information;
instructions for outputting the booking certificate thus prepared;
instructions for preparing an encrypted public key pair; and
instructions for holding a private key out of the public key pair,
wherein the verification information is a public key out of the public key pair, and the booking certificate is prepared by using the private key.

33. A storage medium storing a set of program instructions executable on a data processing device and usable to perform intermediation of a request for an electronic booking certificate, the set of program instructions comprising:
instructions for receiving a first request for booking certificate, which is a request for an issuance of a booking certificate including a booking value that includes a booking condition and certifies an advance booking of a specific product and/or service;
instructions for preparing a second request for booking certificate, which is a request for the issuance of the booking certificate requested with the received first request for booking certificate; and
instructions for outputting the second request for booking certificate thus prepared.

34. A storage medium storing a set of program instructions executable on a data processing device and usable to license an intermediation of a request for an electronic booking certificate, the set of program instructions comprising:
instructions for inputting information for identifying an intermediary to perform intermediation of a request for a booking certificate including a booking value that includes a booking condition and certifies that a supply of a product and/or a service is booked in advance for a specific consumer;
instructions for inputting information for specifying the product and/or service for which the intermediary is licensed for intermediation;
instructions for preparing a booking certificate intermediation license for certifying that the intermediation of the request for booking certificate for the product and/or service specified by the latter input information is licensed to the intermediary identified by the former input information; and instructions for outputting the booking certificate intermediation license certificate thus prepared, wherein the booking certificate is prepared by using a private key of a public key pair.

35. A storage medium storing a set of program instructions executable on a data processing device and usable to verify a legitimacy of an electronic booking certificate, the set of program instructions comprising:

instructions for storing verification information for verifying a booking certificate including a booking value that includes a booking condition and certifies that a supply of a product and/or a service is booked in advance for a specific consumer;

instructions for inputting the booking certificate;

instructions for verifying the legitimacy of the input booking certificate by using the stored verification information;

instructions for preparing an encrypted public key pair; and instructions for holding a private key out of the public key pair, wherein the verification information is a public key out of the public key pair, and the booking certificate is prepared by using the private key.

* * * * *